United States Patent
Takashima et al.

(10) Patent No.: US 8,938,623 B2
(45) Date of Patent: Jan. 20, 2015

(54) CRYPTOGRAPHIC PROCESSING SYSTEM, KEY GENERATION DEVICE, ENCRYPTION DEVICE, DECRYPTION DEVICE, CRYPTOGRAPHIC PROCESSING METHOD, AND CRYPTOGRAPHIC PROCESSING PROGRAM

(75) Inventors: Katsuyuki Takashima, Tokyo (JP); Tatsuaki Okamoto, Tokyo (JP)

(73) Assignees: Mitsubishi Electric Corporation, Tokyo (JP); Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 13/823,507

(22) PCT Filed: Dec. 6, 2011

(86) PCT No.: PCT/JP2011/078164
§ 371 (c)(1),
(2), (4) Date: Mar. 14, 2013

(87) PCT Pub. No.: WO2012/086405
PCT Pub. Date: Jun. 28, 2012

(65) Prior Publication Data
US 2013/0173929 A1    Jul. 4, 2013

(30) Foreign Application Priority Data

Dec. 22, 2010 (JP) .................. 2010-286511

(51) Int. Cl.
*G06F 21/00* (2013.01)
*H04L 9/08* (2006.01)
(Continued)

(52) U.S. Cl.
CPC ............ *H04L 9/08* (2013.01); *H04L 9/3073* (2013.01); *H04L 9/007* (2013.01); *H04L 9/008* (2013.01)

USPC ........................... 713/189; 713/176; 380/277

(58) Field of Classification Search
CPC ........... H04L 9/08; H04L 9/007; H04L 9/008; H04L 9/0847
USPC .................................. 713/176, 189; 380/277
See application file for complete search history.

(56) References Cited

U.S. PATENT DOCUMENTS

2003/0179885 A1* 9/2003 Gentry et al. ................. 380/277
2004/0098589 A1* 5/2004 Appenzeller et al. ......... 713/170

(Continued)

FOREIGN PATENT DOCUMENTS

WO    2011 135895    3/2011
WO    2011 135895    11/2011

OTHER PUBLICATIONS

"New Analysis," The Journal of the Institute of Electronics, Information and Communication Engineers, vol. 93, No. 12, Total 4 Pages, (Dec. 1, 2010).

(Continued)

*Primary Examiner* — Hadi Armouche
*Assistant Examiner* — Sher Khan
(74) *Attorney, Agent, or Firm* — Oblon, Spivak, McClelland, Maier & Neustadt, L.L.P.

(57) ABSTRACT

The object is to provide a secure functional encryption scheme having many cryptographic functions. An access structure is constituted by applying the inner-product of attribute vectors to a span program. The access structure has a degree of freedom in design of the span program and design of the attribute vectors, thus having a large degree of freedom in design of access control. A functional encryption process is implemented by imparting the access structure to each of a ciphertext and a decryption key.

8 Claims, 13 Drawing Sheets

(51) Int. Cl.
*H04L 9/30* (2006.01)
*H04L 9/00* (2006.01)

(56) References Cited

U.S. PATENT DOCUMENTS

| | | | | |
|---|---|---|---|---|
| 2005/0094806 | A1* | 5/2005 | Jao et al. | 380/30 |
| 2006/0123238 | A1* | 6/2006 | Kacker et al. | 713/185 |
| 2007/0050629 | A1* | 3/2007 | Gentry et al. | 713/176 |
| 2008/0063192 | A1* | 3/2008 | Goubin et al. | 380/46 |
| 2008/0178005 | A1* | 7/2008 | Gentry | 713/176 |
| 2008/0263357 | A1* | 10/2008 | Boyen | 713/168 |
| 2013/0028415 | A1 | 1/2013 | Takashima et al. | |

OTHER PUBLICATIONS

Attrapadung, N., et al., "Functional Encryption for Inner Product: Achieving Constant-Size Ciphertexts with Adaptive Security or Support for Negation," 13th International Conference on Practice and Theory in Public Key Cryptography Paris, France, Total 24 Pages, (May 26-28, 2010).

Boneh, D., et al., "Functional Encryption: Definitions and Challenges," ePrint, http://eprint.iacr.org/cgi-bin/versions.pl?entry=2010/543, Total 24 Pages, (Nov. 1, 2010).

Beimel, A., "Secure Schemes for Secret Sharing and Key Distribution," PhD Thesis, Israel Institute of Technology, Total 115 Pages, (1996).

Bethencourt, J., et al., "Ciphertext-Policy Attribute-Based Encryption," IEEE Symposium on Security and Privacy, Total 15 Pages, (2007).

Boneh, D., et al., "Efficient Selective-ID Secure Identity Based Encryption Without Random Oracles," Eurocrypt LNCS, vol. 3027, Total 20 Pages, (2004).

Boneh, D., et al., "Secure Identity Based Encryption Without Random Oracles," Eurocrypt LNCS, vol. 3152, Total 24 Pages, (2004).

Boneh, D., et al., "Hierarchical Identity Based Encryption with Constant Size Ciphertext," Eurocrypt LNCS, vol. 3494, Total 27 Pages, (2005).

Boneh, D., et al., "Identity-Based Encryption from the Weil Pairing," Eurocrypt LNCS, vol. 2139, Total 21 Pages, (2001).

International Search Report Issued Jan. 10, 2012 in PCT/JP11/78164 Filed Dec. 6, 2011.

Boneh, D., et al., "Generalized Identity Based and Broadcast Encryption Schemes," Asiacrypt LNCS, vol. 5350, Total 16 Pages, (2008).

Boneh, D., et al., "Improved Efficiency for CCA-Secure Cryptosystems Built Using Identitiy-Based Encryption," RSA-CT LNCS, Total 16 Pages, (2005).

Boneh, D., et al., "Conjunctive, Subset, and Range Queries on Encrypted Data," TCC LNCS, vol. 4392, Total 20 Pages, (2007).

Boyen, X., et al., "Anonymous Hierarchical Identity-Based Encryption (Without Random Oracles)," CRYPTO LNCS, vol. 4117, Total 30 Pages, (Jun. 8, 2006).

Canetti, R., et al.,"Chosen-Ciphertext Security from Identity-Based Encryption," Eurocrypt LNCS, Total 15 Pages, (2004).

Cocks, C., "An Identity Based Encryption Scheme Based on Quadratic Residues," Cryptography and Coding LNCS, vol. 2260, pp. 360-363, (2001).

Gentry, C., "Practical Identity-Based Encryption Without Random Oracles," Eurocrypt LNCS, vol. 4004, pp. 445-464, (2006).

Gentry, C., et al., "Hierarchical Identity Based Encryption with Polynomially Many Levels," TCC LNCS, vol. 5444, Total 29 Pages, (2009).

Gentry, C., et al., "Hierarchical ID-Based Cryptography," Asiacrypt LNCS, vol. 2501, Total 21 Pages, (2002).

Goyal, V., et al., "Attribute-Based Encryption for Fine-Grained Access Control of Encrypted Data," ACM Conference on Computer and Communication Security, Total 28 Pages, (2006).

Groth, J., et al, "Efficient Non-interactive Proof Systems for Billinear Groups," Eurocrypt LNCS, vol. 4965, Total 32 Pages, (2008).

Horwitz, J., et al., "Toward Hierarchical Identity-Based Encryption," Eurocrypt LNCS, vol. 2332, pp. 466-481, (2002).

Katz, J., et al.,"Predicate Encryption Supporting Disjunctions, Polynomial Equations, and Inner Products," Eurocrypt LNCS, vol. 4965, Total 28 Pages, (2008).

Lewko, A., et al., "Fully Secure Functional Encryption: Attribute-Based Encryption and (Hierarchical) Inner Product Encryption," Eurocrypt LNCS, vol. 6110, pp. 62-91, (2010).

Lewko, A., et al., "New Techniques for Dual System Encryption and Fully Secure HIBE with Short Ciphertexts," ePrint, http://eprint.iacr.org/2009/482, Total 22 Pages, (2009).

Okamoto, T., et al., "Homomorphic Encryption and Signatures from Vector Decomposition," Pairing LNCS, vol. 5209, pp. 57-74, (2008).

Okamoto, T., et al., "Hierarchical Predicate Encryption for Inner-Products," Asiacrypt LNCS, vol. 5912, pp. 214-231, (2009).

Okamoto, T., et al., "Fully Secure Functional Encryption with General Relations from the Decisional Linear Assumption," CRYPTO LNCS, vol. 6223, pp. 191-208, (2010).

Ostrovsky, R., et al., "Attribute-Based Encryption with Non-Monotonic Access Structures," ACM Conference on Computer and Communication Security, pp. 195-203, (2007).

Pirretti, M., et al., "Secure Attribute-Based Systems," ACM Conference on Computer and Communication Security, Total 14 Pages, (2006).

Sahai, A., et al., "Fuzzy Identity-Based Encryption," Eurocrypt LNCS, vol. 3494, Total 15 Pages, (2005).

Shi, E., et al., "Delegating Capabilities in Predicate Encryption Systems,"ICALP LNCS, vol. 5126, Total 35 Pages, (2008).

Waters, B., "Efficient Identity-Based Encryption Without Random Oracles," Eurocrypt LNCS, vol. 3152, Total 13 Pages, (2005).

Waters, B., "Ciphertext-Policy Attribute-Based Encryption: An Expressive, Efficient, and Provably Secure Realization," ePrint, http://eprint.iacr.org/2008/290, Total 30 Pages, (2008).

Waters, B., "Dual System Encryption: Realizing Fully Secure IBE and HIBE under Simple Assumptions," CRYPTO LNCS, vol. 5677, Total 38 Pages, (2009).

Lewko, A., et al., "Decentralizing Attribute-Based Encryption," ePrint, http://eprint.iacr.org/2010/351, Total 29 Pages, (2010).

U.S. Appl. No. 13/981,679, filed Jul. 25, 2013, Takashima, et al.

* cited by examiner

Fig. 3

$$s_0 = \underbrace{[1,\ldots,1]}_{r\ \text{COLUMNS}} \begin{pmatrix} f_1, \ldots, f_r \end{pmatrix} = \sum_{k=1}^{r} f_k$$

Fig. 4

$$\vec{s}^T = \underbrace{\begin{pmatrix} M_{1,1} & M_{1,2} & \cdots & M_{1,r} \\ M_{2,1} & M_{2,2} & \cdots & M_{2,r} \\ \vdots & \vdots & \cdots & \vdots \\ M_{L,1} & M_{L,2} & \cdots & M_{L,r} \end{pmatrix}}_{\begin{pmatrix} f_1, & \cdots & , f_r \end{pmatrix}} = \begin{pmatrix} s_1, & \cdots & , s_r \end{pmatrix}$$

CRYPTOGRAPHIC PROCESSING SYSTEM, KEY GENERATION DEVICE, ENCRYPTION DEVICE, DECRYPTION DEVICE, CRYPTOGRAPHIC PROCESSING METHOD, AND CRYPTOGRAPHIC PROCESSING PROGRAM

TECHNICAL FIELD

The present invention relates to a functional encryption (FE) scheme.

BACKGROUND ART

Non-Patent Literatures 3 to 6, 10, 12, 13, 15, and 18 describe an ID (Identity)-based encryption (IBE) scheme which constitutes one class of the functional encryption scheme.

CITATION LIST

Non-Patent Literature

Non-Patent Literature 1: Beimel, A., Secure schemes for secret sharing and key distribution. PhD Thesis, Israel Institute of Technology, Technion, Haifa, Israel, 1996

Non-Patent Literature 2: Bethencourt, J., Sahai, A., Waters, B.: Ciphertext policy attribute-based encryption. In: 2007 IEEE Symposium on Security and Privacy, pp. 321•34. IEEE Press (2007)

Non-Patent Literature 3: Boneh, D., Boyen, X.: Efficient selective-ID secure identity based encryption without random oracles. In: Cachin, C., Camenisch, J. (eds.) EUROCRYPT 2004. LNCS, voL 3027, pp. 223•38. Springer Heidelberg (2004)

Non-Patent Literature 4: Boneh, D., Boyen, X.: Secure identity based encryption without random oracles. In: Franklin, M. K. (ed.) CRYPTO 2004. LNCS, vol. 3152, pp. 443•59. Springer Heidelberg (2004)

Non-Patent Literature 5: Boneh, D., Boyen, X., Goh, E.: Hierarchical identity based encryption with constant size ciphertext. In: Cramer, R. (ed.) EUROCRYPT 2005. LNCS, vol. 3494, pp. 440•56. Springer Heidelberg (2005)

Non-Patent Literature 6: Boneh, D., Franklin, M.: Identity-based encryption from the Weil pairing. In: Kilian, J. (ed.) CRYPTO2001. LNCS, vol. 2139, pp. 213•29. Springer Heidelberg (2001)

Non-Patent Literature 7: Boneh, D., Hamburg, M.: Generalized identity based and broadcast encryption scheme. In: Pieprzyk, J. (ed.) ASIACRYPT 2008. LNCS, vol. 5350, pp. 455•70. Springer Heidelberg (2008)

Non-Patent Literature 8: Boneh, D., Katz, J., Improved efficiency for CCA-secure cryptosystems built using identity based encryption. RSA-CT 2005, LNCS, Springer Verlag (2005)

Non-Patent Literature 9: Boneh, D., Waters, B.: Conjunctive, subset, and range queries on encrypted data. In: Vadhan, S. P. (ed.) TCC 2007. LNCS, vol. 4392, pp. 535•54. Springer Heidelberg (2007)

Non-Patent Literature 10: Boyen, X., Waters, B.: Anonymous hierarchical identity-based encryption (without random oracles). In: Dwork, C. (ed.) CRYPTO 2006. LNCS, vol. 4117, pp. 290•07. Springer Heidelberg (2006)

Non-Patent Literature 11: Canetti, R., Halevi S., Katz J., Chosen-ciphertext security from identity-based encryption. EUROCRYPT2004, LNCS, Springer-Verlag (2004)

Non-Patent Literature 12: Cocks, C.: An identity based encryption scheme based on quadratic residues. In: Honary, B. (ed.) IMA1 nt. Conf. LNCS, vol. 2260, pp. 360•63. Springer Heidelberg (2001)

Non-Patent Literature 13: Gentry, C.: Practical identity-based encryption without random oracles. In: Vaudenay, S. (ed.) EUROCRYPT 2006. LNCS, vol. 4004, pp. 445•64. Springer Heidelberg (2006)

Non-Patent Literature 14: Gentry, C., Halevi, S.: Hierarchical identity-based encryption with polynomially many levels. In: Reingold, O. (ed.) TCC 2009. LNCS, vol. 5444, pp. 437•56. Springer Heidelberg (2009)

Non-Patent Literature 15: Gentry, C., Silverberg, A.: Hierarchical ID-based cryptography. In: Zheng, Y. (ed.) ASIACRYPT 2002. LNCS, vol. 2501, pp. 548•66. Springer Heidelberg (2002)

Non-Patent Literature 16: Goyal, V., Pandey, O., Sahai, A., Waters, B.: Attribute-based encryption for fine-grained access control of encrypted data. In: ACM Conference on Computer and Communication Security 2006, pp. 89.8, ACM (2006)

Non-Patent Literature 17: Groth, J., Sahai, A.: Efficient non-interactive proof systems for bilinear groups. In: Smart, N. P. (ed.) EUROCRYPT 2008. LNCS, vol. 4965, pp. 415•32. Springer Heidelberg (2008)

Non-Patent Literature 18: Horwitz, J., Lynn, B.: Towards hierarchical identity-based encryption. In: Knudsen, L. R. (ed.) EUROCRYPT 2002. LNCS, vol. 2332, pp. 466•81. Springer Heidelberg (2002)

Non-Patent Literature 19: Katz, J., Sahai, A., Waters, B.: Predicate encryption supporting disjunctions, polynomial equations, and inner products. In: Smart, N. P. (ed.) EUROCRYPT 2008. LNCS, vol. 4965, pp. 146.62. Springer Heidelberg (2008)

Non-Patent Literature 20: Lewko, A., Okamoto, T., Sahai, A., Takashima, K., Waters, B.: Fully secure functional encryption: Attribute-based encryption and (hierarchical) inner product encryption, In: Gilbert, H. (ed.) EUROCRYPT 2010. LNCS, vol. 6110, pp. 62-91. Springer, Heidelberg (2010)

Non-Patent Literature 21: Lewko, A. B., Waters, B.: Fully secure HIBE with short ciphertexts. ePrint, IACR, http://eprint.iacr.org/2009/482

Non-Patent Literature 22: Okamoto, T., Takashima, K.: Homomorphic encryption and signatures from vector decomposition. In: Galbraith, S. D., Paterson, K. G. (eds.) Pairing 2008. LNCS, vol. 5209, pp. 57•4. Springer Heidelberg (2008)

Non-Patent Literature 23: Okamoto, T., Takashima, IC: Hierarchical predicate encryption for Inner-Products, In: ASIACRYPT 2009, Springer Heidelberg (2009)

Non-Patent Literature 24: Okamoto, T., Takashima, K.: Fully Secure Functional Encryption with General Relations from the Decisional Linear Assumption, In: CRYPTO 2010, LNCS vol. 6223, pp. 191-208. Springer Heidelberg (2010)

Non-Patent Literature 25: Ostrovsky, R., Sahai, A., Waters, B.: Attribute-based encryption with non-monotonic access structures. In: ACM Conference on Computer and Communication Security 2007, pp. 195•03, ACM (2007)

Non-Patent Literature 26: Pirretti, M., Traynor, P., McDaniel, P., Waters, B.: Secure attribute-based systems. In: ACM Conference on Computer and Communication Security 2006, pp. 99.12, ACM, (2006)

Non-Patent Literature 27: Sahai, A., Waters, B.: Fuzzy identity-based encryption. In: Cramer, R. (ed.) EUROCRYPT 2005. LNCS, vol. 3494, pp. 457•73. Springer Heidelberg (2005)

Non-Patent Literature 28: Shi, E., Waters, B.: Delegating capability in predicate encryption systems. In: Aceto, L., Damgard, I., Goldberg, L. A., Halldosson, M. M., Ingofsdotir, A., Walukiewicz, I. (eds.) ICALP (2) 2008. LNCS, vol. 5126, pp. 560•78. Springer Heidelberg (2008)

Non-Patent Literature 29: Waters, B.: Efficient identity based encryption without random oracles. Eurocrypt 2005, LNCS No. 3152, pp. 443•59. Springer Verlag, 2005.

Non-Patent Literature 30: Waters, B.: Ciphertext-policy attribute-based encryption: an expressive, efficient, and provably secure realization. ePrint, IACR, http://eprint.iacr.org/2008/290

Non-Patent Literature 31: Waters, B.: Dual system encryption: Realizing fully secure IBE and HIBE under simple assumptions. In: Halevi, S. (ed.) CRYPTO 2009. LNCS, vol. 5677, pp. 619•36. Springer Heidelberg (2009)

SUMMARY OF INVENTION

Technical Problem

It is an object of the present invention to provide a secure functional encryption scheme having diversified cryptographic functions.

Solution to Problem

A cryptographic processing system according to the present invention includes a key generation device, an encryption device, and a decryption device, and serves to execute a cryptographic process using a basis $B_0$ and a basis $B_0^*$, a basis $B_t^{KP}$ and a basis $B_t^{*KP}$ for each integer $t=1, \ldots, d^{KP}$ ($d^{KP}$ is an integer of 1 or more), and a basis $B_t^{CP}$ and a basis $B_t^{*CP}$ for each integer $t=1, \ldots, d^{CP}$ ($d^{CP}$ is an integer of 1 or more), wherein the key generation device includes a first KP information input part which takes as input, a variable $\rho^{KP}(i)$ for each integer $i=1, \ldots, L^{KP}$ ($L^{KP}$ is an integer of 1 or more), which variable $\rho^{KP}(i)$ is either one of a positive tuple $(t, \vec{v}_i^{KP})$ and a negative tuple $\neg(t, \vec{v}_i^{KP})$ of identification information t (t is any one integer of $t=1, \ldots, d^{KP}$) and an attribute vector $\vec{v}_i^{KP}:=(v_{i,i'}^{KP})$ ($i'=1, \ldots, n_t^{KP}$ where $n_t^{KP}$ is an integer of 1 or more), and a predetermined matrix $M^{KP}$ having $L^{KP}$ rows and $r^{KP}$ columns ($r^{KP}$ is an integer of 1 or more), a first CP information input part which takes as input, an attribute set $\Gamma^{CP}$ having the identification information t and an attribute vector $\vec{x}_t^{CP}:=(x_{t,i'}^{CP})$ ($i'=1, \ldots, n_t^{CP}$ where $n_t^{CP}$ is an integer of 1 or more) for at least one integer $t=1, \ldots, d^{CP}$, a main decryption key generation part which generates an element $k_0^*$ by setting a value $-s_0^{KP}$ ($s_0^{KP}:=\vec{h}^{KP} \cdot (\vec{f}^{KP})^T$ where $\vec{h}^{KP}$ and $\vec{f}^{KP}$ are vectors each having $r^{KP}$ pieces of elements) as a coefficient for a basis vector $b^*_{0,p}$ (p is a predetermined value) of the basis $B_0^*$, by setting a random number $\delta^{CP}$ as a coefficient for a basis vector $b^*_{0,p'}$ (p' is a predetermined value different from prescribed p), and by setting a predetermined value $\kappa$ as a coefficient for a basis vector $b^*_{0,q}$ (q is a predetermined value different from the prescribed p and prescribed p'), a KP decryption key generation part which generates an element $k_i^{*KP}$ for each integer $i=1, \ldots, L^{KP}$, based on a column vector $(\vec{s}^{KP})^T:=(s_1^{KP}, \ldots, s_i^{KP})^T:=M^{KP} \cdot (\vec{f}^{KP})^T$ ($i=L^{KP}$) generated based on prescribed $\vec{f}^{KP}$ and the matrix $M^{KP}$ which is inputted by the first KP information input part; and a random number $\theta_i^{KP}$ ($i=1, \ldots, L^{KP}$), the KP decryption key generation part being configured to generate the element $k_i^{*KP}$, when the variable $\rho^{KP}(i)$ for each integer $i=1, \ldots, L^{KP}$ is a positive tuple $(t, \vec{v}_i^{KP})$, by setting $s_i^{KP} + \theta_i^{KP} v_{i,1}^{KP}$ as a coefficient for a basis vector $b^*_{t,1}^{KP}$ of the basis $B_t^{*KP}$ indicated by identification information t of the positive tuple, and by setting $\theta_i^{KP} v_{i,i'}^{KP}$ as a coefficient for a basis vector $b^*_{t,i'}^{KP}$ indicated by the identification information t and by each integer $i'=2, \ldots, n_t^{KP}$, and when the variable $\rho^{KP}(i)$ is a negative tuple $\neg(t, \vec{v}_i^{KP})$, by setting $s_i^{KP} v_{i,i'}^{KP}$ as a coefficient for the basis vector $b^*_{t,i'}^{KP}$ indicated by the identification information t of the negative tuple and by each integer $i'=1, \ldots, n_t^{KP}$, and a CP decryption key generation part which generates an element $k_t^{*CP}$ concerning each identification information t included in the attribute set $\Gamma^{CP}$ inputted by the first CP information input part, the CP decryption key generation part being configured to generate the element $k_t^{*CP}$ by setting $x_{t,i'}^{CP}$ multiplied by the random number $\delta^{CP}$ as a coefficient for a basis vector $b^*_{t,i'}^{CP}$ ($i'=1, \ldots, n_t^{CP}$) of the basis $B_t^{*CP}$, wherein the encryption device includes a second KP information input part which takes as input, an attribute set $\Gamma^{KP}$ having the identification information t and an attribute vector $\vec{x}_t^{KP}:=1, \ldots, n_t^{KP}$) for at least one integer $t=1, \ldots, d^{KP}$, a second CP information input part which takes as input, a variable $\rho^{CP}(i)$ for each integer $i=1, \ldots, L^{CP}$ ($L^{CP}$ is an integer of 1 or more), which variable $\rho^{CP}(i)$ is either one of a positive tuple $(t, \vec{v}_i^{CP})$ and a negative tuple $\neg(t, \vec{v}_i^{CP})$ of identification information t (t is any one integer of $t=1, \ldots, d^{CP}$) and an attribute vector $\vec{v}_i^{CP}:=(v_{i,i'}^{CP})$ ($i'=1, \ldots, n_t^{CP}$), and a predetermined matrix $M^{CP}$ having $L^{CP}$ rows and $r^{CP}$ columns ($r^{CP}$ is an integer of 1 or more), a main encrypted data generation part which generates an element $c_0$ by setting a random number $\omega^{KP}$ as a coefficient for a basis vector $b_{0,p}$ of the basis $B_0$, by setting a value $-s_0^{CP}$ ($s_0^{CP}:=\vec{h}^{CP} \cdot (\vec{f}^{CP})^T$ where $\vec{h}^{CP}$ and $\vec{f}^{CP}$ are vectors each having $r^{CP}$ pieces of elements) as a coefficient for a basis vector $b_{0,p'}$ of the basis $B_0$, and by setting a random number $\zeta$ as a coefficient for a basis vector $b_{0,q}$, a KP encrypted data generation part which generates an element $c_t^{KP}$ concerning each identification information t included in the attribute set $\Gamma^{KP}$ inputted by the second KP information input part, the KP encrypted data generation part being configured to generate the element $c_t^{KP}$ by setting $x_{t,i'}^{KP}$ multiplied by the random number $\omega^{KP}$ as a coefficient for a basis vector $b_{t,i'}^{KP}$ ($i'=1, \ldots, n_t$) of the basis $B_t^{KP}$, and a CP encrypted data generation part which generates an element $c_i^{CP}$ for each integer $i=1, \ldots, L^{CP}$, based on a column vector $(\vec{s}^{CP})^T:=(s_1^{CP}, \ldots, s_i^{CP})^T:=M^{CP} \cdot (\vec{f}^{CP})^T$ ($i=L^{CP}$) generated based on the prescribed $\vec{f}^{CP}$ and the matrix $M^{CP}$ which is inputted by the second CP information input part; and a random number $\theta_i^{CP}$ ($i=1, \ldots, L^{CP}$), the CP encrypted data generation part being configured to generate the element $c_i^{CP}$, when the variable $\rho^{CP}(i)$ for each integer $i=1, \ldots, L^{CP}$ is a positive tuple $(t, \vec{v}_i^{CP})$, by setting $s_i^{CP} + \theta_i^{CP} v_{i,1}^{CP}$ as a coefficient for a basis vector $b_{t,1}^{CP}$ of the basis $B_t^{CP}$ indicated by identification information t of the positive tuple, and by setting $\theta_i^{CP} v_{i,i'}^{CP}$ as a coefficient for a basis vector $b_{t,i'}^{CP}$ indicated by the identification information t and by each integer $i'=2, \ldots, n_t^{CP}$, and when the variable $\rho^{CP}(i)$ is a negative tuple $\neg(t, \vec{v}_i^{CP})$, by setting $s_i^{CP} v_{i,i'}^{CP}$ as a coefficient for the basis vector $b_{t,i'}^{CP}$ indicated by the identification information t of the negative tuple and by each integer $i'=1, \ldots, n_t^{CP}$, and wherein the decryption device includes a data acquisition part which acquires encrypted data $ct_{(\Gamma KP, SCP)}$ including the element $c_0$ generated by the main encrypted data generation part, the element $c_t^{KP}$ generated by the KP encrypted data generation part, the element $c_i^{CP}$ generated by the CP encrypted data generation part, the attribute set $\Gamma^{KP}$, and the variable $\rho^{CP}(i)$, a decryption key acquisition part which acquires a decryption key $sk_{(SKP,\Gamma CP)}$ including the element $k^*_0$ generated by the main decryption key generation part, the element $k^{*KP}_i$ generated by the KP decryption key generation part, the element $k^{*CP}_t$ generated by the CP decryption key generation part, the variable $\rho^{KP}(i)$, and the attribute set $\Gamma^{CP}$, a KP complementary coefficient calculation part which, based on the attribute set $\Gamma^{KP}$ included in the encrypted data $ct_{(\Gamma KP,SCP)}$ acquired by the data acquisition part, and the variable $\rho^{KP}(i)$ included in the decryption key $sk_{(SKP,\Gamma CP)}$ acquired by the decryption key acquisition part, specifies, among integers $i=1, \ldots, L^{KP}$, a set $I^{KP}$ of i for which the variable $\rho^{KP}(i)$ is a positive tuple $(t, \vec{v}^{KP}_i)$ and with which an inner-product of $\vec{v}^{KP}_i$ of the positive tuple and $\vec{x}^{KP}_t$ included in $\Gamma^{KP}$ indicated by identification information t of the positive tuple becomes 0, and i for which the variable $\rho^{KP}(i)$ is a negative tuple $\neg(t, \vec{v}^{KP}_i)$ and with which an inner-product of $\vec{v}^{KP}_i$ of the negative tuple and $\vec{x}^{KP}_i$ included in $\Gamma^{KP}$ indicated by identification information t of the negative tuple does not become 0; and calculates a complementary coefficient $\alpha_i^{KP}$ with which a total of $\alpha_i^{KP} \cdot M_i^{KP}$ for i included in the set $I^{KP}$ specified becomes prescribed $\vec{h}^{KP}$, a CP complementary coefficient calculation part which, based on the variable $\rho^{CP}(i)$ concerning each integer $i=1,\ldots,L^{CP}$ included in the encrypted data $ct_{(\Gamma KP,SCP)}$, and the attribute set $\Gamma^{CP}$ included in the decryption key $sk_{(SKP,\Gamma CP)}$, specifies, among integers $i=1,\ldots,L^{CP}$, a set $I^{CP}$ of i for which the variable $\rho^{CP}(i)$ is a positive tuple $(t, \vec{v}^{CP}_i)$ and with which an inner-product of $\vec{v}^{CP}_i$ of the positive tuple and $\vec{x}^{CP}_t$ included in $\Gamma^{CP}$ indicated by identification information t of the positive tuple becomes 0, and i for which the variable $\rho^{CP}(i)$ is a negative tuple $\neg(t, \vec{v}^{CP}_i)$ and with which an inner-product of $\vec{v}^{CP}_i$ of the negative tuple and $\vec{x}^{CP}_t$ included in $\Gamma^{CP}$ indicated by identification information t of the negative tuple does not become 0; and calculates a complementary coefficient $\alpha_i^{CP}$ with which a total of $\alpha_i^{CP} \cdot M_i^{CP}$ for i included in the set $I^{CP}$ specified becomes the prescribed $\vec{h}^{CP}$, and a pairing operation part which calculates a value K by conducting a pairing operation indicated in Formula 1 for the elements $c_0$, $c_t^{KP}$, and $c_i^{CP}$ included in the encrypted data $ct_{(\Gamma KP,SCP)}$, and the elements $k^*_0$, $k^{*KP}_i$, and $k^{*CP}_t$ included in the decryption key $sk_{(SKP,\Gamma CP)}$, based on the set $I^{KP}$ specified by the KP complementary coefficient calculation part, on the complementary coefficient $\alpha_i^{KP}$ calculated by the KP complementary coefficient calculation part, on the set $I^{CP}$ specified by the CP complementary coefficient calculation part, and on the complementary coefficient $\alpha_i^{CP}$ calculated by the CP complementary coefficient calculation part.

[Formula 1]

$$K := e(c_0, k^*_0) \cdot \prod_{i \in I^{KP} \wedge \rho^{KP}(i)=(t,\vec{v}^{KP}_i)} e(c_t^{KP}, k^{*KP}_i)\alpha_i^{KP} \cdot \prod_{i \in I^{KP} \wedge \rho^{KP}(i)=\neg(t,\vec{v}^{KP}_i)} e(c_t^{KP}, k^{*KP}_i)$$

$$\alpha_i^{KP} / (\vec{v}^{KP}_i \cdot \vec{x}^{KP}_t) \cdot \prod_{i \in I^{CP} \wedge \rho^{CP}(i)=(t,\vec{v}^{CP}_i)} e(c_t^{CP}, k^{*CP}_i)$$

-continued $$\alpha_i^{CP} \cdot \prod_{i \in I^{CP} \wedge \rho^{CP}(i)=\neg(t,\vec{v}^{CP}_i)} e(c_t^{CP}, k^{*CP}_i)\alpha_i^{CP} / (\vec{v}^{CP}_i \cdot \vec{x}^{CP}_t)$$

Advantageous Effects of Invention

In the cryptographic processing system according to the present invention, an access structure is embedded in each of the decryption key and the ciphertext, to implement diversified cryptographic functions.

BRIEF DESCRIPTION OF DRAWINGS

FIG. 3 is an explanatory drawing of $s_0$.
FIG. 4 is an explanatory drawing of $\vec{s}^T$.

DESCRIPTION OF EMBODIMENTS

Figure 1:
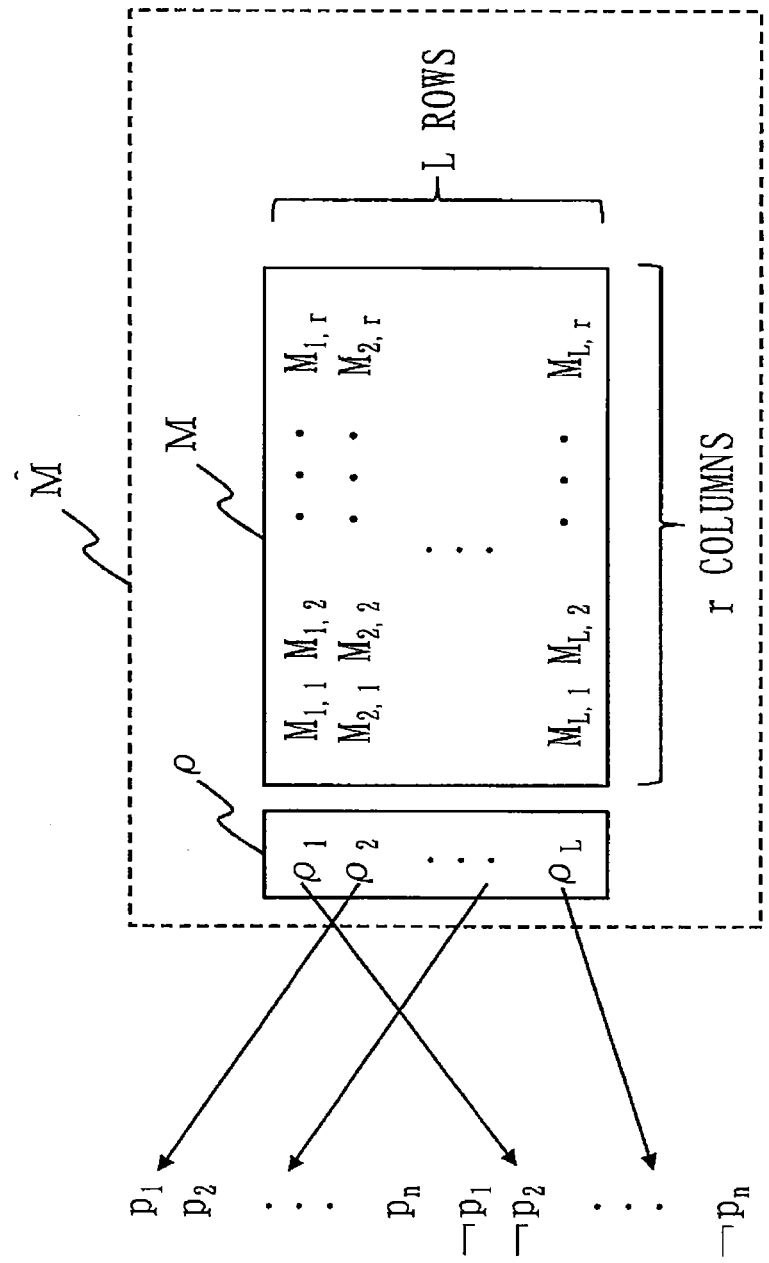
FIG. 1 is an explanatory drawing of a matrix M^.

Embodiments of the present invention will be described hereinafter with reference to the accompanying drawings.

In the following description, the processing device is, for example, a CPU 911 (to be described later). The storage device is, for example, a ROM 913, a RAM 914, or a magnetic disk 920 (each will be described later). The communication device is, for example, a communication board 915 (to be described later). The input device is, for example, a keyboard 902 (to be described later) or the communication board 915. Namely, the processing device, the storage device, the communication device, and the input device are hardware.

The notation in the following description will be explained.
When A is a random variable or distribution, Formula 101 denotes that y is randomly selected from A according to the distribution of A. Namely, in Formula 101, y is a random number.

$$y \xleftarrow{R} A \qquad \text{[Formula 101]}$$

When A is a set, Formula 102 denotes that y is uniformly selected from A. Namely, in Formula 102, y is a uniform random number.

$$y \xleftarrow{U} A \quad \text{[Formula 102]}$$

Formula 103 denotes that y is a set, defined or substituted by z.

$$y := z \quad \text{[Formula 103]}$$

When a is a fixed value, Formula 104 denotes an event that a machine (algorithm) A outputs a on input x.

$$A(x) \to a \quad \text{[Formula 104]}$$

For example, $$A(x) \to 1$$

Formula 105, namely, $F_q$, denotes a finite field of order q.

$$\mathbb{F}_q \quad \text{[Formula 105]}$$

A vector symbol denotes a vector representation over the finite field $F_q$. Namely, Formula 106 is established.

$\vec{x}$ denotes $$(x_1, \ldots, x_n) \in \mathbb{F}_q^n \quad \text{[Formula 106]}$$

Formula 107 denotes the inner-product, indicated by Formula 109, of two vectors $\vec{x}$ and $\vec{y}$ indicated in Formula 108.

$$\vec{x} \cdot \vec{v} \quad \text{[Formula 107]}$$

$$\vec{x} = (x_1, \ldots, x_n),$$

$$\vec{v} = (v_1, \ldots, v_n) \quad \text{[Formula 108]}$$

$$\Sigma_{i=1}^n x_i v_i \quad \text{[Formula 109]}$$

Note that $X^T$ denotes the transpose of matrix M.

Note that for bases B and B* indicated in Formula 110, Formula 111 is established.

$$\mathbb{B} := (b_1, \ldots, b_N),$$

$$\mathbb{B}^* := (b^*_1, \ldots, b^*_N) \quad \text{[Formula 110]}$$

$$(x_1, \ldots, x_N)_{\mathbb{B}} := \Sigma_{i=1}^N x_i b_i,$$

$$(y_1, \ldots, y_N)_{\mathbb{B}^*} := \Sigma_{i=1}^N y_i b^*_i \quad \text{[Formula 111]}$$

Note that $\vec{e}_{t,j}^{KP}$ and $\vec{e}_{t,j}^{CP}$ respectively indicate normal basis vectors shown in Formula 112.

$$\vec{e}_{t,j}^{KP} : (\overbrace{0 \ldots 0}^{j-1}, 1, \overbrace{0 \ldots 0}^{n_t-j}) \in \mathbb{F}_q^{n_t^{KP}} \quad \text{[Formula 112]}$$

for $j = 1, \ldots, n_t^{KP}$, $$\vec{e}_{t,j}^{CP} : (\overbrace{0 \ldots 0}^{j-1}, 1, \overbrace{0 \ldots 0}^{n_t-j}) \in \mathbb{F}_q^{n_t^{CP}}$$

for $j = 1, \ldots, n_t^{CP}$,

In the following description, ntCP in $F_q^{ntCP}$ represents $n_t^{CP}$.

Likewise, in a decryption key $sk_{(SKP,\Gamma CP)}$, SKP represents $S^{KP}$, and ΓCP represents $\Gamma^{CP}$. In encrypted data $ct_{(\Gamma KP, SCP)}$, ΓKP represents $\Gamma^{KP}$, and SCP represents $S^{CP}$.

Likewise, in $param_{V0}$, V0 represents $V_0$. In $param_{VtKP}$, VtKP represents $V_t^{KP}$. In $param_{VtCP}$, VtCP represents $V_t^{CP}$.

Likewise, when "δi,j" is indicated to include a superscript, δi,j is $\delta_{i,j}$.

When "→" indicating a vector is attached to a subscript or superscript, "→" is attached as a superscript to the subscript or superscript.

In the following description, a cryptographic process includes a key generation process, an encryption process, and a decryption process.

Embodiment 1

This embodiment describes a basic concept for implementing the "functional encryption scheme, and a structure of the functional encryption.

First, the functional encryption will be briefly explained.

Second, a space having a rich mathematical structure called "dual pairing vector spaces (DPVS)" which is a space for implementing the functional encryption will be described.

Third, a concept for implementing the functional encryption will be described. Here, "span program", "the inner-product of attribute vectors, and an access structure", and "secret distribution scheme (secret sharing scheme)" will be described.

Fourth, a "functional encryption scheme" according to this embodiment will be described. In this embodiment, a "unified-policy functional encryption (UP-FE) scheme" will be described. Initially, the basic structure of the "unified-policy functional encryption scheme" will be described. Subsequently, the basic structure of a "cryptographic processing system 10" which implements the "unified-policy functional encryption scheme" will be described. Then, a "unified-policy functional encryption scheme" and a "cryptographic processing system 10" according to this embodiment will be described in detail.

<1. Functional Encryption Scheme>

The functional encryption scheme is an encryption scheme that provides more sophisticated and flexible relations between an encryption key (ek) and a decryption key (dk).

According to the functional encryption scheme, an attribute x and an attribute y are set in an encryption key and a decryption key, respectively. A decryption key $dk_v := (dk,v)$ can decrypt a ciphertext encrypted with an encryption key $ek_x := (ek,x)$ only if R(x,v) holds for relation R.

The functional encryption scheme has various applications in the areas of access control of databases, mail services, contents distribution, and the like (see Non-Patent Literatures 2, 7, 9, 16, 19, 25 to 28, and 30).

When R is an equality relation, that is, when R(x, v) holds only if x=v, the functional encryption scheme is the ID-based encryption scheme.

As a more general class of functional encryption scheme than the ID-based encryption scheme, attribute-based encryption schemes have been proposed.

According to the attribute-based encryption schemes, each attribute which is set for an encryption key and decryption key is a tuple of attributes. For example, attributes which are set for an encryption key and decryption key are $X := (x_1, \ldots, x_d)$ and $V := (v_1, \ldots, v_d)$, respectively.

The component-wise equality relations for attribute components (e.g., $\{x_t = v_t\}_{t \in \{1, \ldots, d\}}$) are input to an access structure S, and R(X, V) holds if and only if the input is accepted by the access structure S. Namely, the ciphertext encrypted with the encryption key can be decrypted with the decryption key.

If the access structure S is embedded into the decryption key $dk_v$, the attribute-based encryption (ABE) scheme is called key-policy ABE (KP-ABE). If the access structure S is embedded into a ciphertext, the attribute-based encryption (ABE) scheme is called ciphertext-policy ABE (CP-ABE). If the access structure S is embedded into each of the decryption key dk, and the ciphertext, the attribute-based encryption (ABE) scheme is called unified-policy ABE (UP-ABE).

Inner-product encryption (IPE) described in Non-Patent Literature 19 is also a class of functional encryption, where each attribute for the encryption key and decryption key is a vector over a field or ring. For example, $\vec{x} := (x_1, \ldots, x_n) \in F_q^n$ and $\vec{v} := (v_1, \ldots, v_n) \in F_q^n$ are set for the encryption key and decryption key. $R(\vec{x}, \vec{v})$ holds if and only if $\vec{x} \cdot \vec{v} = 0$.

<2. Dual Pairing Vector Spaces>

First, symmetric bilinear pairing groups will be described.

The symmetric bilinear pairing groups $(q, G, G^T, g, e)$ are a tuple of a prime q, a cyclic additive group G of order q and a cyclic multiplicative group $G^T$ of order q, $g \neq 0 \in G$, and a polynomial-time computable nondegenerate bilinear pairing $e: G \times G \to G_T$. The nondegenerate bilinear pairing signifies $e(sg, tg) = e(g, g)^{st}$, and $e(g, g) \neq 1$.

In the following description, let Formula 113 be an algorithm that takes input $1^\lambda$ and outputs a value of a parameter $\text{param}_G := (q, G, G_T, g, e)$ of bilinear pairing groups with a security parameter $\lambda$.

$$G_{bpg}$$ [Formula 113]

Dual pairing vector spaces will now be described.

Dual pairing vector spaces $(q, V, G_T, A, e)$ can be constituted by a direct product of symmetric bilinear pairing groups $(\text{param}_G := (q, G, G_T, g, e))$. The dual pairing vector spaces $(q, V, G_T, A, e)$ are a tuple of a prime q, an N-dimensional vector space V over $F_q$ indicated in Formula 114, a cyclic group $G_T$ of the order q, and a canonical basis $A := (a_1, \ldots, a_N)$ of the space V, and have the following operations (1) and (2) where $a_i$ is as indicated in Formula 115.

$$\mathbb{V} := \overbrace{G \times \ldots \times G}^{N}$$ [Formula 114]

$$a_i := (\overbrace{0, \ldots, 0}^{i-1}, g, \overbrace{0, \ldots, 0}^{N-i})$$ [Formula 115]

Operation (1): Nondegenerate Bilinear Pairing

The pairing on the space V is defined by Formula 116.

$$e(x,y) := \Pi_{i=1}^N e(G_i H_i) \in \mathbb{G}_T$$ [Formula 116]

where $(G_1, \ldots, G_N) := x \in \mathbb{V}$, $(H_1, \ldots, H_N) := y \in \mathbb{V}$ This is nondegenerate bilinear, i.e., $e(sx, ty) = e(s, y)^{st}$ and if $e(x, y) = 1$ for all $y \in V$, then $x = 0$. For all i and j, $e(a_i, a_j) = e(g, g)^{\delta_{i,j}}$ where $\delta_{i,j} = 1$ if $i = j$, and $\delta_{i,j} = 0$ if $i \neq j$. Also, $e(g, g) \neq 1 \in G_T$.

Operation (2): Distortion Maps

Linear transformation $\phi_{i,j}$ on the space V indicated in Formula 117 can achieve Formula 118.

$$\phi_{i,j}(a_j) = a_i,$$

if $k \neq j$ then $\phi_{i,j}(a_k) = 0$ [Formula 117]

$$\phi_{i,j}(x) := (\overbrace{0, \ldots, 0}^{i-1}, g_j, \overbrace{0, \ldots, 0}^{N-i})$$ [Formula 118]

Note that $(g_1, \ldots g_N) := x$

Linear transformation $\phi_{i,j}$ will be called "distortion maps".

In the following description, let Formula 119 be an algorithm that takes as input, $1^\lambda$ ($\lambda \in$ natural number), N $\in$ natural number, and the value of the parameter $\text{param}_G := (q, G, G_T, g,$ e) of bilinear pairing groups, and outputs the value of a parameter $\text{param}_v$ (q, V, $G_T$, A, e) of dual pairing vector spaces which have a security parameter $\lambda$ and which form an N-dimensional space V.

$$G_{dpvs}$$ [Formula 119]

A case will be described where dual pairing vector spaces are constructed from the symmetric bilinear pairing groups described above. Dual pairing vector spaces can be constructed from asymmetric bilinear pairing groups as well. The following description can be easily applied to a case where dual pairing vector spaces are constructed from asymmetric bilinear pairing groups.

<3. Concept for Implementing Functional Encryption>

<3-1. Span Program>

FIG. 1 is an explanatory drawing of a matrix M^.

Let $\{p_1, \ldots, p_n\}$ be a set of variables. $M^\wedge := (M, \rho)$ is a labeled matrix where the matrix M is a (L rows×r columns) matrix over $F_q$, and $\rho$ is a label of the row of the matrix M and is related to one of literals $\{p_1, \ldots, p_n, \neg p_1, \ldots, \neg p_n\}$. A label $\rho_i$ (i=1, \ldots, L) of every rows of M is related to one of the literals, namely, $\rho: \{1, \ldots, L\} \to \{p_1, \ldots, p_n, \neg p_1, \ldots, \neg p_n\}$.

For every input sequence $\delta \in \{0, 1\}^n$, a submatrix $M_\delta$ of the matrix M is defined. The matrix $M_\delta$ is a submatrix consisting of those rows of the matrix M, whose labels $\rho$ are related to a value "1" by the input sequence $\delta$. Namely, the matrix $M_\delta$ is a submatrix consisting of the rows of the matrix M which are related to $p_i$ with which $\delta_i = 1$ and the rows of the matrix M which are related to $\neg p_i$ with which $\delta_i = 0$.

Figure 2:
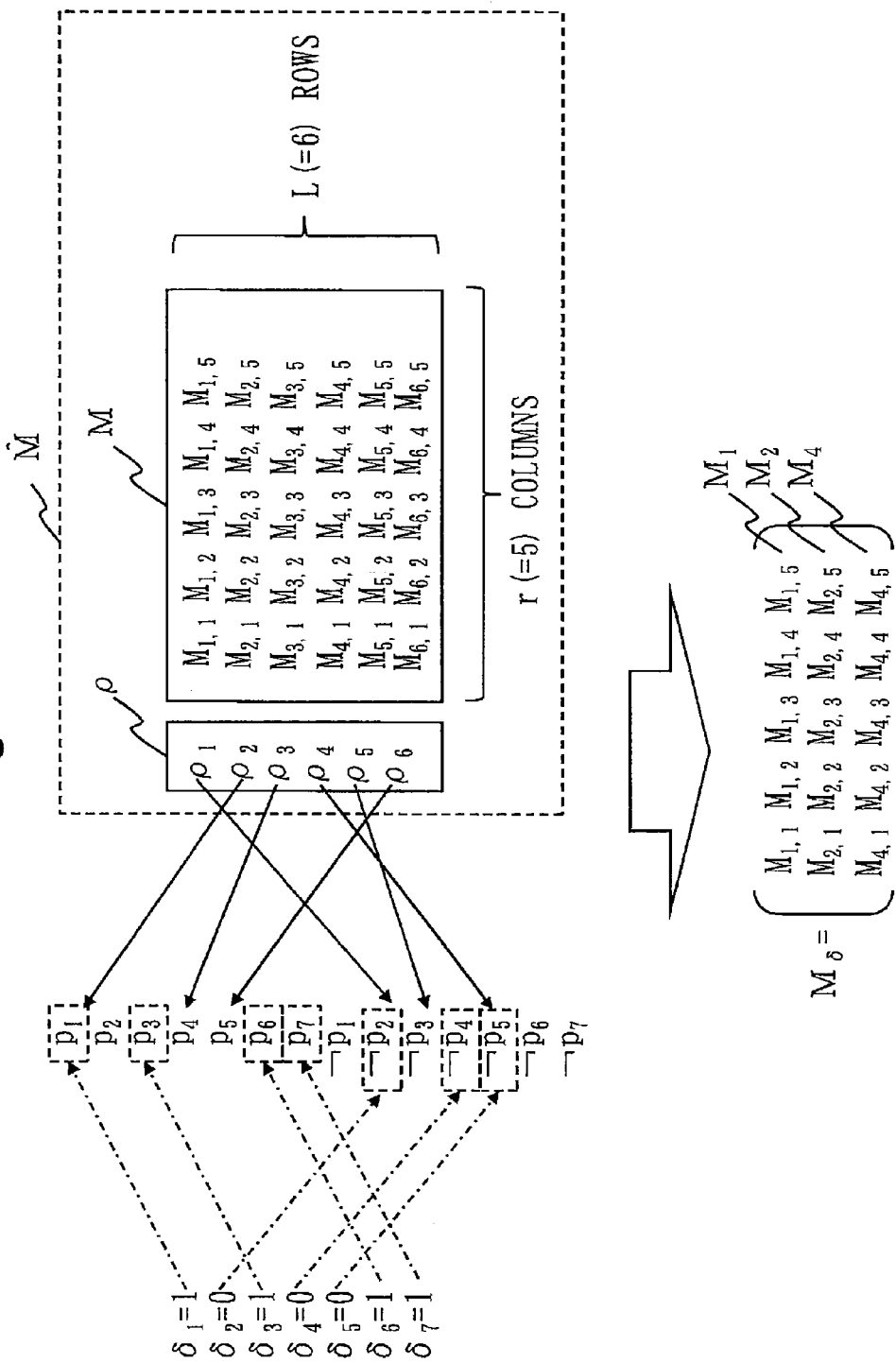
FIG. 2 is an explanatory drawing of a matrix $M_\delta$.

FIG. 2 is an explanatory drawing of the matrix $M_\delta$. Note that in FIG. 2, n=7, L=6, and r=5. That is, the set of variables is $\{p_1, \ldots, p_7\}$, and the matrix M is a (6 rows×5 columns) matrix. In FIG. 2, assume that the labels $\rho$ are related such that $\rho_1$ corresponds to $\neg p_2$, $\rho_2$ to $p_1$, $\rho_3$ to $p_4$, $\rho_4$ to $\neg p_5$, $\rho_5$ to $\neg p_3$, and $\rho_6$ to $\neg p_5$.

Assume that in an input sequence $\delta \in \{0,1\}^7$, $\delta_1 = 1$, $\delta_2 = 0$, $\delta_3 = 1$, $\delta_4 = 0$, $\delta_5 = 0$, $\delta_6 = 1$, and $\delta_7 = 1$. In this case, a submatrix consisting of the rows of the matrix M which are related to literals $(p_1, p_3, p_6, p_7, \neg p_2, \neg p_4, \neg p_5)$ surrounded by broken lines is the matrix $M_\delta$. That is, the submatrix consisting of the 1st row ($M_1$), 2nd row ($M_2$), and 4th row ($M_4$) of the matrix M is the matrix $M_\delta$.

In other words, when map $\gamma: \{1, \ldots, L\} \to \{0, 1\}$ is $[\rho(j) = p_i] \wedge [\delta_i = 1]$ or $[\rho(j) = \neg p_i] \wedge [\delta_i = 0]$, then $\gamma(j) = 1$; otherwise $\gamma(j) = 0$. In this case, $M_\delta := (M_j)_{\gamma(j) = 1}$. Note that $M_j$ is the j-th row of the matrix M.

That is, in FIG. 2, map $\gamma(j) = 1$ (j=1, 2, 4), so map $\gamma(j) = 0$ (j=3, 5, 6). Hence, $(M_j)_{\gamma(j)=1}$ is $M_1$, $M_2$, and $M_4$, and the matrix $M_\delta$.

More specifically, whether or not the j-th row of the matrix M is included in the matrix $M_\delta$ is determined by whether the value of the map $\gamma(j)$ is "0" or "1".

The span program M^ accepts an input sequence $\delta$ if and only if $\vec{1} \in \text{span} < M_\delta >$, and rejects the input sequence $\delta$ otherwise. Namely, the span program M^ accepts an input sequence $\delta$ if and only if linear combination of the rows of the matrix $M_\delta$ which are obtained from the matrix ^ by the input sequence $\delta$ gives $\vec{1}$. $\vec{1}$ is a row vector which has a value "1" in each element.

For example, in FIG. 2, the span program M^ accepts an input sequence $\delta$ if and only if linear combination of the respective rows of the matrix $M_\delta$ consisting of the 1st, 2nd, and 4th rows of the matrix M gives $\vec{1}$. That is, if there exist $\alpha_1$, $\alpha_2$, and $\alpha_4$ with which $\alpha_1(M_1) + \alpha_2(M_2) + \alpha_4(M_4) = \vec{1}$, the span program M^ accepts an input sequence $\delta$.

A span program is called monotone if the labels $\rho$ are related to only positive literals $\{p_1, \ldots, p_n\}$. A span program is called non-monotone if the labels $\rho$ are related to the literals $\{p_1, \ldots, p_n, \neg p_1, \ldots, \neg p_n\}$. Suppose that the span program is non-monotone. An access structure (non-monotone access structure) is constituted using the non-monotone span program. Briefly, an access structure controls access to encryption, namely, it controls whether a ciphertext is to be decrypted or not.

Because the span program is not monotone but non-monotone, the application of the functional encryption schemes constituted using the span program widens. This will be described later in detail.

<3-2. Inner-Products of Attribute Vectors and Access Structure>

Map γ(j) described above will be calculated using the inner-products of attribute vectors. Namely, which row of the matrix M is to be included in the matrix $M_\delta$ will be determined using the inner-products of the attribute vectors.

$U_t$ (t=1, d and $U_t \subset \{0, 1\}^*$) is a sub-universe and an attribute set. Each $U_t$ includes identification information (t) of the sub-universe and $n_t$-dimensional vector ($\vec{v}$). Namely, $U_t$ is (t, $\vec{v}$) where t ∈ {1, ..., d} and $\vec{v} \in F_q^{n_t}$.

Let $U_t:=(t, \vec{v})$ be a variable p of a span program $\hat{M}:=(M, \rho)$, that is, $p:=(t, \vec{v})$. Let a span program $\hat{M}:=(M, \rho)$ having a variable (p:=(t, $\vec{v}$), (t', $\vec{v}'$), . . . ) be an access structure S.

That is, the access structure S:=(M, ρ), and ρ: {1, ..., L}→{(t, $\vec{v}$), (t', $\vec{v}'$), ..., ¬(t, $\vec{v}$), ¬(t', $\vec{v}'$), ...}.

Let Γ be an attribute set, that is, $\Gamma:=\{(t, \vec{x}_t) | \vec{x}_t \in F_q^{n_t}, 1 \le t \le d\}$.

When Γ is given to the access structure S, map γ: {1, ..., L}>{0, 1} for the span program $\hat{M}:=(M, \rho)$ is defined as follows. For each integer i=1, ..., L, set γ(j)=1 if [ρ(i)=(t, $\vec{v}_i$)]∧[(t, $\vec{x}_t$)∈Γ]∧[$\vec{v}_i \cdot \vec{x}_t$=0] or [ρ(i)=¬(t, $\vec{v}_i$)]∧[(t, $\vec{x}_t$)∈Γ]^[$\vec{v}_i \cdot \vec{x}_t \ne 0$]. Set γ(j)=0 otherwise.

Namely, the map γ is calculated based on the inner-product of the attribute vectors $\vec{v}$ and $\vec{x}$. As described above, which row of the matrix M is to be included in the matrix $M_\delta$ is determined by the map γ. More specifically, which row of the matrix M is to be included in the matrix $M_\delta$ is determined by the inner-product of the attribute vectors $\vec{v}$ and $\vec{x}$. The access structure S:=(M, ρ) accepts Γ if and only if $1^{\vec{}} \in$ span<$(M_i)_{\gamma(i)=1}$>.

<3-3. Secret Sharing Scheme>

A secret sharing scheme for the access structure S:=(M, ρ) will be described.

The secret sharing scheme is letting secret information be shared to render it nonsense shared information. For example, secret information s is let to be shared among 10 lumps to generate 10 pieces of shared information. Each of the 10 pieces of shared information does not have information on the secret information s. Hence, even when certain one piece of shared information is obtained, no information can be obtained on the secret information s. On the other hand, if all of the 10 pieces of shared information are obtained, the secret information s can be recovered.

Another secret sharing scheme is also available according to which even when all of the 10 pieces of shared information cannot be obtained, if one or more, but not all, (for example, 8 pieces) of shared information can be obtained, then the secret information s can be recovered. A case like this where the secret information s can be recovered using 8 out of 10 pieces of shared information will be called 8-out-of-10. That is, a case where the secret information s can be recovered using t out of it pieces of shared information will be called t-out-of-n. This t will be called a threshold.

Also, still another secret sharing scheme is available according to which when 10 pieces of shared information $d_1, \ldots, d_{10}$ are generated, the secret information s can be recovered if 8 pieces of shared information $d_1, \ldots, d_8$ are given, but cannot if 8 pieces of shared information $d_3, \ldots, d_{10}$ are given. Namely, there is a secret sharing scheme with which whether or not the secret information s can be recovered is controlled not only by the number of pieces of shared information obtained but also depending on the combination of the shared information.

FIG. 3 is an explanatory drawing of $s_0$. FIG. 4 is an explanatory drawing of $\vec{s}^T$.

Let a matrix M be a (L rows×r columns) matrix. Let $\vec{f}$ a column vector indicated in Formula 120.

$$\vec{f}^T := (f_1, \ldots f_r)^T \xleftarrow{U} \mathbb{F}_q^r \qquad \text{[Formula 120]}$$

Let $s_0$ indicated in Formula 121 be secret information to be shared.

$$s_0:=\vec{1}\cdot\vec{f}^T:=\Sigma_{k=1}^r f_k \qquad \text{[Formula 121]}$$

Let $\vec{s}^T$ indicated in Formula 122 be the vector of L pieces of shared information of $s_0$.

$$\vec{s}^T:=(s_1, \ldots s_L)^T:=M\cdot\vec{f}^T \qquad \text{[Formula 122]}$$

Let the shared information $s_i$ belong to ρ(i).

If the access structure S:=(M, ρ) accepts Γ, that is, $1^{\vec{}} \in$ span<$(M_i)_{\gamma(i)=1}$> for γ{1, ..., L}→{0. 1}, then there exist constants $\{\alpha_i \in F_q | i \in I\}$ such that $I \subseteq \{i \in \{1, \ldots, L\} | \gamma(i)=1\}$.

This is obvious from the explanation on FIG. 2 in that if there exist $\alpha_1$, $\alpha_2$, and $\alpha_4$ with which $\alpha_1(M_1)+\alpha_2(M_2)+\alpha_4(M_4)=1^{\vec{}}$, the span program $\hat{M}$ accepts an input sequence δ. Namely, if the span program $\hat{M}$ accepts an input sequence δ when there exist $\alpha_1$, $\alpha_2$, and $\alpha_4$ with which $\alpha_1(M_1)+\alpha_2(M_2)+\alpha_4(M_4)=1^{\vec{}}$, then there exist $\alpha_1$, $\alpha_2$, and $\alpha_4$ with which $\alpha_1(M_1)+\alpha_2(M_2)+\alpha_4(M_4)=1^{\vec{}}$.

Note Formula 123.

$$\Sigma_{i \in I}\alpha_i s_i:=s_0 \qquad \text{[Formula 123]}$$

Note that the constants $\{\alpha_i\}$ can be computed in time polynomial in the size of the matrix M.

With the functional encryption scheme according to this and the following embodiments, the access structure is constructed by applying the inner-product predicate and the secret sharing scheme to the span program, as described above. Therefore, access control can be designed freely by designing the matrix M in the span program and the attribute information x and the attribute information v (predicate information) in the inner-product predicate. Namely, access control can be designed with a very high degree of freedom. Designing of the matrix M corresponds to designing conditions such as the threshold of the secret sharing scheme.

For example, the attribute-based encryption scheme described above corresponds to a case, in the access structure in the functional encryption scheme according to this and the following embodiments, where designing of the inner-product predicate is limited to a certain condition. That is, when compared to the access structure in the functional encryption scheme according to this and the following embodiments, the access structure in the attribute-based encryption scheme has a lower degree of freedom in access control design because it lacks the degree of freedom in designing the attribute information x and the attribute information v (predicate information) in the inner-product predicate. More specifically, the attribute-based encryption scheme corresponds to a case where attribute information $\{\vec{x}_t\}_{t \in \{1, \ldots, d\}}$ and $\{\vec{v}_t\}_{t \in \{1, \ldots, d\}}$ are limited to two-dimensional vectors for the equality relation, for example, $\vec{x}_t:=(1, x_t)$ and $\vec{v}_t:=(v_t, -1)$.

The inner-product predicate encryption scheme described above corresponds to a case, in the access structure in the functional encryption scheme according to this and the following embodiments, where designing of the matrix M in the span program is limited to a certain condition. That is, when compared to the access structure in the functional encryption scheme according to this and the following embodiments, the access structure in the inner-product predicate encryption scheme has a lower degree of freedom in access control design because it lacks the degree of freedom in designing the matrix M in the span program. More specifically, the inner-product predicate encryption scheme corresponds to a case where the secret sharing scheme is limited to 1-out-of-1 (or d-out-of-d).

In particular, the access structure in the functional encryption scheme according to this and the following embodiments constitutes a non-monotone access structure that uses a non-monotone span program. Thus, the degree of freedom in access control designing improves.

More specifically, since the non-monotone span program includes a negative literal ($\neg p$), a negative condition can be set. For example, assume that First Company includes four departments of A, B, C, and D. Assume that access control is to be performed that only the users belonging to departments other than B department of First Company are capable of access (capable of decryption). In this case, if a negative condition cannot be set, a condition that "the user belongs to any one of A, C, and D departments of First Company" must be set. On the other hand, if a negative condition can be set, a condition that "the user is an employee of First Company and belongs to a department other than department B" can be set. Namely, since a negative condition can be set, natural condition setting is possible. Although the number of departments is small in this case, this scheme is very effective in a case where the number of departments is large.

<4. Basic Structure of Functional Encryption Scheme>

<4-1. Basic Structure of Unified-Policy Functional Encryption Scheme>

The structure of a unified-policy functional encryption scheme will be briefly described. Note that unified-policy means that policy is embedded in each of the decryption key and the ciphertext, that is, an access structure is embedded in each of the decryption key and the ciphertext.

The unified-policy functional scheme consists of four algorithms: Setup, KeyGen, Enc, and Dec.

(Setup)

A Setup algorithm is a randomized algorithm that takes as input a security parameter $\lambda$, and an attribute format $\vec{n} := ((d^{KP}; n_t^{KP}, u_t^{KP}, w_t^{KP}, z_t^{KP} (t=1, \ldots, d^{KP}))$ and $(d^{CP}; n_t^{CP}, u_t^{CP}, w_t^{KP}, z_t^{CP} (t=1, \ldots, d^{CP})))$, and outputs public parameters pk and a master key sk.

(KeyGen)

A KeyGen algorithm is a randomized algorithm that takes as input an access structure $S^{KP} := (M^{KP}, \rho^{KP})$, an attribute set $\Gamma^{CP} := \{(t, \vec{X}_t^{CP}) | \vec{x}_t^{CP} \in F_q^{ntCP} \setminus \{\vec{0}\}, 1 \le t \le d^{CP}\}$, the public parameters pk, and the master key sk, and outputs a decryption key $sk_{(SKP,\Gamma CP)}$.

(Enc)

An Enc algorithm is a randomized algorithm that takes as input a message m, an attribute set $\Gamma^{KP} := \{(t, \vec{x}_t^{KP}) | \vec{x}_t^{KP} \in F_q^{ntKP} \setminus \{\vec{0}\}, 1 \le t \le d^{KP}\}$, an access structure $S^{CP} := (M^{CP}, \rho^{CP})$, and the public parameters pk, and outputs encrypted data $ct_{(\Gamma KP, SCP)}$.

(Dec)

A Dec algorithm is an algorithm that takes as input the encrypted data $ct_{(\Gamma KP, SCP)}$ encrypted under the attribute set and an access structure $(\Gamma^{KP}, S^{CP})$, the decryption key $sk_{(SKP,\Gamma CP)}$ for the access structure and an attribute set $(S^{KP}, \Gamma^{CP})$, and the public parameters pk, and outputs either the message m (plaintext information) or distinguished symbol $\bot$.

A unified-policy functional encryption scheme holds $m = \text{Dec}(pk, sk_{(SKP, \Gamma CP)}, ct_{(\Gamma KP, SCP)})$ with overwhelmingly high probability for all public parameters pk and master keys sk indicated in Formula 124, all access structures $S^{KP}$, all attribute sets $\Gamma^{CP}$, all decryption keys $sk_{(SKP, \Gamma CP)}$ indicated in Formula 125, all messages m, all attribute sets $\Gamma^{KP}$, all access structures $S^{CP}$, and all encrypted data $ct_{(\Gamma KP, SCP)}$ indicated in Formula 126, if the access structure $S^{KP}$ accepts the attribute set $\Gamma^{KP}$ and the access structure $S^{CP}$ accepts the attribute set $\Gamma^{CP}$. Namely, the message m can be obtained if the Dec algorithm is executed by inputting the public parameters pk, the decryption keys $sk_{(SKP, \Gamma CP)}$, and the encrypted data $ct_{(\Gamma KP, SCP)}$.

$$(pk, sk) \xleftarrow{R} \text{Setup}(1^\lambda, \vec{n}) \qquad \text{[Formula 124]}$$

$$sk_{(S^{KP}, \Gamma^{CP})} \xleftarrow{R} \text{KeyGen}(pk, sk, S^{KP}, \Gamma^{CP}) \qquad \text{[Formula 125]}$$

$$ct_{(\Gamma^{KP}, S^{CP})} \xleftarrow{R} \text{Enc}(pk, m, \Gamma^{KP}, S^{CP}) \qquad \text{[Formula 126]}$$

<4-2. Cryptographic Processing System 10>

A cryptographic processing system 10 that executes the algorithms of the unified-policy functional encryption scheme described above will be described.

Figure 5:
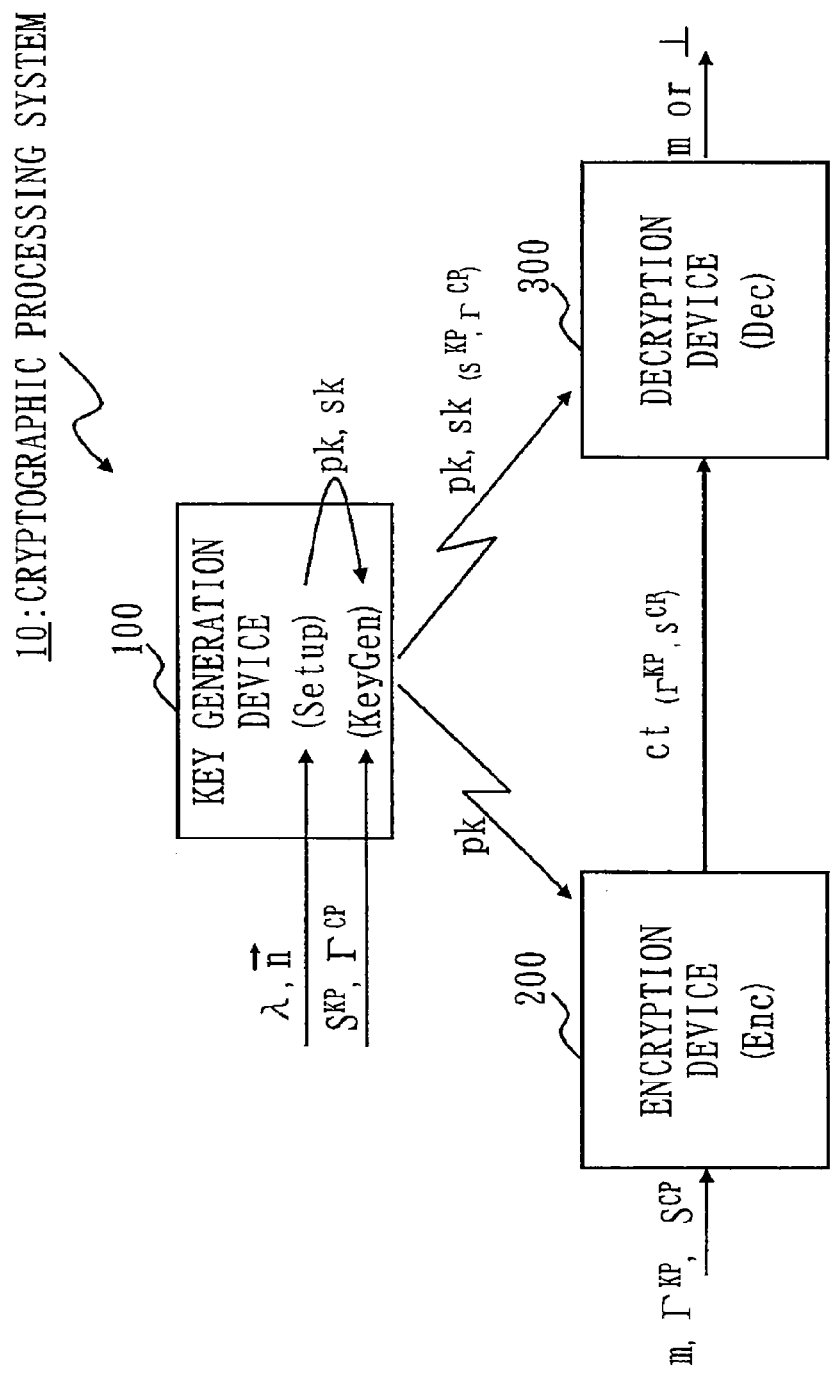
FIG. 5 is a configuration diagram of a cryptographic processing system 10 which executes a unified-policy functional encryption scheme.

FIG. 5 is a configuration diagram of the cryptographic processing system 10 which executes the unified-policy functional encryption scheme.

The cryptographic processing system 10 is provided with a key generation device 100, an encryption device 200, and a decryption device 300.

The key generation device 100 executes the Setup algorithm by taking as input a security parameter $\lambda$ and an attribute format $\vec{n} := ((d^{KP}; n_t^{KP}, u_t^{KP}, w_t^{KP}, z_t^{KP} (t=1, \ldots, d^{KP}))$ and $(d^{CP}; n_t^{CP}, u_t^{CP}, w_t^{CP}, z_t^{CP} (t=1, \ldots, d^{CP})))$, and generates public parameters pk and a master key sk. The key generation device 100 publicizes the generated public parameters pk. The key generation device 100 also executes the KeyGen algorithm by taking as input an access structure $S^{KP}$, the attribute set $\Gamma^{CP}$, the public parameters pk, and the master key sk, generates a decryption key $sk_{(SKP,\Gamma CP)}$, and distributes the decryption key $sk_{(SKP,\Gamma CP)}$ to the decryption device 300 in secrecy.

The encryption device 200 executes the Enc algorithm by taking as input a message m, an attribute set $\Gamma^{KP}$, an access structure $S^{CP}$, and the public parameters pk, and generates encrypted data $ct_{(\Gamma KP, SCP)}$. The encryption device 200 transmits the generated encrypted data $ct_{(\Gamma KP, SCP)}$ to the decryption device 300.

The decryption device 300 executes the Dec algorithm by taking as input the public parameters pk, the decryption key $sk_{(SKP,\Gamma CP)}$, and the encrypted data $ct_{(\Gamma KP, SCP)}$, and outputs a message m or distinguished symbol $\bot$.

<4-3. Unified-Policy Functional Encryption Scheme and Cryptographic Processing System 10 in Detail>

The unified-policy functional encryption scheme, and the function and operation of the cryptographic processing system 10 which executes the unified-policy functional encryption scheme will be described with reference to FIGS. 6 to 12.

Figure 6:
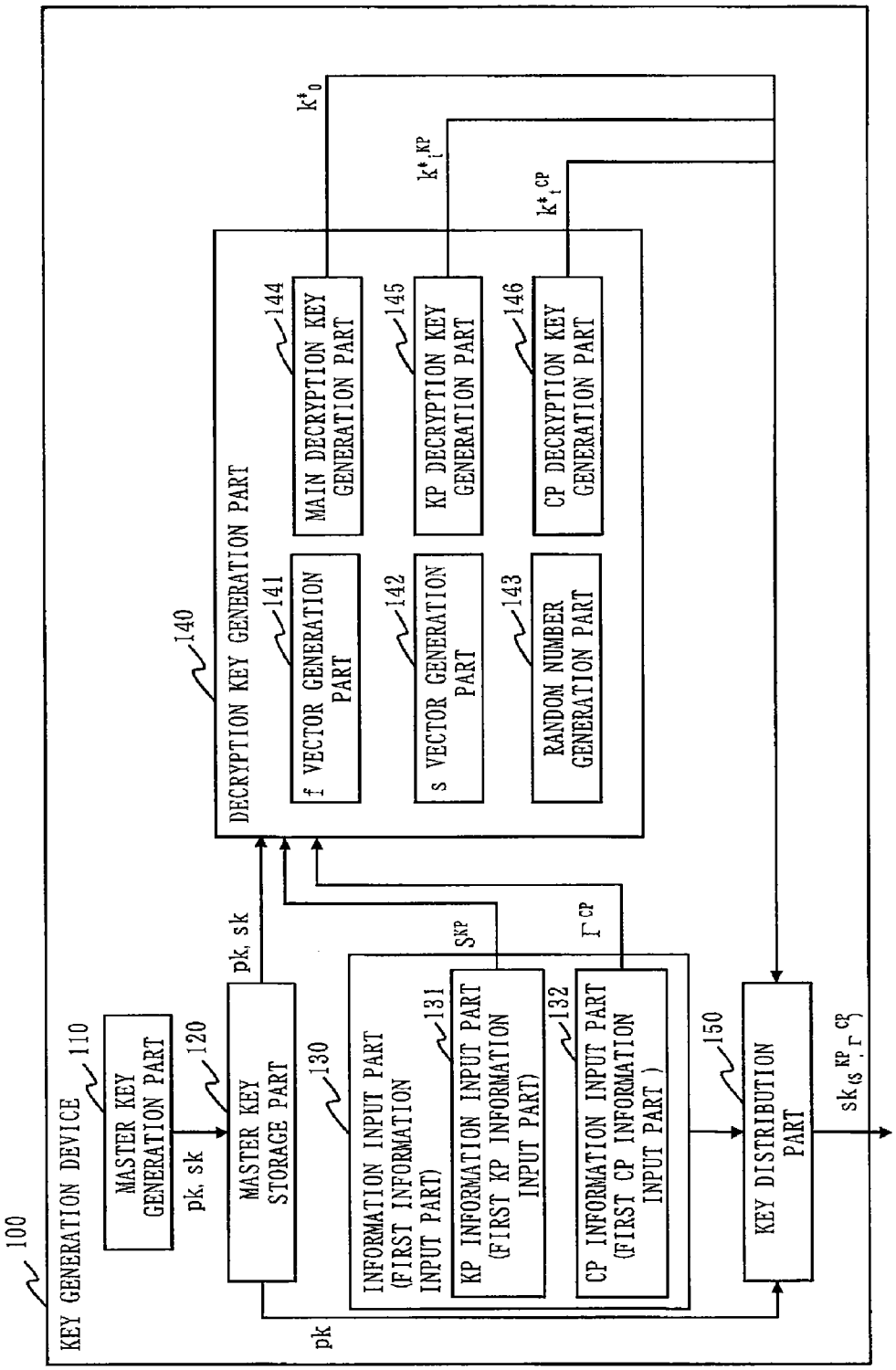
FIG. 6 is a function block diagram showing the function of a key generation device 100.
Figure 7:
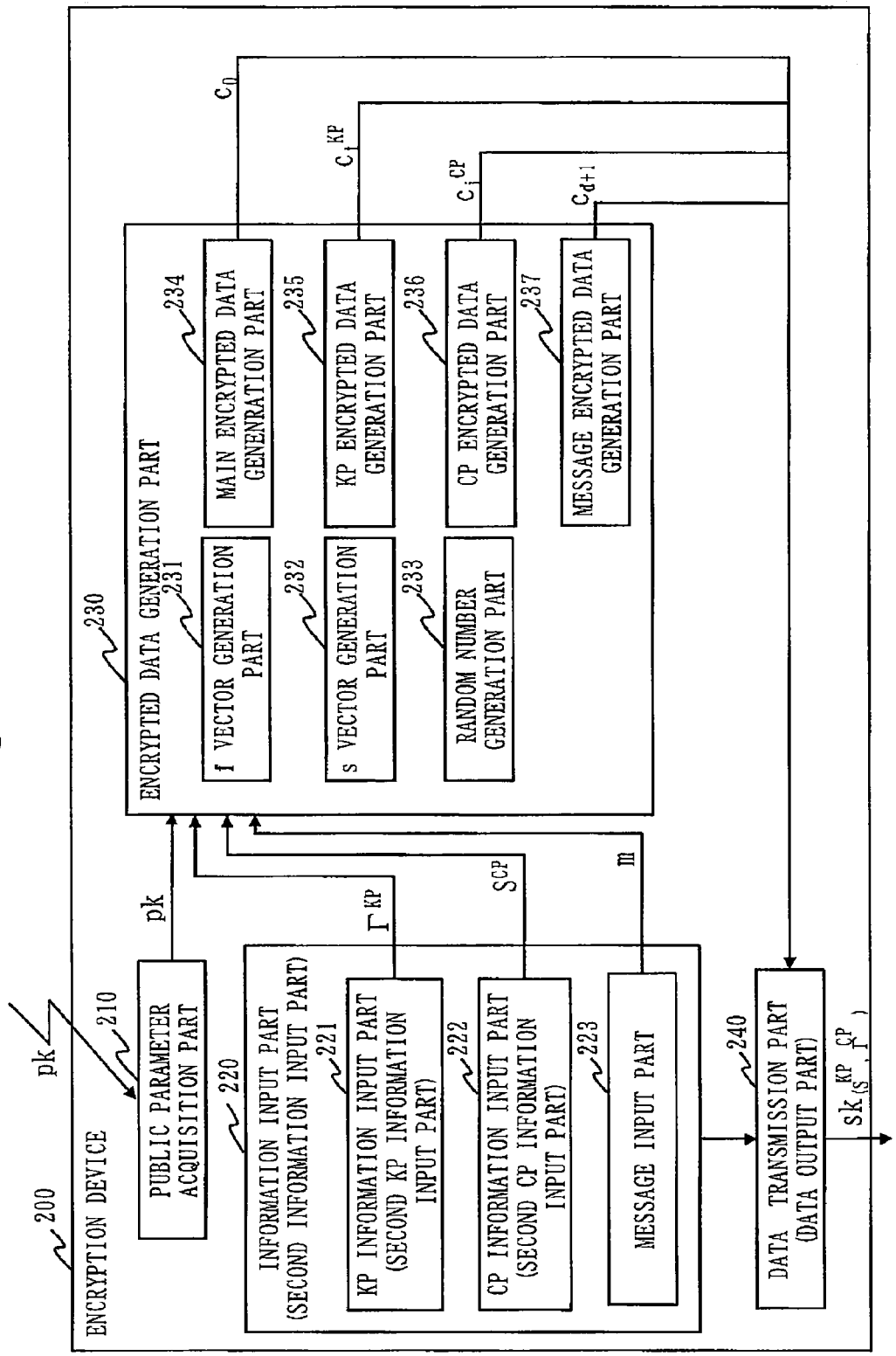
FIG. 7 is a function block diagram showing the function of an encryption device 200.
Figure 8:
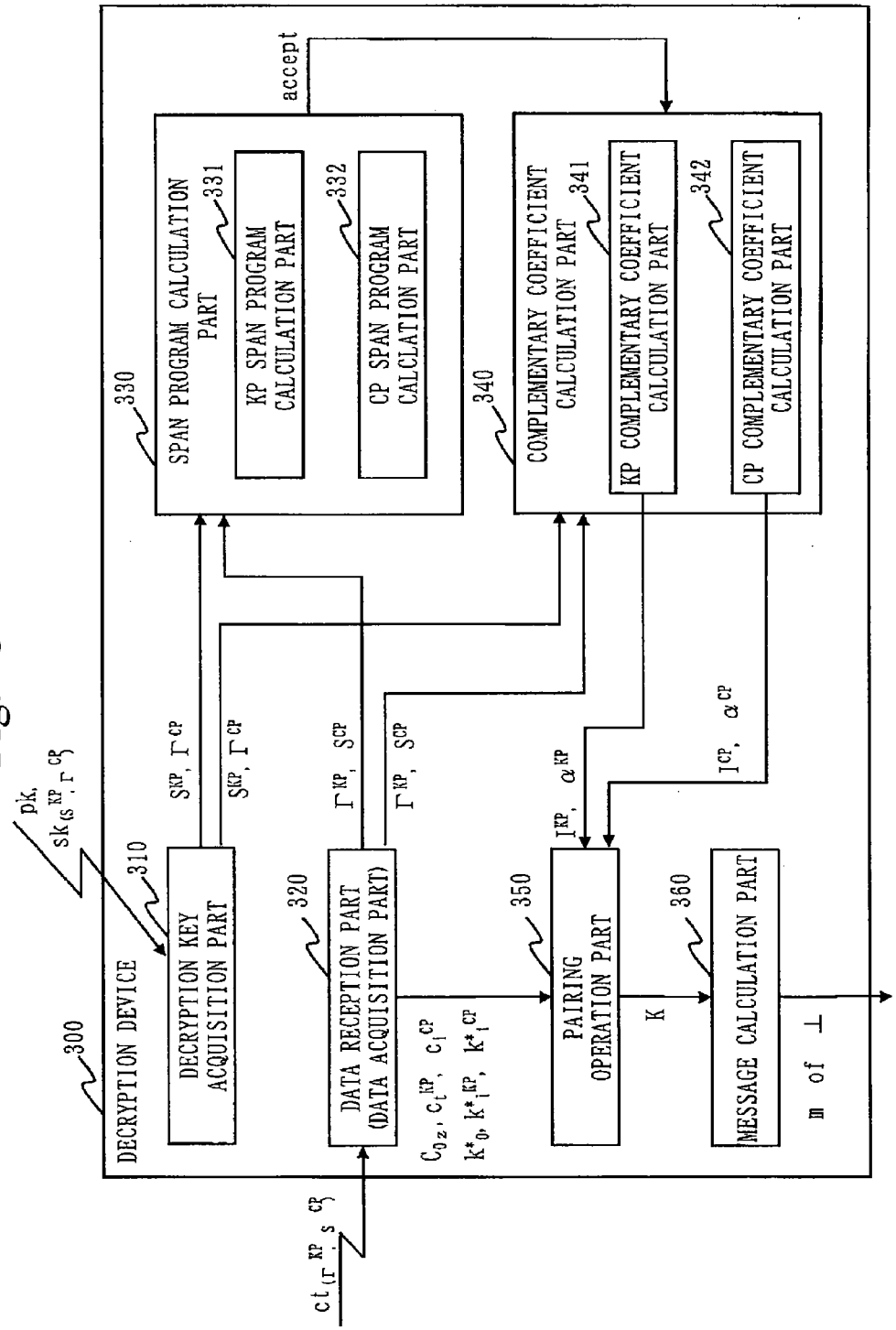
FIG. 8 is a function block diagram showing the function of a decryption device 300.

FIG. 6 is a function block diagram showing the function of the key generation device 100. FIG. 7 is a function block diagram showing the function of the encryption device 200. FIG. 8 is a function block diagram showing the function of the decryption device 300.

Figure 9:
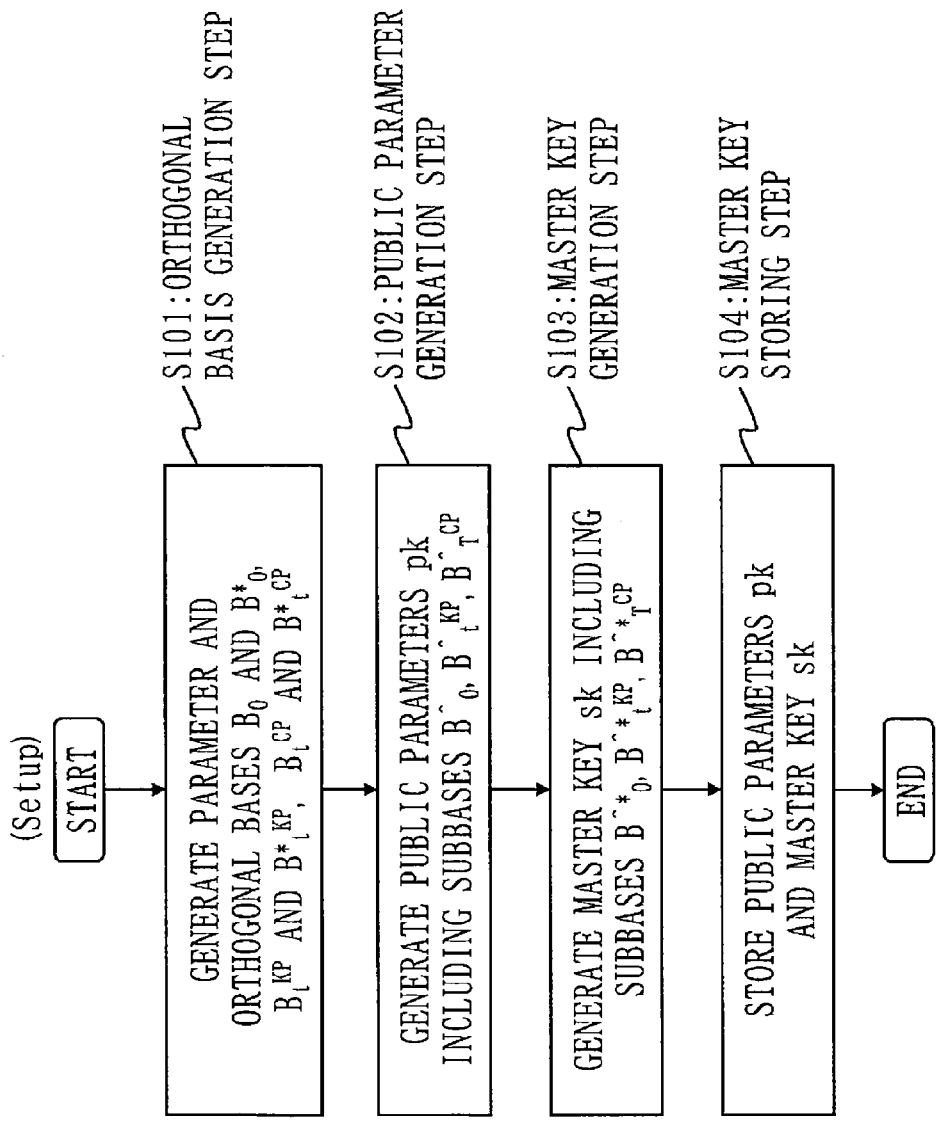
FIG. 9 is a flowchart showing the process of Setup algorithm.
Figure 10:
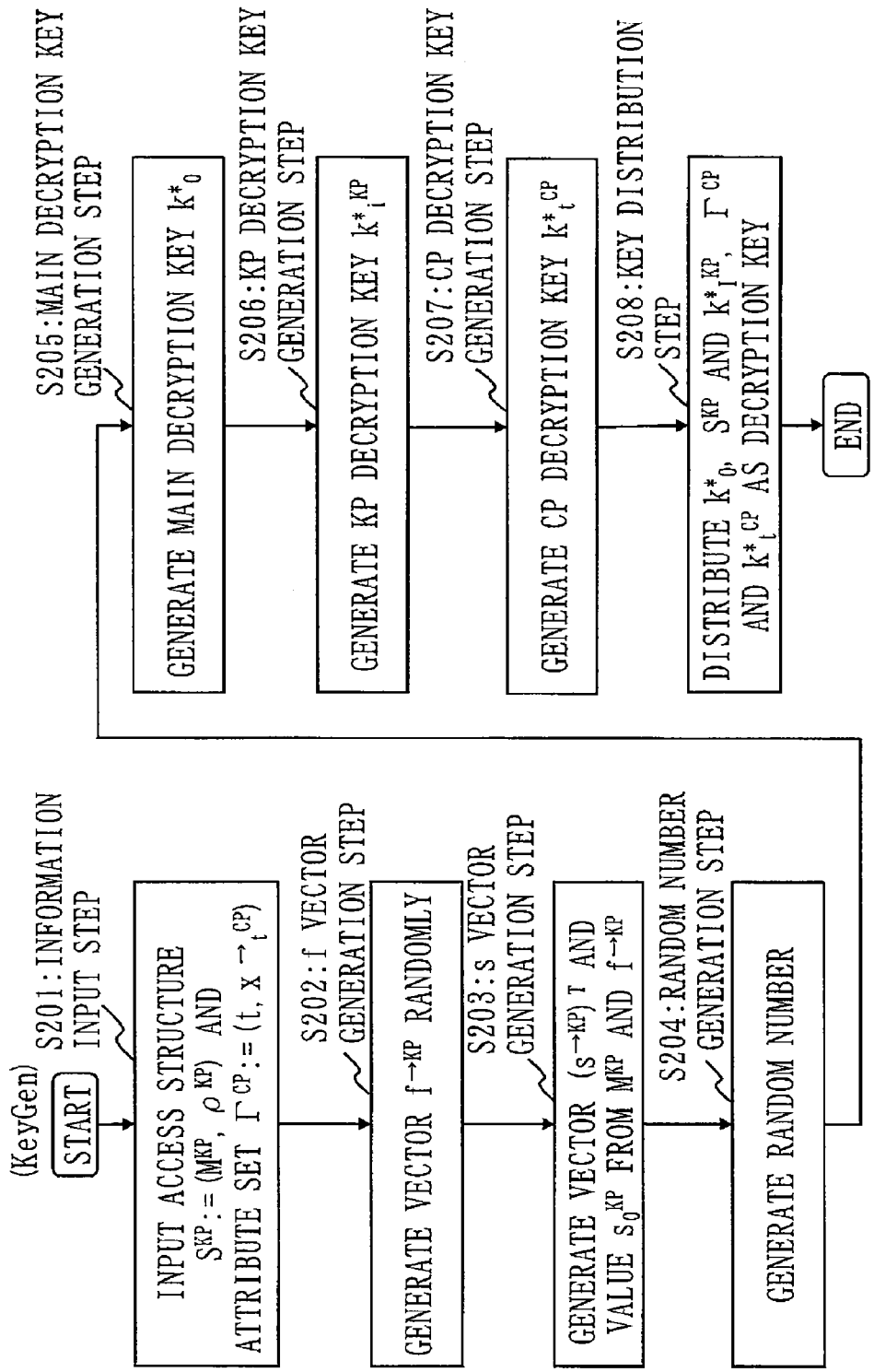
FIG. 10 is a flowchart showing the process of KeyGen algorithm.
Figure 11:
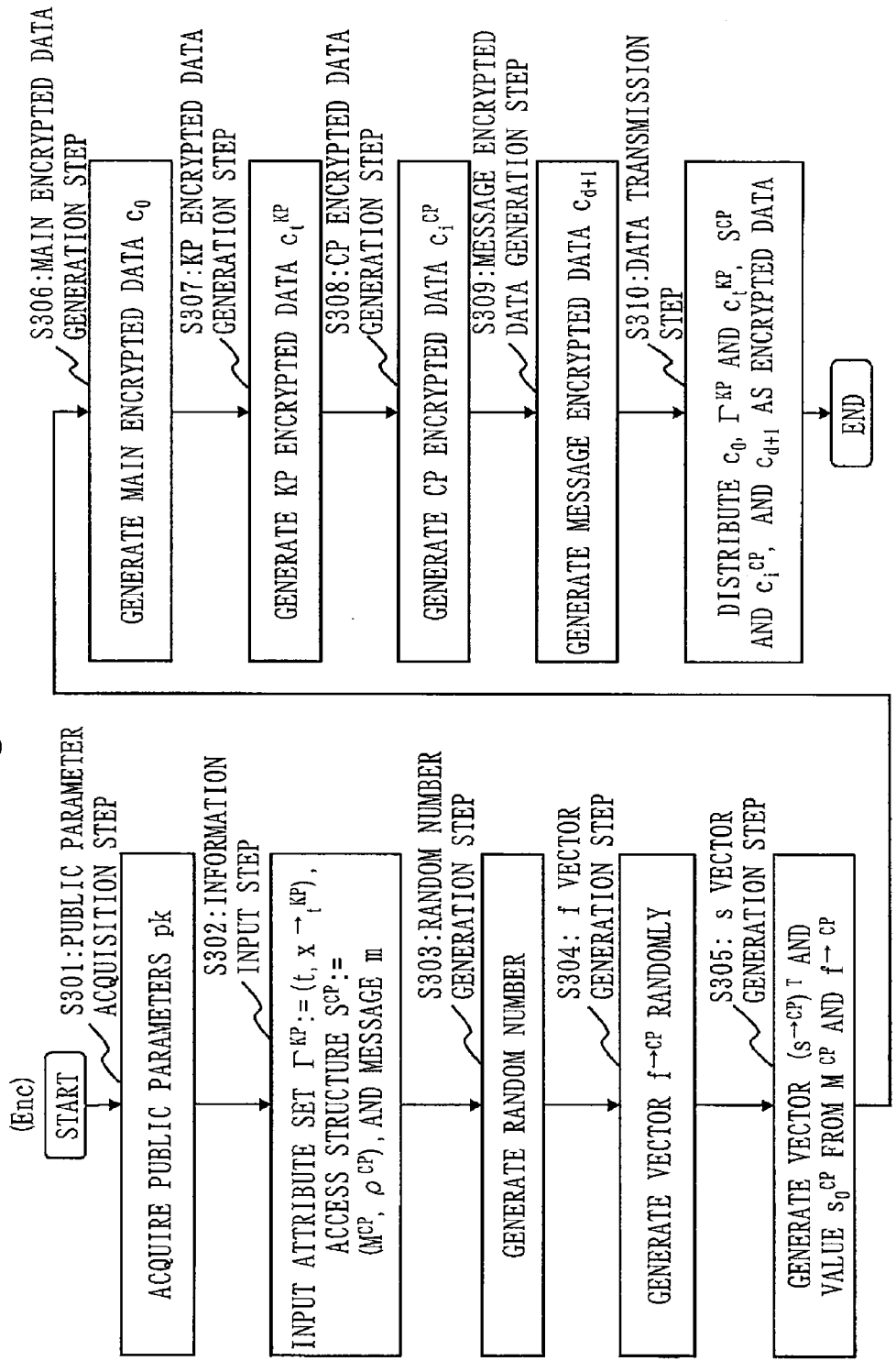
FIG. 11 is a flowchart showing the process of Enc algorithm.
Figure 12:
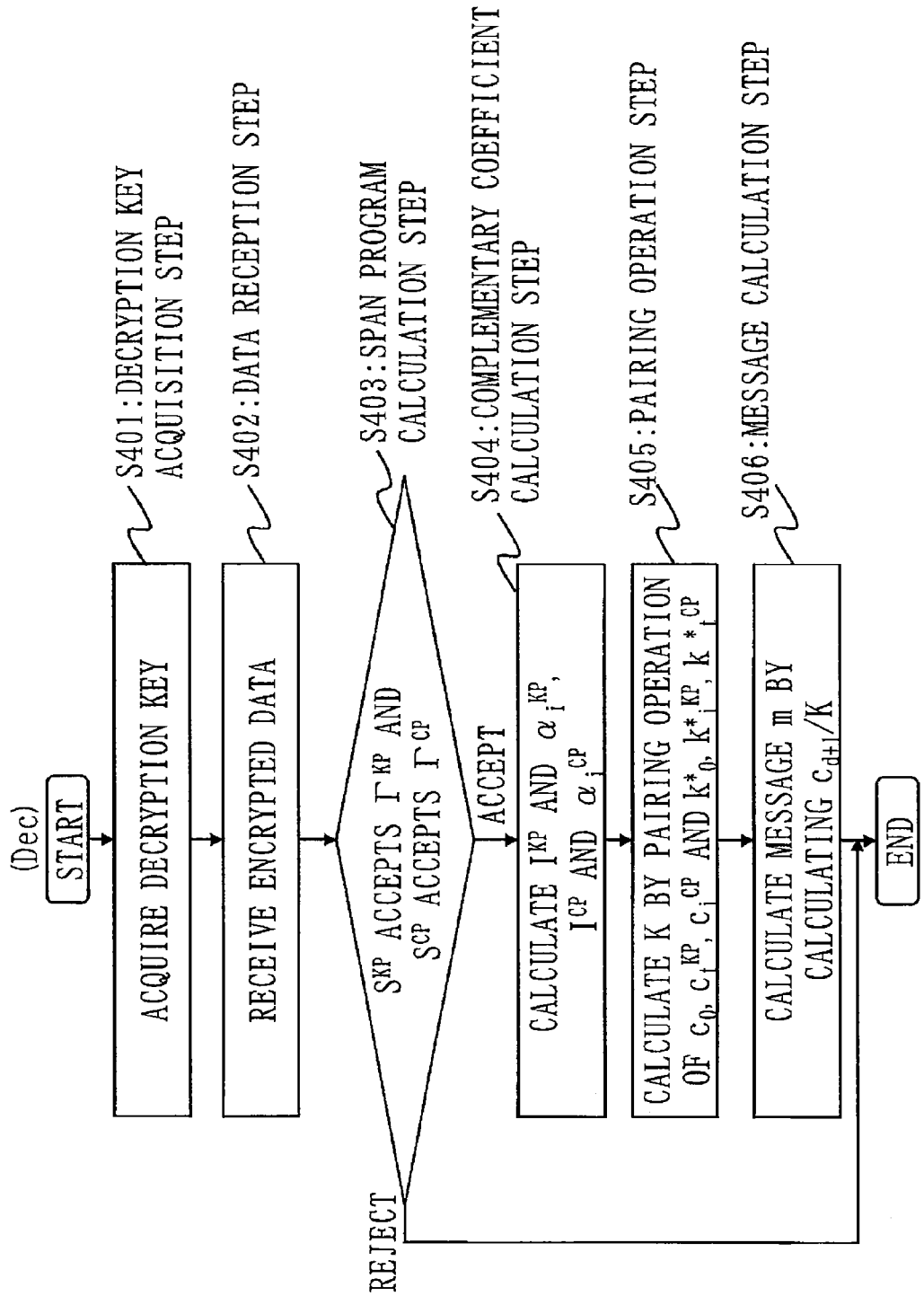
FIG. 12 is a flowchart showing the process of Dec algorithm.

FIGS. 9 and 10 are flowcharts showing the operation of the key generation device 100. Note that FIG. 9 is a flowchart showing the process of the Setup algorithm, and that FIG. 10 is a flowchart showing the process of the KeyGen algorithm. FIG. 11 is a flowchart showing the operation of the encryption device 200 and the process of the Enc algorithm. FIG. 12 is a flowchart showing the operation of the decryption device 300 and the process of the Dec algorithm.

Normalization is performed to satisfy $x_{t,1}^{KP}:=1$ and $x_{t,1}^{CP}:=1$. If $x_{t,1}^{KP}$ and $x_{t,1}^{CP}$ are not normalized, they may be normalized as $(1/x_{t,1}^{KP}) \cdot x_{t,1}^{KP}$ and $(1/x_{t,1}^{CP}) \, x_{t,1}^{CP}$. In this case, assume that $x_{t,i}^{KP} \neq 0$ and $x_{t,i}^{CP} \neq 0$.

The function and operation of the key generation device 100 will be described.

As shown in FIG. 6, the key generation device 100 is provided with a master key generation part 110, a master key storage part 120, an information input part 130 (first information input part), a decryption key generation part 140, and a key distribution part 150.

The information input part 130 is provided with a KP information input part 131 (first KP information input part) and a CP information input part 132 (first CP information input part). The decryption key generation part 140 is provided with an f vector generation part 141, an s vector generation part 142, a random number generation part 143, a main decryption key generation part 144, a KP decryption key generation part 145, and a CP decryption key generation part 146.

The process of the Setup algorithm will be described first with reference to FIG. 9.

(S101: Orthogonal Basis Generation Step)

The master key generation part 110 calculates Formula 127 with the processing device to randomly generate $param_{\vec{n}}$, bases $\mathbb{B}_0$ and $\mathbb{B}^*_0$, bases $\mathbb{B}_t^{KP}$ and $\mathbb{B}^{*KP}_t$ for each integer $t=1, \ldots, d^{KP}$, and bases $\mathbb{B}_t^{CP}$ and $\mathbb{B}^{*CP}_t$ for each integer $t=1, \ldots, D^{CP}$.

[Formula 127]

$$\mathcal{G}_{ob}^{up}(1^\lambda, \vec{n} := ((d^{KP}; n_t^{KP}, u_t^{KP}, w_t^{KP}, z_t^{KP}(t=1,\ldots,d^{KP})),$$
$$(d^{CP}; n_t^{CP}, u_t^{CP}, w_t^{CP}, z_t^{CP}(t=1,\ldots,d^{CP}))):$$

$$param_\mathbb{G} := (q, \mathbb{G}, \mathbb{G}_T, g, e) \xleftarrow{R} \mathcal{G}_{bpg}(1^\lambda),$$

$$\psi \xleftarrow{U} \mathbb{F}_q^\times,$$

$$N_0 := 2 + u_0 + 1 + w_0 + z_0,$$

$$N_t^{KP} := n_t^{KP} + u_t^{KP} + w_t^{KP} + z_t^{KP}$$

for $t=1, \ldots, d^{KP}$, $$N_t^{CP} := n_t^{CP} + u_t^{CP} + w_t^{CP} + z_t^{CP}$$

for $t=1, \ldots, d^{CP}$, $$param_{\mathbb{V}_0} :=$$

$$(q, \mathbb{V}_0, \mathbb{G}_T, \mathbb{A}_0, e) := \mathcal{G}_{dpvs}(1^\lambda, N_0, param_\mathbb{G}),$$

$$X_0 := (\chi_{0,i,j})_{i,j} \xleftarrow{U} GL(N_0, \mathbb{F}_q),$$

$$(\nu_{0,i,j})_{i,j} := \psi \cdot (X_0^T)^{-1},$$

$$b_{0,i} := (\chi_{0,i,1}, \ldots, \chi_{0,i,N_0})_{\mathbb{A}_0},$$

$$\mathbb{B}_0 := (b_{0,1}, \ldots, b_{0,N_0}),$$

$$b^*_{0,i} := (\nu_{0,i,1}, \ldots, \nu_{0,i,N_0})_{\mathbb{A}_0},$$

-continued $$\mathbb{B}^*_0 := (b^*_{0,i}, \ldots, b^*_{0,N_0}),$$

for $t=1, \ldots, d^{KP}$, $$param_{\mathbb{V}_t^{KP}} :=$$

$$(q, \mathbb{V}_t^{KP}, \mathbb{G}_T, \mathbb{A}_t^{KP}, e) := \mathcal{G}_{dpvs}(1^\lambda, N_t^{KP}, param_\mathbb{G}),$$

$$X_t^{KP} := (\chi_{t,i,j}^{KP})_{i,j} \xleftarrow{U} GL(N_t^{KP}, \mathbb{F}_q),$$

$$(\nu_{t,i,j}^{KP})_{i,j} := \psi \cdot ((X_t^{KP})^T)^{-1},$$

$$b_{t,i}^{KP} := (\chi_{t,i,1}^{KP}, \ldots, \chi_{t,i,N_t^{KP}}^{KP})_{\mathbb{A}_t^{KP}},$$

$$\mathbb{B}_t^{KP} := (b_{t,1}^{KP}, \ldots, b_{t,N_t^{KP}}^{KP}),$$

$$b^{*KP}_{t,i} := (\nu_{t,i,1}^{KP}, \ldots, \nu_{t,i,N_t^{KP}}^{KP})_{\mathbb{A}_t^{KP}},$$

$$\mathbb{B}^{*KP}_t := (b^{*KP}_{t,1}, \ldots, b^{*KP}_{t,N_t^{KP}}),$$

for $t=1, \ldots, d^{CP}$, $$param_{\mathbb{V}_t^{CP}} :=$$

$$(q, \mathbb{V}_t^{CP}, \mathbb{G}_T, \mathbb{A}_t^{CP}, e) := \mathcal{G}_{dpvs}(1^\lambda, N_t^{CP}, param_\mathbb{G}),$$

$$X_t^{CP} := (\chi_{t,i,j}^{CP})_{i,j} \xleftarrow{U} GL(N_t^{CP}, \mathbb{F}_q),$$

$$(\nu_{t,i,j}^{CP})_{i,j} := \psi \cdot ((X_t^{CP})^T)^{-1},$$

$$b_{t,i}^{CP} := (\chi_{t,i,1}^{CP}, \ldots, \chi_{t,i,N_t^{CP}}^{CP})_{\mathbb{A}_t^{CP}},$$

$$\mathbb{B}_t^{CP} := (b_{t,1}^{CP}, \ldots, b_{t,N_t^{CP}}^{CP}),$$

$$b^{*CP}_{t,i} := (\nu_{t,i,1}^{CP}, \ldots, \nu_{t,i,N_t^{CP}}^{CP})_{\mathbb{A}_t^{CP}},$$

$$\mathbb{B}^{*CP}_t := (b^{*CP}_{t,1}, \ldots, b^{*CP}_{t,N_t^{CP}}),$$

$$g_T := e(g, g)^\psi,$$

$$param_{\vec{n}} := \Big(param_{\mathbb{V}_0}, \{param_{\mathbb{V}_t^{KP}}\}_{t=1,\ldots,d^{KP}},$$

$$\{param_{\mathbb{V}_t^{CP}}\}_{t=1,\ldots,d^{CP}}, g_T\Big)$$

return $\Big(param_{\vec{n}}, \{\mathbb{B}_0, \mathbb{B}^*_0\}, \{\mathbb{B}_t^{KP}, \mathbb{B}_t^{*KP}\}_{t=1,\ldots,d^{KP}},$ $$\{\mathbb{B}_t^{CP}, \mathbb{B}_t^{*CP}\}_{t=1,\ldots,d^{CP}}\Big).$$

Namely, the master key generation part 110 executes the following processes.

First, with the input device, the master key generation part 110 takes as input the security parameter $\lambda(1^\lambda)$ and the attribute format $\vec{n}:=((d^{KP}; n_t^{KP}, u_t^{KP}, w_t^{KP}, z_t^{KP} (t=1,\ldots,d^{KP}))$ and $(d^{CP}; n_t^{CP}, u_t^{CP}, w_t^{CP}, z_t^{CP} (t=1,\ldots,d^{CP})))$, where $d^{KP}$ is an integer of 1 or more, and $n_t^{KP}, u_t^{KP}, w_t^{KP}$, and $z_t^{KP}$ are each an integer of 1 or more for each integer $t=1,\ldots,d^{KP}$; and is an integer of 1 or more, and $n_t^{CP}, u_t^{CP}, w_t^{CP}$, and $z_t^{CP}$ are each an integer of 1 or more for each integer $t=1,\ldots,d^{CP}$.

Then, with the processing device, the master key generation part 110 calculates Formula 128.

[Formula 128]

$$param_\mathbb{G} := (q, \mathbb{G}, \mathbb{G}_T, g, e) \xleftarrow{R} \mathcal{G}_{bpg}(1^\lambda)$$

Namely, the master key generation part 110 executes algorithm $\mathcal{G}_{bpg}$ by taking as input the security parameter $\lambda(1^\lambda)$, and generates the value of a parameter $param_G:=(q, G, G_T, g, e)$ of the bilinear pairing group.

Then, with the processing device, the master key generation part 110 calculates formula 129.

$$\psi \xleftarrow{U} \mathbb{F}_q^X, \qquad \text{[Formula 129]}$$

$$N_0 := 2 + u_0 + 1 + w_0 + z_0,$$

$$N_t^{KP} := n_t^{KP} + u_t^{KP} + w_t^{KP} + z_t^{KP}$$

for $t = 1, \ldots, d^{KP}$, $$N_t^{CP} := n_t^{CP} + u_t^{CP} + w_t^{CP} + z_t^{CP}$$

for $t = 1, \ldots, d^{CP}$

Namely, the master key generation part 110 generates a random number $\psi$. Also, the master key generation part 110 sets $2+u_0+1+w_0+z_0$ in $N_0$, $n_t^{KP}+u_t^{KP}+w_t^{KP}+z_t^{KP}$ in $N_t^{KP}$ for each integer $t=1, \ldots, d^{KP}$, and $n_t^{CP}+u_t^{CP}+w_t^{CP}+z_t^{CP}$ for each integer $t=1, \ldots, d^{CP}$, where $u_0$, $w_0$, and $z_0$ are each an integer of 1 or more.

Then, with the processing device, the master key generation part 110 calculates Formula 130.

$$param_{\mathbb{V}_0} := \qquad \text{[Formula 130]}$$

$$(q, \mathbb{V}_0, \mathbb{G}_T, \mathbb{A}_0, e) := \mathcal{G}_{dpvs}(1^\lambda, N_0, param_{\mathbb{G}}),$$

$$X_0 := (\chi_{0,i,j})_{i,j} \xleftarrow{U} GL(N_0, \mathbb{F}_q),$$

$$(v_{0,i,j})_{i,j} := \psi \cdot (X_0^T)^{-1},$$

$$b_{0,i} := (\chi_{0,i,1}, \ldots, \chi_{0,i,N_0})_{\mathbb{A}_0},$$

$$\mathbb{B}_0 := (b_{0,1}, \ldots, b_{0,N_0}),$$

$$b_{0,i}^* := (v_{0,i,1}, \ldots, v_{0,i,N_0})_{\mathbb{A}_0},$$

$$\mathbb{B}_0^* := (b_{0,i}^*, \ldots, b_{0,N_0}^*)$$

Namely, the master key generation part 110 executes algorithm $\mathcal{G}_{dpvs}$ by taking as input the security parameter $\lambda(1^\lambda)$ which is inputted, $N_0$ which is set, and the value of $param_G:=(q, G, G_T, g, e)$ which is generated, and generates the value of parameter $param_{V0}:=(q, V_0, G_T, A_0, e)$ of the dual pairing vector spaces.

Also, the master key generation part 110 takes as input $N_0$ which is set, and $F_q$, and generates linear transformation $X_0:=(x_{0,i,j})_{i,j}$ randomly. Note that GL stands for General Linear. Namely, GL is a general linear group, a set of square matrices in which the determinant is not 0, and a group with respect to multiplication. Note that $(x_{0,i,j})_{i,j}$ signifies a matrix concerning the suffixes i and j of the matrix $x_{0,i,j}$ where i, j = $1, \ldots, N_0$.

Also, based on the random number $\psi$ and linear transformation $x_0$, the master key generation part 110 generates $(v_{0,i,j})_{i,j}:=\psi \cdot (x_0^T)^{-1}$. As $(x_{0,i,j})_{i,j}$ does, $(v_{0,i,j})_{i,j}$ signifies a matrix concerning the suffices i and j of the matrix $v_{0,i,j}$ where i, j=$1, \ldots, N_0$.

Then, based on the linear transformation $x_0$, the master key generation part 110 generates the basis $B_0$ from the canonical basis $A_0$. Likewise, based on $(v_{0,i,j})_{i,j}$, the master key generation part 110 generates the basis $B^*_0$ from the canonical basis $A_0$.

Then, with the processing device, the master key generation part 110 calculates Formula 131.

for $t = 1, \ldots, d^{KP}$, [Formula 131]

$$param_{\mathbb{V}_t^{KP}} :=$$

$$(q, \mathbb{V}_t^{KP}, \mathbb{G}_T, \mathbb{A}_t^{KP}, e) := \mathcal{G}_{dpvs}(1^\lambda, N_t^{KP}, param_{\mathbb{G}}),$$

$$X_t^{KP} := (\chi_{t,i,j}^{KP})_{i,j} \xleftarrow{U} GL(N_t^{KP}, \mathbb{F}_q),$$

$$(v_{t,i,j}^{KP})_{i,j} := \psi \cdot ((X_t^{KP})^T)^{-1},$$

$$b_{t,i}^{KP} := (\chi_{t,i,1}^{KP}, \ldots, \chi_{t,i,N_t^{KP}}^{KP})_{\mathbb{A}_t^{KP}},$$

$$\mathbb{B}_t^{KP} := (b_{t,1}^{KP}, \ldots, b_{t,N_t^{KP}}^{KP}),$$

$$b_{t,i}^{*KP} := (v_{t,i,1}^{KP}, \ldots, v_{t,i,N_t^{KP}}^{KP})_{\mathbb{A}_t^{KP}},$$

$$\mathbb{B}_t^{*KP} := (b_{t,1}^{*KP}, \ldots, b_{t,N_t^{KP}}^{*KP})$$

Namely, the master key generation part 110 executes the following processes for each integer $t=1, \ldots, d^{KP}$.

The master key generation part 110 executes algorithm $\mathcal{G}_{dpvs}$ by taking as input the security parameter $\lambda(1^\lambda)$ which is inputted, $N_t^{KP}$ which is set, and the value of $param_G:=(q, G, G_T, g, e)$ which is generated, and generates the value of parameter $param_{VtKP}:=(q, G_T, A_t^{KP}, e)$ of the dual pairing vector spaces.

Also, the master key generation part 110 takes as input $N_t^{KP}$ which is set, and $F_q$, and generates linear transformation $x_t^{KP}:=(x_{t,i,j}^{KP})_{i,j}$ randomly. Note that $(x_{t,i,j}^{KP})_{i,j}$ randomly. Note that $(x_{t,i,j}^{KP})_{i,j}$ signifies a matrix concerning the suffixes i and j of the matrix $x_{t,i,j}^{KP}$ where i, j=$1, \ldots, N_t^{KP}$.

Also, based on the random number w and linear transformation $x_t^{KP}$, the master key generation part 110 generates $(v_{t,i,j}^{KP})_{i,j}:=\psi((x_t^{KP})^T)-1$. As $(x_{t,i,j}^{KP})_{i,j}$ does, $(v_{t,i,j}^{KP})_{i,j}$ signifies a matrix concerning the suffixes i and j of the matrix $v_{t,i,j}^{KP}$ where i, j=1, $N_t^{KP}$.

Then, based on the linear transformation $x_t^{KP}$, the master key generation part 110 generates the basis $B_t^{KP}$ from the canonical basis $A_t^{KP}$. Likewise, based on $(v_{t,i,j}^{KP})_{i,j}$, the master key generation part 110 generates the basis $B^*_t^{KP}$ from the canonical basis $A_t^{KP}$.

Then, with the processing device, the master key generation part 110 calculates Formula 132.

for $t = 1, \ldots, d^{CP}$, [Formula 132]

$$param_{\mathbb{V}_t^{CP}} :=$$

$$(q, \mathbb{V}_t^{CP}, \mathbb{G}_T, \mathbb{A}_t^{CP}, e) := \mathcal{G}_{dpvs}(1^\lambda, N_t^{CP}, param_{\mathbb{G}}),$$

$$X_t^{CP} := (\chi_{t,i,j}^{CP})_{i,j} \xleftarrow{U} GL(N_t^{CP}, \mathbb{F}_q),$$

$$(v_{t,i,j}^{CP})_{i,j} := \psi \cdot ((X_t^{CP})^T)^{-1},$$

$$b_{t,i}^{CP} := (\chi_{t,i,1}^{CP}, \ldots, \chi_{t,i,N_t^{CP}}^{CP})_{\mathbb{A}_t^{CP}},$$

$$\mathbb{B}_t^{CP} := (b_{t,1}^{CP}, \ldots, b_{t,N_t^{CP}}^{CP}),$$

$$b_{t,i}^{*CP} := (v_{t,i,1}^{CP}, \ldots, v_{t,i,N_t^{CP}}^{CP})_{\mathbb{A}_t^{CP}},$$

$$\mathbb{B}_t^{*CP} := (b_{t,1}^{*CP}, \ldots, b_{t,N_t^{CP}}^{*CP})$$

Namely, the master key generation part 110 executes the following processes for each integer $t=1, \ldots, d^{CP}$.

The master key generation part 110 executes algorithm $\mathcal{G}_{dpvs}$ by taking as input the security parameter $\lambda(1^\lambda)$ which is inputted, $N_t^{CP}$ which is set; and the value of $param_G:=(q, G, G_T, g, e)$ which is generated, and generates the value of parameter $param_{vtCP}(q, v_t^{CP}, G_T, A_t^{CP}, e)$ of the dual pairing vector spaces.

Also, the master key generation part 110 takes as input $N_t^{CP}$ which is set, and $F_q$, and generates linear transformation $X_t^{CP} := (x_{t,i,j}^{CP})_{i,j}$ randomly. Note that $(x_{t,i,j}^{CP})_{i,j}$ signifies a matrix concerning the suffixes i and j of the matrix $x_{t,i,j}^{CP}$ where $i, j = 1, \ldots, N_t^{CP}$.

Also, based on the random number $\psi$ and linear transformation $x_t^{CP}$, the master key generation part 110 generates $(v_{t,i,j}^{CP})_{i,j} := \psi \cdot ((x_t^{CP})^T)^{-1}$. As $(x_{t,i,j}^{CP})_{i,j}$ does, $(v_{t,i,j}^{CP})_{i,j}$ signifies a matrix concerning the suffixes i and j of the matrix $v_{t,i,j}^{CP}$ where $i, j = 1, \ldots, N_t^{CP}$.

Then, based on the linear transformation $x_t^{CP}$, the master key generation part 110 generates the basis $B_t^{CP}$ from the canonical basis $A_t^{CP}$. Likewise, based on $(v_{t,i,j}^{CP})_{i,j}$, the master key generation part 110 generates the basis $B^*{}_t^{CP}$ from the canonical basis $A_t^{CP}$.

Then, with the processing device, the master key generation part 110 calculates Formula 133.

$$g_T := e(g,g)^\psi,$$

$$\mathrm{param}_{\vec{n}} := (\mathrm{param}_{V_0}, \{\mathrm{param}_{V_t^{KP}}\}_{t=1,\ldots,d^{KP}}, \{\mathrm{param}_{V_t^{CP}}\}_{t=1,\ldots,d^{CP}}, g_T) \quad \text{[Formula 133]}$$

Namely, the master key generation part 110 sets $e(g, g)^\psi$ in $g_T$.

The master key generation part 110 also sets $\mathrm{param}_{V_0}$, $\mathrm{param}_{V_t^{KP}}$ for each integer $t = 1, \ldots, d^{KP}$, $\mathrm{param}_{V_t^{CP}}$ for each integer $t = 1, \ldots, d^{CP}$, and $g_T$, in $\mathrm{param}_{\vec{n}}$. Note that $g_T = e(b_{0,i}, b^*_{0,i})$ for each integer $i = 1, \ldots, N_0$. Note that $g_T = e(b_{t,i}, b^*_{t,i})$ for each integer $t = 1, \ldots, d^{KP}$ and each integer $i = 1, \ldots, N_t^{KP}$. Also, note that $g_T = e(b_{t,i}, b^*_{t,i})$ for each integer $t = 1, \ldots, d^{CP}$ and each integer $i = 1, \ldots, N_t^{CP}$.

Then, the master key generation part 110 obtains $\mathrm{param}_{\vec{n}}$, $\{B_0, B^*_0\}$, $\{B_t^{KP}, B^{*KP}_t\}$ for each integer $t = 1, \ldots, d^{KP}$, and $\{B_t^{CP}, B^{*CP}_t\}$ for each integer $t = 1, \ldots, d^{CP}$.

(S102: Public Parameter Generation Step)

With the processing device, the master key generation part 110 generates a subbasis $\hat{B}_0$ of the basis $B_0$, a subbasis $\hat{B}_t^{KP}$ of the basis $B_t^{KP}$ for each integer $t = 1, \ldots, d^{KP}$, and a subbasis $\hat{B}_t^{CP}$ of the basis $B_t^{CP}$ for each integer $t = 1, \ldots, d^{CP}$, as indicated in Formula 134.

$$\hat{\mathbb{B}}_0 := (b^*_{0,1}, b^*_{0,2}, b^*_{0,2+u_0+1}, \quad\text{[Formula 134]}$$
$$b^*_{0,2+u_0+1+w_0+1}, \ldots, b^*_{0,2+u_0+1+w_0+z_0}),$$
$$\text{for } t = 1, \ldots, d^{KP},$$

$$\hat{\mathbb{B}}_t^{KP} := \left(b_{t,1}^{KP}, \ldots, b_{t,n_t^{KP}}^{KP}, \right.$$
$$\left. b_{t,n_t^{KP}+u_t^{KP}+w_t^{KP}+1}^{KP}, \ldots, b_{t,n_t^{KP}+u_t^{KP}+w_t^{KP}+z_t^{KP}}^{KP} \right),$$
$$\text{for } t = 1, \ldots, d^{CP},$$

$$\hat{\mathbb{B}}_t^{CP} := \left(b_{t,1}^{CP}, \ldots, b_{t,n_t^{CP}}^{CP}, \right.$$
$$\left. b_{t,n_t^{CP}+u_t^{CP}+w_t^{CP}+1}^{CP}, \ldots, b_{t,n_t^{CP}+u_t^{CP}+w_t^{CP}+z_t^{CP}}^{CP} \right)$$

The master key generation part 110 treats the generated subbases $\hat{B}_0$, $\hat{B}_t^{KP}$, and $\hat{B}_t^{CP}$, the security parameter $\lambda(1^\lambda)$ inputted in (S101), and $\mathrm{param}_{\vec{n}}$ generated in (S101), as the public parameters pk.

(S103: Master Key Generation Step)

With the processing device, the master key generation part 110 generates a subbasis $\hat{B}^*_0$ of the basis $B^*_0$, a subbasis $\hat{B}^{*KP}_t$ of the basis $B^{*KP}_t$ for each integer $t = 1, \ldots, d^{KP}$, and a subbasis $\hat{B}^{*CP}_t$ of the basis $B^{*CP}_t$ for each integer $t = 1, \ldots, d^{CP}$, as indicated in Formula 135.

$$\hat{\mathbb{B}}^*_0 := \quad\text{[Formula 135]}$$
$$(b^*_{0,1}, b^*_{0,2}, b^*_{0,2+u_0+1}, b^*_{0,2+u_0+1+1}, \ldots, b^*_{0,2+u_0+1+w_0}),$$
$$\text{for } t = 1, \ldots, d^{KP},$$

$$\hat{\mathbb{B}}^{*KP}_t :=$$
$$\left(b_{t,1}^{*KP}, \ldots, b_{t,n_t^{KP}}^{*KP}, b_{t,n_t^{KP}+u_t^{KP}+1}^{*KP}, \ldots, b_{t,n_t^{KP}+u_t^{KP}+w_t^{KP}}^{*KP}\right),$$
$$\text{for } t = 1, \ldots, d^{CP},$$

$$\hat{\mathbb{B}}^{*CP}_t :=$$
$$\left(b_{t,1}^{*CP}, \ldots, b_{t,n_t^{CP}}^{*CP}, b_{t,n_t^{CP}+u_t^{CP}+1}^{*CP}, \ldots, b_{t,n_t^{CP}+u_t^{CP}+w_t^{CP}}^{*CP}\right)$$

The master key generation part 110 treats the generated subbases $\hat{B}^*_0$, $\hat{B}^*_0$, $\hat{B}_t^{*KP}$, and $\hat{B}_t^{*CP}$, as the master key sk.

(S104: Master Key Storing Step)

The master key storage part 120 stores the public parameters pk generated in (S102), in the storage device. The master key storage part 120 also stores the master key sk generated in (S103), in the storage device.

In brief, from (S101) through (S103), the key generation device 100 generates the public parameters pk and the master key sk by executing the Setup algorithm indicated in Formula 136. Then, in (S104), the key generation device 100 stores the generated public parameters pk and master key sk, in the storage device.

Note that the public parameters are publicized via, e.g., a network, so the encryption device 200 and decryption device 300 can acquire them.

$$\mathrm{Setup}(1^\lambda, \vec{n} := ((d^{KP}; n_t^{KP}, u_t^{KP}, w_t^{KP}, z_t^{KP}(t=1,\ldots,d^{KP})), \quad\text{[Formula 136]}$$
$$(d^{CP}; n_t^{CP}, u_t^{CP}, w_t^{CP}, z_t^{CP}(t=1,\ldots,d^{CP}))):$$

$$(\mathrm{param}_{\vec{n}}, \mathbb{B}_0, \mathbb{B}^*_0, \{\mathbb{B}_t^{KP}, \mathbb{B}_t^{*KP}\}_{t=1,\ldots,d^{KP}},$$
$$\{\mathbb{B}_t^{CP}, \mathbb{B}_t^{*CP}\}_{t=1,\ldots,d^{CP}}) \xleftarrow{R} \mathcal{G}_{ob}(1^\lambda, \vec{n}),$$

$$\hat{\mathbb{B}}_0 := (b^*_{0,1}, b^*_{0,2}, b^*_{0,2+u_0+1}, b^*_{0,2+u_0+1+w_0+1}, \ldots,$$
$$b^*_{0,2+u_0+1+w_0+z_0}),$$

$$\hat{\mathbb{B}}^*_0 := (b^*_{0,1}, b^*_{0,2}, b^*_{0,2+u_0+1}, b^*_{0,2+u_0+1+1}, \ldots, b^*_{0,2+u_0+1+w_0}),$$
$$\text{for } t = 1, \ldots, d^{KP},$$

$$\hat{\mathbb{B}}_t^{KP} := \left(b_{t,1}^{KP}, \ldots, b_{t,n_t^{KP}}^{KP}, \right.$$
$$\left. b_{t,n_t^{KP}+u_t^{KP}+w_t^{KP}+1}^{KP}, \ldots, b_{t,n_t^{KP}+u_t^{KP}+w_t^{KP}+z_t^{KP}}^{KP}\right),$$

$$\hat{\mathbb{B}}_t^{*KP} := \left(b_{t,1}^{*KP}, \ldots, b_{t,n_t^{KP}}^{*KP}, b_{t,n_t^{KP}+u_t^{KP}+1}^{*KP}, \ldots,\right.$$
$$\left. b_{t,n_t^{KP}+u_t^{KP}+w_t^{KP}}^{*KP}\right),$$
$$\text{for } t = 1, \ldots, d^{CP},$$

$$\hat{\mathbb{B}}_t^{CP} := \left(b_{t,1}^{CP}, \ldots, b_{t,n_t^{CP}}^{CP},\right.$$
$$\left. b_{t,n_t^{CP}+u_t^{CP}+w_t^{CP}+1}^{CP}, \ldots, b_{t,n_t^{CP}+u_t^{CP}+w_t^{CP}+z_t^{CP}}^{CP}\right),$$

$$\hat{\mathbb{B}}_t^{*CP} := \left(b_{t,1}^{*CP}, \ldots, b_{t,n_t^{CP}}^{*CP}, b_{t,n_t^{CP}+u_t^{CP}+1}^{*CP}, \ldots,\right.$$
$$\left. b_{t,n_t^{CP}+u_t^{CP}+w_t^{CP}}^{*CP}\right),$$

$$pk := (1^\lambda, \mathrm{param}_{\vec{n}}, \hat{\mathbb{B}}_0, \{\hat{\mathbb{B}}_t^{KP}\}_{t=1,\ldots,d^{KP}},$$
$$\{\hat{\mathbb{B}}_t^{CP}\}_{t=1,\ldots,d^{CP}}),$$

$$sk := (\hat{\mathbb{B}}^*_0, \{\hat{\mathbb{B}}_t^{*KP}\}_{t=1,\ldots,d^{KP}}, \{\hat{\mathbb{B}}_t^{*CP}\}_{t=1,\ldots,d^{CP}})$$

return $pk, sk$.

The process of the KeyGen algorithm will be described with reference to FIG. 10.

(S201: Information Input Step)

With the input device, the first KP information input part 131 takes as input the access structure $S^{KP} := (M^{KP}, \rho^{KP})$. Note that the matrix $M^{KP}$ is a matrix of $L^{KP}$ rows×$r^{KP}$ columns. $L^{KP}$ and $r^{KP}$ are each an integer of 1 or more.

Also, with the input device, the first CP information input part 132 takes as input the attribute set $\Gamma^{CP} := \{(t, \vec{x}_t^{CP} := (x_{t,i}^{CP} (i=1, \ldots, n_t^{CP})) \in \mathbb{F}_q^{ntCP}\setminus\{\vec{0}\}) | 1 \le t \le d^{CP}\}$. Note that t need not be all of the integers falling within the range of $1 \le t \le d^{CP}$, but may be one or more of integers falling within the range of $1 \le t \le d^{CP}$.

The matrix $M^{KP}$ of the access structure $S^{KP}$ is set depending on the condition of the system the user wishes to realize. Also, for example, the attribute information of the user of the decryption key $sk_{(SKP, \Gamma CP)}$ is set in $\rho^{KP}$ of the access structure $S^{KP}$ and in the attribute set $\Gamma^{CP}$.

(S202: f Vector Generation Step)

With the processing device, the f vector generation part 141 generates a vector $\vec{f}^{KP}$ having $r^{KP}$ pieces of elements, randomly as indicated in Formula 137.

$$\vec{f}^{KP} \xleftarrow{U} \mathbb{F}_q^{KP} \qquad \text{[Formula 137]}$$

(S203: s Vector Generation Step)

With the processing device, the s vector generation part 142 generates a vector $(\vec{s}^{KP})^T$, based on the ($L^{KP}$ rows×$r^{KP}$ columns) matrix $M^{KP}$ included in the access structure $S^{KP}$ inputted in (S201) and the vector $\vec{f}^{KP}$ generated in (S202) and having $r^{KP}$ pieces of elements, as indicated in Formula 138.

$$(\vec{s}^{KP})^T := (s_1^{KP}, \ldots, s_{L^{KP}}^{KP})^T := M^{KP} \cdot (\vec{f}^{KP})^T \qquad \text{[Formula 138]}$$

With the processing device, the s vector generation part 142 generates a value $s_0^{KP}$, based on the vector $\vec{f}^{KP}$ generated in (S202), as indicated in Formula 139. Note that $\vec{1}$ is a vector which has a value 1 in all its elements.

$$s_0^{KP} := \vec{1} \cdot (\vec{f}^{KP})^T \qquad \text{[Formula 139]}$$

(S204: Random Number Generation Step)

With the processing device, the random number generation part 143 generates a random number $\delta^{CP}$, a random number $\vec{\eta}_t^{CP}$ for each integer t of (t, $\vec{x}_t^{CP}$) included in $\Gamma^{CP}$, and a random number $\vec{\eta}_0$, as indicated in Formula 140.

$$\delta^{CP} \xleftarrow{U} \mathbb{F}_q,$$
$$\vec{\eta}_t^{CP} := (\eta_{t,1}^{CP}, \ldots, \eta_{t,w_t^{CP}}^{CP}) \xleftarrow{U} \mathbb{F}_q^{w_t^{CP}}$$
$$\text{such that } (t, \vec{x}_t^{CP}) \in \Gamma^{CP},$$
$$\vec{\eta}_0 := (\eta_{0,1}, \ldots, \eta_{0,w_0}) \xleftarrow{U} \mathbb{F}_q^{w_0} \qquad \text{[Formula 140]}$$

(S205: Main Decryption Key Generation Step)

With the processing device, the main decryption key generation part 144 generates a main decryption key $k^*_0$, which is an element of the decryption key $sk_{(SKP, \Gamma CP)}$, as indicated in Formula 141.

$$k_0^* := \left(-s_0^{KP}, \delta^{CP}, \overbrace{u_0}^{0^{u_0}}, 1, \overbrace{\eta_{0,1}, \ldots, \eta_{0,w_0}}^{w_0}, \overbrace{z_0}^{0^{z_0}}\right)_{\mathbb{B}_0^*} \qquad \text{[Formula 141]}$$

As described above, for the bases B and B* indicated in Formula 110, Formula 111 is established. Hence, Formula 141 means that the coefficient for the basis vector of a basis $B^*_0$ is set as described below. For the purpose of simple representation, a basis vector $b^*_{0,i}$ is specified only by its i portion. For example, a basis vector 1 signifies a basis vector $b^*_{0,1}$. Basis vectors 1, ..., 3 signify basis vectors $b^*_{0,1}, \ldots, b^*_{0,3}$, respectively.

$-s_0^{KP}$ is set as the coefficient for the basis vector 1 of the basis $B^*_0$. The random number $\delta^{CP}$ is set as the coefficient for the basis vector 2. 0 is set as the coefficient for basis vectors $2+1, \ldots, 2+u_0$. 1 is set as the coefficient for a basis vector $2+u_0+1$. Random numbers $\eta_{0,1}, \ldots, \eta_0, \ldots, \eta_{0,w0}$ (where w0 represents $w_0$) are each set as the coefficient for basis vectors $2+u_0+1+1, \ldots, 2+u_0+1+w_0$. 0 is set as the coefficient for basis vectors $2+u_0+1+w_0+1, \ldots, 2+u_0+1+w_0+z_0$.

(S206: KP Decryption Key Generation Step)

With the processing device, the KP decryption key generation part 145 generates a KP decryption key $k^*_i{}^{KP}$, which is an element of the decryption key $sk_{(SKP, \Gamma CP)}$, for each integer $i = 1, \ldots, L^{KP}$, as indicated in Formula 142.

$$\text{for } i = 1, \ldots, L^{KP}, \qquad \text{[Formula 142]}$$
$$\text{if } \rho^{KP}(i) = (t, \vec{v}_i^{KP} := (v_{i,1}^{KP}, \ldots, v_{i,n_t^{KP}}^{KP}) \in \mathbb{F}_q^{n_t^{KP}} \setminus \{\vec{0}\}),$$
$$\theta_i^{KP} \xleftarrow{U} \mathbb{F}_q, \vec{\eta}_i^{KP} := (\eta_{i,1}^{KP}, \ldots, \eta_{i,w_t^{KP}}^{KP}) \xleftarrow{U} \mathbb{F}_q^{w_t^{KP}},$$
$$k_i^{*KP} := \left(\overbrace{s_i^{KP} \vec{e}_{t,1}^{KP} + \theta_i^{KP} \vec{v}_i^{KP}}^{n_t^{KP}}, \overbrace{0^{u_t^{KP}}}^{u_t^{KP}}, \overbrace{\vec{\eta}_i^{KP}}^{w_t^{KP}}, \overbrace{0^{z_t^{KP}}}^{z_t^{KP}}\right)_{\mathbb{B}_t^{*KP}},$$
$$\text{if } \rho^{KP}(i) = \neg (t, \vec{v}_i^{KP}),$$
$$\vec{\eta}_i^{KP} := (\eta_{i,1}^{KP}, \ldots, \eta_{i,w_t^{KP}}^{KP}) \xleftarrow{U} \mathbb{F}_q^{w_t^{KP}},$$
$$k_i^{*KP} := \left(\overbrace{s_i^{KP} \vec{v}_i^{KP}}^{n_t^{KP}}, \overbrace{0^{u_t^{KP}}}^{u_t^{KP}}, \overbrace{\vec{\eta}_i^{KP}}^{w_t^{KP}}, \overbrace{0^{z_t^{KP}}}^{z_t^{KP}}\right)_{\mathbb{B}_t^{*KP}}$$

More specifically, as Formula 141 does, Formula 142 means that the coefficient for the basis vector of a basis $B^*_t{}^{KP}$ is set as described below. For the purpose of simple representation, a basis vector $b^*_{t,i}{}^{KP}$ is specified only by its i portion. For example, a basis vector 1 signifies a basis vector $b^*_{t,1}{}^{KP}$. Basis vectors 1, ..., 3 signify basis vectors $b^*_{t,1}{}^{KP}, b^*_{t,3}{}^{KP}$, respectively.

When $\rho^{KP}(i)$ is a positive tuple (t, $\vec{v}_i{}^{KP}$), $s_i^{KP} + \theta_i^{KP} v_{i,1}{}^{KP}$ is set as the coefficient for the basis vector 1. As described above, $e^*_{t,j}{}^{KP}$ represents a regular basis vector indicated in Formula 112. Also, $\theta_i^{KP} v_{i,2}{}^{KP}, \ldots, \theta_i^{KP} v_{i,ntKP}{}^{KP}$ (where ntKP represents $n_t^{KP}$) are each set as the coefficient for basis vectors $2, \ldots, n_t^{KP}$. 0 is set as the coefficient for basis vectors $n_t^{KP}+1, \ldots, n_t^{KP}+u_t^{KP}$. $\eta_{i,1}{}^{KP}, \ldots, \eta_{wtKP}{}^{KP}$ (where wtKP represents $w_t^{KP}$) are each set as the coefficient for basis vectors $n_t^{KP}+u_t^{KP}+1, \ldots, n_t^{KP}+u_t^{KP}+w_t^{KP}$. 0 is set as the coefficient for basis vectors $n_t^{KP}+u_t^{KP}+w_t^{KP}+1, \ldots, n_t^{KP}, u_t^{KP}, w_t^{KP}$, and $z_t^{KP}$.

When $\rho^{KP}(i)$ is a negative tuple $\neg (t, \vec{v}_i{}^{KP}, s_i^{KP} v_{i,1}{}^{KP}, \ldots, s_i^{KP} v_{i,ntKP}{}^{KP}$ (where ntKP represents $n_t^{KP}$) are each set as the coefficient for the basis vectors $1, \ldots, n_t^{KP}$. 0 is set as the coefficient for basis vectors $n_t^{KP}+1, \ldots,$ $n_t^{KP}+u_t^{KP} \cdot \eta_{i,1}{}^{KP}, \ldots, \eta_{i,wtKP}{}^{KP}$ (where wtKP represents $w_t^{KP}$) are each set as the coefficient for basis vectors $n_t^{KP}+u_t^{KP}+1, \ldots, n_t^{KP}+u_t^{KP}+w_t^{KP}$. 0 is set as the coefficient for basis vectors $n_t^{KP}+u_t^{KP}+w_t^{KP}+1, \ldots, n_t^{KP}+u_t^{KP}+w_t^{KP}+z_t^{KP}$.

Note that $\theta_i^{KP}$ and $\vec{\eta}_i^{KP}$ are random numbers generated by the random number generation part 143.

(S207: CP Decryption Key Generation Step)

With the processing device, the CP decryption key generation part 146 generates a CP decryption key $k^*_t{}^{CP}$, which is an element of the decryption key $sk_{(SKP,\Gamma CP)}$, for each integer t of (t, $\vec{x}_t^{CP}$) included in $\Gamma^{CP}$, as indicated in Formula 143.

$$k_t^{*CP} := \left(\delta^{CP}\vec{x}_t^{CP}, \overbrace{0^{u_t^{CP}}}^{n_t^{CP}}, \overbrace{\vec{\eta}_t^{CP}}^{u_t^{CP}}, \overbrace{0^{z_t^{CP}}}^{w_t^{CP}}, 0^{z_t^{KP}}\right)_{\mathbb{B}_t^{*CP}}$$ [Formula 143]

for $\left(t, \vec{x}_t^{CP}\right) \in \Gamma^{CP}$

More specifically, as Formula 141 does, Formula 143 means that the coefficient for the basis vector of a basis $\mathbb{B}^*_t{}^{CP}$ is set as described below. For the purpose of simple representation, a basis vector $b^*_{t,i}{}^{CP}$ is specified only by its i portion. For example, a basis vector 1 signifies a basis vector $b^*_{t,1}{}^{CP}$. Basis vectors 1, . . . , 3 signify basis vectors $b^*_{t,1}{}^{CP}, b^*_{t,3}{}^{CP}$, respectively.

Also, $\delta^{CP}x_{t,1}{}^{CP}, \ldots, \delta^{CP}x_{t,ntCP}{}^{CP}$ (where ntCP represents $n_t^{CP}$) are each set as the coefficient for the basis vectors 1, . . . , $n_t^{CP}$. 0 is set as the coefficient for basis vectors $n_t^{CP}+1, \ldots, n_t^{CP}+u_t^{CP} \cdot \eta_{t,1}{}^{CP}, \ldots, \eta_{t,wtCP}{}^{CP}$ (where wtCP represents $w_t^{CP}$) are each set as the coefficient for basis vectors $n_t^{CP}+u_t^{CP}+1, \ldots, n_t^{CP}+u_t^{CP}+w_t^{CP}$. 0 is set as the coefficient for basis vectors $n_t^{CP}+u_t^{CP}+1, \ldots, n_t^{CP}+u_t^{CP}+w_t^{CP}+z_t^{CP}$.

(S208: Key Distribution Step)

For example, with the communication device, the key distribution part 150 distributes the decryption key $sk_{(SKP,\Gamma CP)}$, constituted as elements by the main decryption key $k^*_0$, the access structure $\mathbb{S}^{KP}$ and the KP decryption key $k^*_i{}^{KP}$ (i= 1, . . . , $L^{KP}$), and the attribute set $\Gamma^{CP}$ and the CP decryption key $k^*_t{}^{CP}$ (t is t of (t, $\vec{x}_t^{CP}$) included in the attribute set $\Gamma^{CP}$), to the decryption device 300 in secrecy via the network. As a matter of course, the decryption key $sk_{(SKP,\Gamma CP)}$ may be distributed to the decryption device 300 by another method.

More specifically, from (S201) through (S207), the key generation device 100 generates the decryption key $sk_{(SKP,\Gamma CP)}$ by executing the KeyGen algorithm indicated in Formula 144. Then, in (S208), the key generation device 100 distributes the generated decryption key $sk_{(SKP,\Gamma CP)}$ to the decryption device 300.

[Formula 144]

$KeyGen\left(pk, sk, \mathbb{S}^{KP} := (M^{KP}, \rho^{KP}), \Gamma^{CP} := \right.$ $\left\{\left(t, \vec{x}_t^{CP} := \left(x_{t,1}^{CP}, \ldots, x_{t,n_t^{CP}}^{CP}\right) \in \mathbb{F}_q^{n_t^{CP}} \setminus \{\vec{0}\}\right) \middle| 1 \leq t \leq d^{CP}, x_{t,1}^{CP} := 1\right\}\right)$ $\vec{f}^{KP} \xleftarrow{U} \mathbb{F}_q^{r^{KP}}, (\vec{s}^{KP})^T := (s_1^{KP}, \ldots, s_{L^{KP}}^{KP})^T := M^{KP} \cdot (\vec{f}^{KP})^T,$ $s_0^{KP} := \vec{1} \cdot (\vec{f}^{KP})^T,$ $\delta^{CP} \xleftarrow{U} \mathbb{F}_q, \vec{\eta}_t^{CP} \xleftarrow{U} \mathbb{F}_q^{w_t^{CP}}$ such that $\left(t, \vec{x}_t^{CP}\right) \in \Gamma^{CP},$ $\vec{\eta}_0 \xleftarrow{U} \mathbb{F}_q^{w_0},$ -continued $k_0^* := \left(-s_0^{KP}, \delta^{CP}, \overbrace{0^{u_0}}^{u_0}, 1, \overbrace{\eta_{0,1}, \ldots, \eta_{0,w_0}}^{w_0}, 0^{z_0}\right)_{\mathbb{B}_0^*},$ for $i = 1, \ldots, L^{KP},$ if $\rho^{KP}(i) = \left(t, \vec{v}_i^{KP} := \left(v_{i,1}^{KP}, \ldots, v_{i,n_t^{KP}}^{KP}\right) \in \mathbb{F}_q^{n_t^{KP}} \setminus \{\vec{0}\}\right),$ $\theta_i^{KP} \xleftarrow{U} \mathbb{F}_q, \vec{\eta}_i^{KP} \xleftarrow{U} \mathbb{F}_q^{w_t^{KP}},$ $k_i^{*KP} := \left(s_i^{KP}\vec{e}_{t,1}^{KP} + \theta_i^{KP}\vec{v}_i^{KP}, \overbrace{0^{u_t^{KP}}}^{n_t^{KP}}, \overbrace{\vec{\eta}_i^{KP}}^{u_t^{KP}}, \overbrace{0^{z_t^{KP}}}^{w_t^{KP}}\right)_{\mathbb{B}_t^{*KP}},$ if $\rho^{KP}(i) = \neg \left(t, \vec{v}_i^{KP}\right), \vec{\eta}_i^{KP} \xleftarrow{U} \mathbb{F}_q^{w_t^{KP}},$ $k_i^{*KP} := \left(s_i^{KP}\vec{v}_i^{KP}, \overbrace{0^{u_t^{KP}}}^{n_t^{KP}}, \overbrace{\vec{\eta}_i^{KP}}^{u_t^{KP}}, \overbrace{0^{z_t^{KP}}}^{w_t^{KP}}\right)_{\mathbb{B}_t^{*KP}},$ for $\left(t, \vec{x}_t^{CP}\right) \in \Gamma^{CP},$ $k_t^{*CP} := \left(\delta^{CP}\vec{x}_t^{CP}, \overbrace{0^{u_t^{CP}}}^{n_t^{CP}}, \overbrace{\vec{\eta}_t^{CP}}^{u_t^{CP}}, \overbrace{0^{z_t^{KP}}}^{w_t^{CP}}\right)_{\mathbb{B}_t^{*CP}},$ return $sk_{(\mathbb{S}^{KP},\Gamma^{CP})} := \left(k_0^*; \mathbb{S}^{KP}, k_1^{*KP}, \ldots, k_{L^{KP}}^{*KP}; \Gamma^{CP}, \{k_t^{*CP}\}_{(t,\vec{x}_t^{CP}) \in \Gamma^{CP}}\right).$ The function and operation of the encryption device 200 will be described.

As shown in FIG. 7, the encryption device 200 is provided with a public parameter acquisition part 210, an information input part 220 (second information input part), an encrypted data generation part 230, and a data transmission part 240 (data output part).

The information input part 220 is provided with a KP information input part 221 (second KP information input part), a CP information input part 222 (second CP information input part), and a message input part 223. The encrypted data generation part 230 is provided with an f vector generation part 231, an s vector generation part 232, a random number generation part 233, a main encrypted data generation part 234, a KP encrypted data generation part 235, a CP encrypted data generation part 236, and a message encrypted data generation part 237.

The process of the Enc algorithm will be described with reference to FIG. 11.

(S301: Public Parameter Acquisition Step)

For example, with the communication device, the public parameter acquisition part 210 acquires the public parameters pk generated by the key generation device 100, via the network.

(S302: Information Input Step)

With the input device, the KP information input part 221 takes as input the attribute set $\Gamma^{KP} := \{(t, \vec{x}_t^{KP} := (x_{t,i}^{KP} (i=1 \ldots, n_t^{KP})) \in \mathbb{F}_q^{ntKP} \setminus \{\vec{0}\}) | 1 \leq t \leq d^{KP}\}$. Note that t need not be all of the integers t falling within the range of $1 \leq t \leq d^{KP}$, but may be one or more of integers t falling within the range of $1 \leq t \leq d^{KP}$.

Also, with the input device, the CP information input part 222 takes as input the access structure $\mathbb{S}^{CP} := (M^{CP}, \rho^{CP})$. Note that the matrix $M^{CP}$ is a matrix of $L^{CP}$ rows×$r^{CP}$ columns where $L^{CP}$ and $r^{CP}$ are each an integer of 1 or more.

Also, with the input device, the message input part takes as input the message m to be transmitted to the decryption device 300.

The matrix $M^{CP}$ of the access structure $\mathbb{S}^{CP}$ is set in accordance with the condition of the system the user wishes to realize. For example, attribute information of a decryptable user is set in $\rho^{CP}$ of the access structure $S^{CP}$ and the attribute set $\Gamma^{KP}$.

(S303: Random Number Generation Step)

With the processing device, the random number generation part 233 generates a random number $\omega^{KP}$, a random number $\vec{\phi}_0$, $\vec{\phi}_t^{KP}$ for each integer t of (t, $\vec{x}_t^{KP}$) included in $\Gamma^{KP}$, and a random number $\zeta$, as indicated in Formula 145.

$$\omega^{KP}, \zeta \xleftarrow{U} \mathbb{F}_q, \qquad \text{[Formula 145]}$$
$$\vec{\phi}_0 := (\varphi_{0,1}, \ldots, \varphi_{0,z0}) \xleftarrow{U} \mathbb{F}_q^{z0},$$
$$\vec{\phi}_t^{KP} := \left(\varphi_{t,1}^{KP}, \ldots, \varphi_{t,z_t^{KP}}^{KP}\right) \xleftarrow{U} \mathbb{F}_q^{z_t^{KP}}$$

for $$\left(t, \vec{x}_t^{KP}\right) \in \Gamma$$

(S304: f Vector Generation Step)

With the processing device, the f vector generation part 231 generates a vector $\vec{f}^{CP}$ having $r^{CP}$ pieces of elements, randomly as indicated in Formula 146.

$$\vec{f}^{CP} \xleftarrow{R} \mathbb{F}_q^{r^{CP}} \qquad \text{[Formula 146]}$$

(S305: s Vector Generation Step)

With the processing device, the s vector generation part 232 generates a vector $(\vec{s}^{CP})^T$, based on the matrix $M^{CP}$ of ($L^{CP}$ rows×$r^{CP}$ columns) included in the access structure $S^{CP}$ inputted in (S302), and the vector $\vec{f}^{CP}$ generated in (S304) and having the $r^{CP}$ pieces of elements, as indicated in Formula 147.

$$(\vec{s}^{CP})^T := (s_1^{CP}, \ldots, s_{L^{CP}}^{CP})^T := M^{CP} \cdot (\vec{f}^{CP})^T \qquad \text{[Formula 147]}$$

With the processing device, s vector generation part 232 generates a value $s_0^{CP}$, based on the vector $\vec{f}^{CP}$ generated in (S304), as indicated in Formula 148. Note that $\vec{1}$ is a vector which has a value 1 in all its elements.

$$s_0^{CP} := \vec{1} \cdot (\vec{f}^{CP})^T \qquad \text{[Formula 148]}$$

(S306: Main Encrypted Data Generation Step)

With the processing device, the main encrypted data generation part 234 generates main encrypted data $c_0$, which is an element of the encrypted data $ct_{(\Gamma KP, SCP)}$, as indicated in Formula 149.

$$c_0 := \left(\omega^{KP}, -s_0^{CP}, \overbrace{0^{u_0}}^{u_0}, \zeta, \overbrace{0^{w_0}}^{w_0}, \overbrace{\varphi_{0,1}, \ldots, \varphi_{0,z_0}}^{z_0}\right)_{\mathbb{B}_0} \qquad \text{[Formula 149]}$$

As described above, for the bases B and B* indicated in Formula 110, Formula 111 is established. Hence, Formula 149 means that the coefficient for the basis vector of a basis $\mathbb{B}_0$ is set as described below. For the purpose of simple representation, a basis vector $b^*_{0,i}$ is specified only by its i portion. For example, a basis vector 1 signifies a basis vector $b_{0,1}$. Basis vectors 1, . . . , 3 signify basis vectors $b_{0,i}$, . . . , $b_{0,3}$.

A random number $\omega^{KP}$ is set as the coefficient for the basis vector 1 of the basis $\mathbb{B}_0$. $-s_0^{CP}$ is set as the coefficient for the basis vector 2. 0 is set as the coefficient for the basis vectors 2+1, . . . , 2+$u_0$. A random number $\zeta$ is set as the coefficient for a basis vector 2+$u_0$+1. 0 is set as the coefficient for basis vectors 2+$u_0$+1+1, . . . , 2+$u_0$+1+$w_0$. Random numbers $\varphi_{0,1}, \ldots, \varphi_{0,z0}$ (where z0 represents $z_0$) are each set as the coefficient for basis vectors 2+$u_0$+1+$w_0$+1, . . . , 2+$u_0$+1+$w_0$+$z_0$.

(S307: KP Encrypted Data Generation Step)

The KP encrypted data generation part 235 generates KP encrypted data $c_t^{CP}$, which is an element of the encrypted data $ct_{(\Gamma KP, SCP)}$, for each integer t of (t, $\vec{x}_t^{KP}$) included in $\Gamma^{KP}$, as indicated in Formula 150.

$$c_t^{KP} := \left(\overbrace{\omega^{KP} \vec{x}_t^{KP}}^{n_t^{KP}}, \overbrace{0^{u_t^{KP}}}^{u_t^{KP}}, \overbrace{0^{w_t^{KP}}}^{w_t^{KP}}, \overbrace{\vec{\varphi}_t^{KP}}^{z_t^{KP}}\right)_{\mathbb{B}_t^{KP}} \qquad \text{[Formula 150]}$$

for $$\left(t, \vec{x}_t^{KP}\right) \in \Gamma^{KP}$$

More specifically, as Formula 149 does, Formula 150 means that the coefficient for the basis vector of a basis $\mathbb{B}_t^{KP}$ is set as described below. For the purpose of simple representation, a basis vector $b_{t,i}^{KP}$ is specified only by its i portion. For example, a basis vector 1 signifies a basis vector $b_{t,1}^{KP}$. Basis vectors 1, . . . , 3 signify basis vectors $b_{t,1}^{KP}$, . . . , $b_{t,3}^{KP}$, respectively.

$\omega^{KP} x_{t,1}^{KP}, \ldots, \omega^{KP} x_{t,ntKP}^{KP}$ (where ntKP represents $n_t^{KP}$) are each set as the coefficient for the basis vectors 1, . . . , $n_t^{KP}$. 0 is set as the coefficient for basis vectors $n_t^{KP}$+1, . . . , $n_t^{KP}$+$u_t^{KP}$+$w_t^{KP}$. $\phi_{t,1}^{KP}, \ldots, \phi_{t,ztKP}^{KP}$ (where ztKP represents $z_t^{KP}$) are each set as the coefficient for basis vectors $n_t^{KP}$+$u_t^{KP}$+$w_t^{KP}$+1, . . . , $n_t^{KP}$+$u_t^{KP}$+$w_t^{KP}$+$z_t^{KP}$.

(S308: CP Encrypted Data Generation Step)

The CP encrypted data generation part 236 generates CP encrypted data $c_i^{CP}$, which is an element of the encrypted data $ct_{(\Gamma KP, SCP)}$, for each integer i=1, . . . , $L^{CP}$, as indicated in Formula 151.

for i = 1, . . . , $L^{CP}$, [Formula 151]

if $\rho^{CP}(i) =$ $$\left(t, \vec{v}_i^{CP} := \left(v_{i,1}^{CP}, \ldots, v_{i,n_t^{CP}}^{CP}\right) \in \mathbb{F}_q^{n_t^{CP}} \setminus \{\vec{0}\}\right)\left(v_{i,n_t^{CP}}^{CP} := 1\right),$$

$$\theta_i^{CP} \xleftarrow{U} \mathbb{F}_q, \vec{\varphi}_i^{CP} := \left(\varphi_{i,1}^{CP}, \ldots, \varphi_{i,z_t^{CP}}^{CP}\right) \xleftarrow{U} \mathbb{F}_q^{z_t^{CP}},$$

$$c_i^{+CP} := \left(\overbrace{s_i^{CP} \vec{e}_{t,1}^{CP} + \theta_i^{CP} \vec{v}_i^{CP}}^{n_t^{CP}}, \overbrace{0^{u_t^{CP}}}^{u_t^{CP}}, \overbrace{0^{w_t^{CP}}}^{w_t^{CP}}, \overbrace{\vec{\varphi}_i^{CP}}^{z_t^{CP}}\right)_{\mathbb{B}_t^{+CP}},$$

if $\rho^{CP}(i) = \neg \left(t, \vec{v}_i^{CP}\right),$ $$\vec{\varphi}_i^{CP} := \left(\varphi_{i,0}^{CP}, \ldots, \varphi_{i,z_t^{CP}}^{CP}\right) \xleftarrow{U} \mathbb{F}_q^{z_t^{CP}},$$

$$c_i^{CP} := \left(\overbrace{s_i^{CP} \vec{v}_i^{CP}}^{n_t^{CP}}, \overbrace{0^{u_t^{CP}}}^{u_t^{CP}}, \overbrace{0^{w_t^{CP}}}^{w_t^{CP}}, \overbrace{\vec{\varphi}_i^{CP}}^{z_t^{CP}}\right)_{\mathbb{B}_t^{CP}}$$

More specifically, as Formula 150 does, Formula 151 means that the coefficient for the basis vector of a basis $\mathbb{B}_t^{CP}$ is set as described below. For the purpose of simple representation, a basis vector $b_{t,i}^{CP}$ is specified only by its i portion. For example, a basis vector 1 signifies a basis vector $b_{t,i}^{CP}$. Basis vectors 1, . . . , 3 signify basis vectors $b_{t,1}^{CP}, \ldots, b_{1,3}^{CP}$, respectively.

When $\rho^{CP}(i)$ is a positive tuple (t, $\vec{v}_i^{CP}$), $s_i^{CP}$+$\theta_i^{CP} v_{i,1}^{CP}$ is set as the coefficient for the basis vector 1. As described above, $\vec{e}_{t,j}^{CP}$ represents a regular basis vector indicated in Formula 112. Also, $\theta_i^{CP} v_{i,2}^{CP}, \ldots, \theta_i^{CP} v_{i,ntCP}^{CP}$ (where ntCP represents $n_t^{CP}$) are each set as the coefficient for basis vectors $2, \ldots, n_t^{CP}$. 0 is set as the coefficient for basis vectors $n_t^{CP}+1, \ldots, n_t^{CP}+u_t^{CP}+w_t^{CP}$. $\phi_{i,1}^{CP}, \ldots, \phi_{i,ztCP}^{CP}$ (where ztCP represents $Z_t^{CP}$) are each set as the coefficient for basis vectors $n_t^{CP}+u_t^{CP}+w_t^{CP}+1, \ldots, n_t^{CP}+u_t^{CP}+w_t^{CP}+z_t^{CP}$.

When $\rho^{CP}(i)$ is a negative tuple $\neg (t, \vec{v}_i^{CP}), s_i^{CP} v_{i,1}^{CP}, \ldots, s_i^{CP} v_{i,ntCP}^{CP}$ (where ntCP represents $n_t^{CP}$) are each set as the coefficient for the basis vectors $1, \ldots, n_t^{CP}$. 0 is set as the coefficient for basis vectors $n_t^{CP}+1, \ldots, n_t^{CP}+u_t^{CP}+w_t^{CP}$. $\phi_{i,1}^{CP}, \ldots, \phi_{i,ztCP}^{CP}$, (where ztCP represents $z_t^{CP}$) are each set as the coefficient for basis vectors $n_t^{CP}+u_t^{CP}+w_t^{CP}+1, \ldots, n_t^{CP}+u_t^{CP}+w_t^{CP}+z_t^{CP}$.

Note that $\theta_i^{CP}$ and $\phi_i^{CP}$ are random numbers generated by the random number generation part 233.

(S309: Message Encrypted Data Generation Step)

With the processing device, the message encrypted data generation part 237 generates message encrypted data $c_{d+1}$, which is an element of encrypted data $ct_{(\Gamma KP, SCP)}$, as indicated by Formula 152.

$$c_{d+1} := g_T^\zeta m \quad \text{[Formula 152]}$$

As described above, Formula 153 is established.

$$g_T := e(g,g)^\psi \quad \text{[Formula 153]}$$

(S310: Data Transmission Step)

For example, with the communication device, the data transmission part 240 transmits the encrypted data $ct_{(\Gamma KP, SCP)}$, constituted as elements by the main encrypted data $c_0$, the attribute set $\Gamma_{KP}$ and KP encrypted data $c_t^{KP}$, the access structure $S^{CP}$ and CP encrypted data $c_i^{CP}$, and the message encrypted data $c_{d+1}$, to the decryption device 300 via the network. As a matter of course, the encrypted data $ct_{(\Gamma TK, SCP)}$ may be transmitted to the decryption device 300 by another method.

More specifically, from (S301) through (S309), the encryption device 200 generates the encrypted data $ct_{(\Gamma KP, SCP)}$ by executing the Enc algorithm indicated in Formula 154. In (S310), the encryption device 200 transmits the generated encrypted data $ct_{(\Gamma KP, SCP)}$ to the decryption device 300.

[Formula 154]

$$Enc(pk, m, \Gamma^{KP} := $$

$$\left\{ \left(t, \vec{x}_t^{KP} := (x_{t,1}^{KP}, \ldots, x_{t,n_t^{KP}}^{KP}) \in \mathbb{F}_q^{n_t^{KP}} \setminus \{\vec{0}\} \right) \mid 1 \le t \le d^{KP}, x_{t,1}^{KP} := 1 \right\},$$

$$\mathbb{S}^{CP} := (M^{CP}, \rho^{CP}) : \omega^{KP}, \zeta \xleftarrow{U} \mathbb{F}_q, \vec{\varphi}_0 \xleftarrow{U} \mathbb{F}_q^{z_0}, \vec{\varphi}_t^{KP} \xleftarrow{U} \mathbb{F}_q^{z_t^{KP}}$$

for $(t, \vec{x}_t^{KP}) \in \Gamma,$ $\vec{f}^{CP} \xleftarrow{R} \mathbb{F}_q^{r^{CP}}, (\vec{s}^{CP})^T := (s_1^{CP}, \ldots, s_{L^{CP}}^{CP})^T := M^{CP} \cdot (\vec{f}^{CP})^T,$ $s_0^{CP} := \vec{1} \cdot (\vec{f}^{CP})^T,$ $c_0 := \left( \omega^{KP}, -s_0^{CP}, \frac{u_0}{0^{u_0}}, \zeta, \frac{w_0}{0^{w_0}}, \frac{z_0}{\varphi_{0,1}, \ldots, \varphi_{0,z_0}} \right)_{\mathbb{B}_0},$ for $(t, \vec{x}_t^{KP}) \in \Gamma^{KP},$ $c_t^{KP} := \left( \frac{n_t^{KP}}{\omega^{KP} \vec{x}_t^{KP}}, \frac{u_t^{KP}}{0^{u_t^{KP}}}, \frac{w_t^{KP}}{0^{w_t^{KP}}}, \frac{z_t^{KP}}{\vec{\varphi}_t^{KP}} \right)_{\mathbb{B}_t^{KP}},$ for $i = 1, \ldots, L^{CP}$, -continued if $\rho^{CP}(i) = \left(t, \vec{v}_i^{CP} := (v_{i,1}^{CP}, \ldots, v_{i,n_t^{CP}}^{CP}) \in \mathbb{F}_q^{n_t^{CP}} \setminus \{\vec{0}\} \right),$ $\theta_i^{CP} \xleftarrow{U} \mathbb{F}_q, \vec{\varphi}_i^{CP} \xleftarrow{U} \mathbb{F}_q^{z_t^{CP}},$ $c_i^{CP} := \left( \frac{n_t^{CP}}{s_i^{CP} \vec{e}_{t,1}^{CP} + \theta_i^{CP} \vec{v}_i^{CP}}, \frac{u_t^{CP}}{0^{u_t^{CP}}}, \frac{w_t^{CP}}{0^{w_t^{CP}}}, \frac{z_t^{CP}}{\vec{\varphi}_i^{CP}} \right)_{\mathbb{B}_t^{CP}},$ if $\rho^{CP}(i) = \neg \left(t, \vec{v}_i^{CP}\right), \vec{\varphi}_i^{CP} \xleftarrow{U} \mathbb{F}_q^{z_t^{CP}},$ $c_i^{CP} := \left( \frac{n_t^{CP}}{s_i^{CP} \vec{v}_i^{CP}}, \frac{u_t^{CP}}{0^{u_t^{CP}}}, \frac{w_t^{CP}}{0^{w_t^{CP}}}, \frac{z_t^{CP}}{\vec{\varphi}_i^{CP}} \right)_{\mathbb{B}_t^{CP}},$ $c_{d+1} := g_T^\zeta m,$ return $ct_{(\Gamma KP, \mathbb{S} CP)} := $ $\left( c_0; \Gamma^{KP}, \{c_t^{KP}\}_{(t, \vec{x}_t^{KP}) \in \Gamma^{KP}}; \mathbb{S}^{CP}, c_1^{CP}, \ldots, c_{L^{CP}}^{CP}; c_{d+1} \right).$ The function and operation of the decryption device 300 will be described.

As shown in FIG. 8, the decryption device 300 is provided with a decryption key acquisition part 310, a data reception part 320 (data acquisition part), a span program calculation part 330, a complementary coefficient calculation part 340, a pairing operation part 350, and a message calculation part 360.

The span program calculation part 330 is provided with a KP span program calculation part 331 and a CP span program calculation part 332. The complementary coefficient calculation part 340 is provided with a KP complementary coefficient calculation part 341 and a CP complementary coefficient calculation part 342.

The process of the Dec algorithm will be described with reference to FIG. 12.

(S401: Decryption key Acquisition Step)

For example, with the communication device, the decryption key acquisition part 310 acquires the decryption key $sk_{(SCP, \Gamma CP)}$ distributed from the key generation device 100, via the network. The decryption key acquisition part 310 also acquires the public parameters pk generated by the key generation device 100.

(S402: Data Reception Step)

For example, with the communication device, the data reception part 320 receives the encrypted data $ct_{(\Gamma KP, SCP)}$ transmitted by the encryption device 200, via the network.

(S403: Span Program Calculation Step)

With the processing device, the KP span program calculation part 331 checks whether or not the access structure $S^{KP}$ included in the decryption key $sk_{(SCP, \Gamma CP)}$ acquired in (S401) accepts the attribute set $\Gamma^{KP}$ included in the encrypted data $ct_{(\Gamma KP, SCP)}$ received in (S402).

Also, with the processing device, the CP span program calculation part 332 checks whether or not the access structure $S^{CP}$ included in the encrypted data $ct_{(\Gamma KP, SCP)}$ received in (S402) accepts the attribute set $\Gamma^{CP}$ included in the decryption key $sk_{(SCP, \Gamma CP)}$ acquired in (S401).

The method of checking whether or not the access structure accepts the attribute set is the same as that described in "3. Concept for Implementing Functional Encryption".

The span program calculation part 330 advances to the process of (S404) if the access structure $S^{KP}$ accepts the attribute set $\Gamma^{KP}$ and the access structure $S^{CP}$ accepts the attribute set $\Gamma^{CP}$ (accept in S403). If at least either the access structure $S^{KP}$ rejects the attribute set $\Gamma^{KP}$ or the access structure $S^{CP}$ rejects the attribute set $\Gamma^{CP}$ (reject in S403), the span program calculation part 330 judges that the encrypted data $ct_{(\Gamma KP,SCP)}$ cannot be decrypted with the decryption key $sk_{(SCP,\Gamma CP)}$, and outputs the distinguished symbol ⊥ and ends the process.

(S404: Complementary Coefficient Calculation Step)

With the processing device, the KP complementary coefficient calculation part 341 calculates $I^{KP}$ and a constant (complementary coefficient) $\alpha_i^{KP}$ for each integer i included in $I^{KP}$, which $I^{KP}$ and $\alpha_i^{KP}$ satisfying Formula 155.

$$\vec{1}=\Sigma_{i \in I}\alpha_i^{KP}M_i^{KP}, \text{ where } M_i^{KP} \text{ is the i-th row of } M^{KP},$$
$$\text{and } I^{KP} \subseteq \{i \in \{1,\ldots,L^{KP}\} | [\rho^{KP}(i)=(t,\vec{v}_i^{KP}) \wedge$$
$$(t,\vec{x}_t^{KP}) \in \Gamma^{KP} \wedge \vec{v}_i^{KP} \cdot \vec{x}_t^{KP}=0] \vee [\rho^{KP}(i)=$$
$$\neg(t,\vec{v}_i^{KP}) \wedge (t,\vec{x}_t^{KP}) \in \Gamma^{KP} \wedge \vec{v}_i^{KP} \cdot \vec{x}_t^{KP} \neq 0]\}$$ [Formula 155]

Also, with the processing device, the CP complementary coefficient calculation part 342 calculates $I^{CP}$ and a constant (complementary coefficient) $\alpha_i^{CP}$ for each integer i included in $I^{CP}$, which $I^{CP}$ and $\alpha_i^{CP}$ satisfying Formula 156.

$$\vec{1}=\Sigma_{i \in I}\alpha_i^{CP}M_i^{CP}, \text{ where } M_i^{CP} \text{ is the i-th row of } M^{CP},$$
$$\text{and } I^{CP} \subseteq \{i \in \{1,\ldots,L^{CP}\} | [\rho^{CP}(i)=(t,\vec{v}_i^{CP}) \wedge$$
$$(t,\vec{x}_t^{CP}) \in \Gamma^{CP} \wedge \vec{v}_i^{CP} \cdot \vec{x}_t^{CP}=0] \vee [\rho^{CP}(i)=$$
$$\neg(t,\vec{v}_i^{CP}) \wedge (t,\vec{x}_t^{CP}) \in \Gamma^{CP} \wedge \vec{v}_i^{CP} \cdot \vec{x}_t^{CP} \neq 0]\}$$ [Formula 156]

(S405: Pairing Operation Step)

The pairing operation part 350 generates a session key $K=g_T^{\zeta}$ by calculating Formula 157 with the processing device.

$$K:=e(c_0, k_0^*) \cdot \prod_{i \in I^{KP} \wedge \rho^{KP}(i)=(t,\vec{v}_i^{KP})} e(c_t^{KP}, k_i^{*KP})$$

$$\alpha_i^{KP} \cdot \prod_{i \in I^{KP} \wedge \rho^{KP}(i)=\neg(t,\vec{v}_i^{KP})} e(c_t^{KP}, k_i^{*KP})$$

$$\alpha_i^{KP}/(\vec{v}_i^{KP} \cdot \vec{x}_t^{KP}) \cdot \prod_{i \in I^{CP} \wedge \rho^{CP}(i)=(t,\vec{v}_i^{CP})} e(c_t^{CP},$$

$$k_i^{*CP})\alpha_i^{CP} \cdot \prod_{i \in I^{CP} \wedge \rho^{CP}(i)=\neg(t,\vec{v}_i^{CP})} e$$

$$(c_t^{CP}, k_i^{*CP})\alpha_i^{CP}/(\vec{v}_i^{CP} \cdot \vec{x}_t^{CP})$$ [Formula 157]

By calculating Formula 157, the key $K=g_T^{\zeta}$ is obtained, as indicated in Formula 158.

$$K:=e(c_0, k_0^*) \cdot \prod_{i \in I^{KP} \wedge \rho^{KP}(i)=(t,\vec{v}_i^{KP})} e(c_t^{KP}, k_i^{*KP})^{\alpha_i^{KP}} \cdot$$ [Formula 158]

$$\prod_{i \in I^{KP} \wedge \rho^{KP}(i)=\neg(t,\vec{v}_i^{KP})} e(c_t^{KP}, k_i^{*KP})^{\alpha_i^{KP}/(\vec{v}_i^{KP} \cdot \vec{x}_t^{KP})} \cdot$$

$$\prod_{i \in I^{CP} \wedge \rho^{CP}(i)=(t,\vec{v}_i^{CP})} e(c_t^{CP}, k_i^{*CP})^{\alpha_i^{CP}} \cdot$$

$$\prod_{i \in I^{CP} \wedge \rho^{CP}(i)=\neg(t,\vec{v}_i^{CP})}$$

-continued $$e(c_t^{CP}, k_i^{*CP})^{\alpha_i^{CP}/(\vec{v}_i^{CP} \cdot \vec{x}_i^{CP})} =$$

$$g_T^{-\varpi^{KP}s_0^{KP}-\delta^{CP}s_0^{CP}+\zeta} \cdot \prod_{i \in I^{KP} \wedge \rho^{KP}(i)=(t,\vec{v}_i^{KP})} g_T^{\varpi^{KP}\alpha_i s_i^{KP}} \cdot$$

$$\prod_{i \in I^{KP} \wedge \rho^{KP}(i)=\neg(t,\vec{v}_i^{KP})}$$

$$g_T^{\varpi^{KP}\alpha_i s_i^{KP}(\vec{v}_i^{KP} \cdot \vec{x}_t^{KP})/(\vec{v}_i^{KP} \cdot \vec{x}_t^{KP})} \cdot$$

$$\prod_{i \in I^{CP} \wedge \rho^{CP}(i)=(t,\vec{v}_i^{CP})} g_T^{\delta^{CP}\alpha_i s_i^{CP}} \cdot$$

$$\prod_{i \in I^{CP} \wedge \rho^{CP}(i)=\neg(t,\vec{v}_i^{CP})}$$

$$g_T^{\delta^{CP}\alpha_i s_i^{CP}(\vec{v}_i^{CP} \cdot \vec{x}_t^{CP})/(\vec{v}_i^{CP} \cdot \vec{x}_t^{CP})} =$$

$$g_T^{-\varpi^{KP}s_0^{KP}-\delta^{CP}s_0^{CP}+\zeta+\varpi^{KP}s_0^{KP}+\delta^{CP}s_0^{CP}} = g_T^{\zeta}$$

(S406: Message Calculation Step)

The message calculation part 360 generates a message m' (=m) by calculating $m'=c_{d+1}/K$ with the processing device. Note that message encrypted data $c_{d+1}$ is $g_T^{\zeta}m$ as indicated in Formula 152. Since K is $g_T^{\zeta}$, the message m can be obtained by calculating $m'=c_{d+1}/K$.

More specifically, from (S401) through (S406), the decryption device 300 generates the message m'(=m) by executing the Dec algorithm indicated in Formula 159.

[Formula 159]

$$Dec\left(pk, sk_{(\mathbb{S}^{KP},\Gamma^{CP})}:=(k_0^*; \mathbb{S}^{KP}, k_1^{*KP}, \ldots, k_{L^{KP}}^{*KP}; \Gamma^{CP}, \{k_t^{*CP}\}_{(t,\vec{x}_t^{CP}) \in \Gamma^{CP}}\right),$$

$$ct_{(\Gamma^{KP},\mathbb{S}^{CP})}:=$$

$$\left(c_0; \Gamma^{KP}, \{c_t^{KP}\}_{(t,\vec{x}_t^{KP}) \in \Gamma^{KP}}; \mathbb{S}^{CP}, c_1^{CP}, \ldots, c_{L^{CP}}^{CP}; c_{d+1}\right)\right): \text{If } \mathbb{S}^{KP}:=$$

$$(M^{KP}, \rho^{KP}) \text{ accepts } \Gamma^{KP}:=\left\{(t, \vec{x}_t^{KP})\right\} \text{ and } \mathbb{S}^{CP}:=$$

$$(M^{CP}, \rho^{CP}) \text{ accepts } \Gamma^{CP}:=\left\{(t, \vec{x}_t^{CP})\right\},$$

then compute $(I^{KP}, \{\alpha_i^{KP}\}_{i \in I^{KP}})$ and $(I^{CP}, \{\alpha_i^{CP}\}_{i \in I^{CP}})$ such that $\vec{1} =$ $$\sum_{i \in I}\alpha_i^{KP}M_i^{KP},$$

where $M_i^{KP}$ is the i-th row of $M^{KP}$, and $I^{KP} \subseteq$ $$\left\{i \in \{1,\ldots,L^{KP}\} \mid \left[\rho^{KP}(i)=(t,\vec{v}_i^{KP}) \wedge (t,\vec{x}_t^{KP}) \in \Gamma^{KP} \wedge \vec{v}_i^{KP} \cdot \vec{x}_t^{KP} = \right.\right.$$

$$\left.\left. 0\right] \vee \left[\rho^{KP}(i)=\neg(t,\vec{v}_i^{KP}) \wedge (t,\vec{x}_t^{KP}) \in \Gamma^{KP} \wedge \vec{v}_i^{KP} \cdot \vec{x}_t^{KP} \neq 0\right]\right\},$$

and $\vec{1} = \sum_{i \in I}\alpha_i^{CP}M_i^{CP}$, where $M_i^{MP}$ is the i-th row of $M^{CP}$, and $I^{CP} \subseteq$ $$\left\{i \in \{1,\ldots,L^{CP}\} \mid \left[\rho^{CP}(i)=(t,\vec{v}_i^{CP}) \wedge (t,\vec{x}_t^{CP}) \in \Gamma^{CP} \wedge \vec{v}_i^{CP} \cdot \vec{x}_t^{CP} = \right.\right.$$

$$\left.\left. 0\right] \vee \left[\rho^{CP}(i)=\neg(t,\vec{v}_i^{CP}) \wedge (t,\vec{x}_t^{CP}) \in \Gamma^{CP} \wedge \vec{v}_i^{CP} \cdot \vec{x}_t^{CP} \neq 0\right]\right\},$$

-continued $$K := e(c_0, k_0^*) \cdot \prod_{i \in I^{KP} \wedge \rho^{KP}(i) = (t, \vec{v}_i^{KP})} e(c_t^{KP}, k_i^{*KP})$$

$$\alpha_i^{KP} \cdot \prod_{i \in I^{KP} \wedge \rho^{KP}(i) = \neg (t, \vec{v}_i^{KP})} e(c_t^{KP}, k_i^{*KP})^{\alpha_i^{KP} / (\vec{v}_i^{KP} \cdot \vec{x}_t^{KP})} \cdot$$

$$\prod_{i \in I^{CP} \wedge \rho^{CP}(i) = (t, \vec{v}_i^{CP})} e(c_t^{CP}, k_i^{*CP})^{\alpha_i^{CP}} \cdot$$

$$\prod_{i \in I^{CP} \wedge \rho^{CP}(i) = \neg (t, \vec{v}_i^{CP})} e(c_t^{CP}, k_i^{*CP})^{\alpha_i^{CP} / (\vec{v}_i^{CP} \cdot \vec{x}_t^{CP})},$$

return $m' := c_{d+1} / K$.

As described above, the cryptographic processing system 10 implements the encryption scheme (functional encryption scheme) using the access structures $S^{KP}$ and $S^{CP}$ constructed using the span program, inner-product predicate, and secret sharing. Therefore, the cryptographic processing system 10 implements an encryption scheme that can design access control with a very high degree of freedom.

In particular, the cryptographic processing system 10 imparts the access structure $S^{KP}$ to the decryption key and the access structure $S^{CP}$ to the encrypted data. Thus, the cryptographic processing system 10 can conduct access control in terms of both the decryption key and the encrypted data.

In the above description, the dimensions $u_t$, $w_t$, and $z_t$ (t= 0, . . . , d+1) are provided to enhance the security. Therefore, if the dimensions $u_t$, $w_t$, and $z_t$ (t=0, . . . , d+1) are each set to 0, the dimensions $u_t$, $w_t$, and $z_t$ (t=0, d+1) need not be provided, although the security may be degraded.

In the above description, in (S101), $2+u_0+1+w_0+z_0$ is set in $N_0$. Alternatively, $2+u_0+1+w_0+z_0$ may be replaced by $2+2+1+2+1$, and 8 may be set in $N_0$.

In the above description, in (S101), $n_t^{KP}+u_t^{KP}+w_t^{KP}+z_t^{KP}$ is set in $N_t^{KP}$. Alternatively, $n_t^{KP}+u_t^{KP}+w_t^{KP}+z_t^{KP}$ may be replaced by $n_t^{KP}+n_t^{KP}+n_t^{KP}+1$, and $3n_t^{KP}+1$ may be set in $N_t^{KP}$.

Similarly, in (S101), $n_t^{CP}+u_t^{CP}+w_t^{CP}+z_t^{CP}$ is set in $N_t^{CP}$. Alternatively, $n_t^{CP}+u_t^{CP}+w_t^{CP}+z_t^{CP}$ may be replaced by $n_t^{CP}+n_t^{CP}+n_t^{CP}+1$, and $3n_t^{CP}$ may be set in $N_t^{CP}$.

In this case, the Setup algorithm indicated in Formula 136 is rewritten as indicated in Formula 160. Note that $G_{ob}^{UP}$ is written as indicated in Formula 161.

[Formula 160]

$$\text{Setup}(1^\lambda, \vec{n} := ((d^{KP}; n_1^{KP}, \ldots, n_{d^{KP}}^{KP}), (d^{CP}; n_1^{CP}, \ldots, n_{d^{CP}}^{CP}))):$$

$$(param_{\vec{n}}, \mathbb{B}_0, \mathbb{B}_0^*, \{\mathbb{B}_t^{KP}, \mathbb{B}_t^{*KP}\}_{t=1,\ldots,d^{KP}},$$

$$\{\mathbb{B}_t^{CP}, \mathbb{B}_t^{*CP}\}_{t=1,\ldots,d^{CP}}) \xleftarrow{R} \mathcal{G}_{ob}(1^\lambda, \vec{n}),$$

$$\hat{\mathbb{B}}_0 := (b_{0,1}, b_{0,2}, b_{0,5}, b_{0,8}), \hat{\mathbb{B}}_0^* := (b_{0,1}^*, b_{0,2}^*, b_{0,5}^*, b_{0,6}^*, b_{0,7}^*),$$

$$\text{for } t = 1, \ldots, d^{KP}, \hat{\mathbb{B}}_t^{KP} := \left(b_{t,1}^{KP}, \ldots, b_{t,n_t^{KP}}^{KP}, b_{t,3n_t^{KP}+1}^{KP}\right),$$

$$\hat{\mathbb{B}}_t^{*KP} := \left(b_{t,1}^{*KP}, \ldots, b_{t,n_t^{KP}}^{*KP}, b_{t,2n_t^{KP}+1}^{*KP}, \ldots, b_{t,3n_t^{KP}}^{*KP}\right),$$

$$\text{for } t = 1, \ldots, d^{CP}, \hat{\mathbb{B}}_t^{CP} := \left(b_{t,1}^{CP}, \ldots, b_{t,n_t^{CP}}^{CP}, b_{t,3n_t^{CP}+1}^{CP}\right),$$

$$\hat{\mathbb{B}}_t^{*CP} := \left(b_{t,1}^{*CP}, \ldots, b_{t,n_t^{CP}}^{*CP}, b_{t,2n_t^{CP}+1}^{*CP}, \ldots, b_{t,3n_t^{CP}}^{*CP}\right),$$

$$pk := (1^\lambda, param_{\vec{n}}, \hat{\mathbb{B}}_0, \{\hat{\mathbb{B}}_t^{KP}\}_{t=1,\ldots,d^{KP}}, \{\hat{\mathbb{B}}_t^{CP}\}_{t=1,\ldots,d^{CP}}),$$

$$sk := (\hat{\mathbb{B}}_0^*, \{\hat{\mathbb{B}}_t^{*KP}\}_{t=1,\ldots,d^{KP}}, \{\hat{\mathbb{B}}_t^{*CP}\}_{t=1,\ldots,d^{CP}})$$

return pk, sk.

[Formula 161]

$$\mathcal{G}_{ob}^{up}(1^\lambda, \vec{n} := ((d^{KP}; n_1^{KP}, \ldots, n_{d^{KP}}^{KP}), (d^{CP}; n_1^{CP}, \ldots, n_{d^{CP}}^{CP}))): param_\mathbb{G} :=$$

$$(q, \mathbb{G}, \mathbb{G}_T, g, e) \xleftarrow{R} \mathcal{G}_{bpg}(1^\lambda), \psi \xleftarrow{U} \mathbb{F}_q^\times, N_0 := 8,$$

$$N_t^{KP} := 3n_t^{KP} + 1 \text{ for } t = 1, \ldots, d^{KP}, N_t^{CP} := 3n_t^{CP} + 1 \text{ for } t = 1,$$

$$\ldots, d^{CP}, param_{\mathbb{V}_0} := (q, \mathbb{V}_0, \mathbb{G}_T, \mathbb{A}_0, e) := \mathcal{G}_{dpvs}(1^\lambda, N_0, param_\mathbb{G}),$$

$$X_0 := (\chi_{0,i,j})_{i,j} \xleftarrow{U} GL(N_0, \mathbb{F}_q),$$

$$(v_{0,i,j})_{i,j} := \psi \cdot (X_0^T)^{-1}, b_{0,i} := (\chi_{0,i,1}, \ldots, \chi_{0,i,N_0})_{\mathbb{A}_0},$$

$$\mathbb{B}_0 := (b_{0,1}, \ldots, b_{0,N_0}), b_{0,i}^* := (v_{0,i,1}, \ldots, v_{0,i,N_0})_{\mathbb{A}_0},$$

$$\mathbb{B}_0^* := (b_{0,i}^*, \ldots, b_{0,N_0}^*), \text{ for } t = 1, \ldots, d^{KP},$$

$$param_{\mathbb{V}_t^{KP}} := (q, \mathbb{V}_t^{KP}, \mathbb{G}_T, \mathbb{A}_t^{KP}, e) := \mathcal{G}_{dpvs}(1^\lambda, N_t^{KP}, param_\mathbb{G}),$$

$$X_t^{KP} := (\chi_{t,i,j}^{KP})_{i,j} \xleftarrow{U} GL(N_t^{KP}, \mathbb{F}_q), (v_{t,i,j}^{KP})_{i,j} := \psi \cdot (X_t^{KP})^T)^{-1},$$

$$b_{t,i}^{KP} := \left(\chi_{t,i,1}^{KP}, \ldots, \chi_{t,i,N_t^{KP}}^{KP}\right)_{\mathbb{A}_t^{KP}}, \mathbb{B}_t^{KP} := \left(b_{t,1}^{KP}, \ldots, b_{t,N_t^{KP}}^{KP}\right),$$

$$b_{t,i}^{*KP} := \left(v_{t,i,1}^{KP}, \ldots, v_{t,i,N_t^{KP}}^{KP}\right)_{\mathbb{A}_t^{KP}},$$

$$\mathbb{B}_t^{*KP} := \left(b_{t,1}^{*KP}, \ldots, b_{t,N_t^{KP}}^{*KP}\right),$$

for $t = 1, \ldots, d^{CP}$, $$param_{\mathbb{V}_t^{CP}} := (q, \mathbb{V}_t^{CP}, \mathbb{G}_T, \mathbb{A}_t^{CP}, e) := \mathcal{G}_{dpvs}(1^\lambda, N_t^{CP}, param_\mathbb{G}),$$

$$X_t^{CP} := (\chi_{t,i,j}^{CP})_{i,j} \xleftarrow{U} GL(N_t^{CP}, \mathbb{F}_q), (v_{t,i,j}^{CP})_{i,j} := \psi \cdot (X_t^{CP})^T)^{-1},$$

$$b_{t,i}^{CP} := \left(\chi_{t,i,1}^{CP}, \ldots \chi_{t,i,N_t^{CP}}^{CP}\right)_{\mathbb{A}_t^{CP}}, \mathbb{B}_t^{CP} := \left(b_{t,1}^{CP}, \ldots, b_{t,N_t^{CP}}^{CP}\right),$$

$$b_{t,i}^{*CP} := \left(v_{t,i,1}^{CP}, \ldots, v_{t,i,N_t^{CP}}^{CP}\right)_{\mathbb{A}_t^{CP}},$$

$$\mathbb{B}_t^{*CP} := \left(b_{t,1}^{*CP}, \ldots, b_{t,N_t^{CP}}^{*CP}\right), g_T := e(g, g)^\psi,$$

$$param_{\vec{n}} := \left(param_{\mathbb{V}_0}, \{param_{\mathbb{V}_t^{KP}}\}_{t=1,\ldots,d^{KP}}, \{param_{\mathbb{V}_t^{CP}}\}_{t=1,\ldots,d^{CP}}, g_T\right)$$

return $$(param_{\vec{n}}, \{\mathbb{B}_0, \mathbb{B}_0^*\}, \{\mathbb{B}_t^{KP}, \mathbb{B}_t^{*KP}\}_{t=1,\ldots,d^{KP}}, \{\mathbb{B}_t^{CP}, \mathbb{B}_t^{*CP}\}_{t=1,\ldots,d^{CP}}).$$

Also, the KeyGen algorithm indicated in Formula 144 is rewritten as indicated in Formula 162.

[Formula 162]

$$KeyGen\Big(pk, sk, \mathbb{S}^{KP} := (M^{KP}, \rho^{KP}), \Gamma^{CP} :=$$

$$\left\{\left(t, \vec{x}_t^{CP} := \left(x_{t,1}^{CP}, \ldots, x_{t,n_t^{CP}}^{CP}\right) \in \mathbb{F}_q^{n_t^{CP}} \setminus \{\vec{0}\}\right) \middle| 1 \leq t \leq d^{CP}, x_{t,1}^{CP} := 1\right\}\Big)$$

$$\vec{f}^{KP} \xleftarrow{U} \mathbb{F}_q^{r^{KP}}, (\vec{s}^{KP})^T := (s_1^{KP}, \ldots, s_{L^{KP}}^{KP})^T := M^{KP} \cdot (\vec{f}^{KP})^T,$$

$$s_0^{KP} := \vec{1} \cdot (\vec{f}^{KP})^T,$$

$$\delta^{CP} \xleftarrow{U} \mathbb{F}_q, \eta_t^{CP} \xleftarrow{U} \mathbb{F}_q^{n_t^{CP}} \text{ such that}$$

$$\left(t, \vec{x}_t^{CP}\right) \in \Gamma^{CP},$$

$$(\eta_{0,1}, \eta_{0,2}) \xleftarrow{U} \mathbb{F}_q^2,$$

-continued $k_0^* := (-s_0^{KP}, \delta^{CP}, 0, 0, 1, \eta_{0,1}, \eta_{0,2}, 0)_{B_0^*}$, for $i = 1, \ldots, L^{KP}$, if $\rho^{KP}(i) = (t, \vec{v}_i^{KP} := (v_{i,1}^{KP}, \ldots, v_{i,n_t^{KP}}^{KP}) \in \mathbb{F}_q^{n_t^{KP}} \setminus \{\vec{0}\})$, $\theta_i^{KP} \xleftarrow{U} \mathbb{F}_q$, $\vec{\eta}_i^{KP} \xleftarrow{U} \mathbb{F}_q^{n_t^{KP}}$, $k_i^{*KP} := \left( \overbrace{s_i^{KP} \vec{e}_{t,1}^{KP} + \theta_i^{KP} \vec{v}_i^{KP}}^{n_t^{KP}}, \overbrace{0^{n_t^{KP}}}^{n_t^{KP}}, \overbrace{\vec{\eta}_i^{KP}}^{n_t^{KP}}, \overbrace{0}^{1} \right)_{B_t^{*KP}}$, if $\rho^{KP}(i) = \neg (t, \vec{v}_i^{KP})$, $\vec{\eta}_i^{KP} \xleftarrow{U} \mathbb{F}_q^{n_t^{KP}}$, $k_i^{*KP} := \left( \overbrace{s_i^{KP} \vec{v}_i^{KP}}^{n_t^{KP}}, \overbrace{0^{n_t^{KP}}}^{n_t^{KP}}, \overbrace{\vec{\eta}_i^{KP}}^{n_t^{KP}}, \overbrace{0}^{1} \right)_{B_t^{*KP}}$, for $(t, \vec{x}_t^{CP}) \in \Gamma^{CP}$, $k_t^{*CP} := \left( \overbrace{\delta^{CP} \vec{x}_t^{CP}}^{n_t^{CP}}, \overbrace{0^{n_t^{CP}}}^{n_t^{CP}}, \overbrace{\vec{\eta}_t^{CP}}^{n_t^{CP}}, \overbrace{0}^{1} \right)_{B_t^{*CP}}$, return $sk_{(\mathbb{S}^{KP}, \Gamma^{CP})} := (k_0^*; \mathbb{S}^{KP}, k_1^{*KP}, \ldots, k_{L^{KP}}^{*KP}; \Gamma^{CP}, \{k_t^{*CP}\}_{(t, \vec{x}_t^{CP}) \in \Gamma^{CP}})$.

Also, the Enc algorithm indicated in Formula 154 is rewritten as indicated in Formula 163.

[Formula 163]

$Enc(pk, m, \Gamma^{KP} :=$ $\{(t, \vec{x}_t^{KP} := (x_{t,1}^{KP}, \ldots, x_{t,n_t^{KP}}^{KP}) \in \mathbb{F}_q^{n_t^{KP}} \setminus \{\vec{0}\}) \mid 1 \leq t \leq d^{KP}, x_{t,1}^{KP} := 1\}$, $\mathbb{S}^{CP} := (M^{CP}, \rho^{CP})) : \omega^{KP}, \varphi_0, \varphi_t^{KP}, \zeta \xleftarrow{U} \mathbb{F}_q$ for $(t, \vec{x}_t^{KP}) \in \Gamma$, $\vec{f}^{CP} \xleftarrow{R} \mathbb{F}_q^{r^{CP}}$, $(\vec{s}^{CP})^T := (s_1^{CP}, \ldots, s_{L^{CP}}^{CP})^T := M^{CP} \cdot (\vec{f}^{CP})^T$, $s_0^{CP} := \vec{1} \cdot (\vec{f}^{CP})^T$, $c_0 := (\omega^{KP}, -s_0^{CP}, 0, 0, \zeta, 0, 0, \varphi_0)_{B_0}$, for $(t, \vec{x}_t^{KP}) \in \Gamma^{KP}$, $c_t^{KP} := \left( \overbrace{\omega^{KP} \vec{x}_t^{KP}}^{n_t^{KP}}, \overbrace{0^{n_t^{KP}}}^{n_t^{KP}}, \overbrace{0^{n_t^{KP}}}^{n_t^{KP}}, \overbrace{\varphi_t^{KP}}^{1} \right)_{B_t^{KP}}$, for $i = 1, \ldots, L^{CP}$, if $\rho^{CP}(i) = (t, \vec{v}_i^{CP} := (v_{i,1}^{CP}, \ldots, v_{i,n_t^{CP}}^{CP}) \in \mathbb{F}_q^{n_t^{CP}} \setminus \{\vec{0}\})(v_{i,n_t^{CP}}^{CP} := 1)$, $\varphi_i^{CP}, \theta_i^{CP} \xleftarrow{U} \mathbb{F}_q$, $c_i^{CP} := \left( \overbrace{s_i^{CP} \vec{e}_{t,1}^{CP} + \theta_i^{CP} \vec{v}_i^{CP}}^{n_t^{CP}}, \overbrace{0^{n_t^{CP}}}^{n_t^{CP}}, \overbrace{0^{n_t^{CP}}}^{n_t^{CP}}, \overbrace{\varphi_i^{CP}}^{1} \right)_{B_t^{CP}}$, if $\rho^{CP}(i) = \neg (t, \vec{v}_i^{CP})$, $\varphi_i^{CP} \xleftarrow{U} \mathbb{F}_q$, $c_i^{CP} := \left( \overbrace{s_i^{CP} \vec{v}_i^{CP}}^{n_t^{CP}}, \overbrace{0^{n_t^{CP}}}^{n_t^{CP}}, \overbrace{0^{n_t^{CP}}}^{n_t^{CP}}, \overbrace{\varphi_i^{CP}}^{1} \right)_{B_t^{CP}}$, $c_{d+1} := g_T^\zeta m$, return $ct_{(\Gamma^{KP}, \mathbb{S}^{CP})} :=$ $(c_0; \Gamma^{KP}, \{c_t^{KP}\}_{(t, \vec{x}_t^{KP}) \in \Gamma^{KP}}; \mathbb{S}^{CP}, c_1^{CP}, \ldots, c_{L^{CP}}^{CP}; c_{d+1})$.

Note that the Dec algorithm indicated in Formula 159 remains unchanged.

Also, in the above description, in (S101), 8 is set in $N_0$. However, $N_0$ need not be 8 but may be an integer of 3 or more. When $N_0$ is 3, the bases $B_0$ and $B^*_0$ become two-dimensional. In the case where $N_0$ is 3, $k^*_0 := (-s_0^{KP}, \delta^{CP}, 1)_{B*0}$ may be set in the KeyGen algorithm and $c_0 := (\omega^{KP}, -s_0^{CP}, \zeta)_B 0$ may be set in the Enc algorithm. Note that $B*0$ represents $B^*_0$ and that $B0$ represents $B_0$.

In the above description, $k^*_0 := (-s_0, \delta^{CP}, 0, 0, 1, \eta_{0,1}, \eta_{0,2}, 0)_{B*0}$ is set in the KeyGen algorithm. Alternatively, by employing a predetermined value K that can be known to the encryption device 200, $k^*_0 := (-s_0, \delta^{CP}, 0, 0, \kappa, \eta_{0,1}, \eta_{0,2}, 0)_{B*0}$ may be set. Note that $B*0$ represents $B^*_0$ and that B0 represents $B_0$. In this case, since $K := g_T^{\zeta\kappa}$ is calculated in the Dec algorithm, $c_{d+1} := g_T^{\zeta\kappa} m$ may be set in the Enc algorithm.

In the above description, the value of $v_{i,ntCP}^{CP}$ (where ntCP represents $n_t^{CP}$) is not particularly limited. However, a limitation of $v_{i,ntCP}^{CP} := 1$ may be placed from the viewpoint of security proof From the viewpoint of security proof $\rho^{\sim KP}(i)$ for each integer $i = 1, \ldots, L^{KP}$ may be limited to a positive tuple (t, $\vec{v}_i^{KP}$) or negative tuple $\neg$ (t, $\vec{v}_i^{KP}$) for different identification information t.

In other words, let a function $\rho^{\sim KP}$ be map of $\{1, \ldots, L\} \to \{1, \ldots, d^{KP}\}$ with which $\rho^{\sim KP}(i) = t$ is established when $\rho^{KP}(i) = (t, \vec{v}_i^{KP})$ or $\rho^{KP}(i) = \neg (t, \vec{v}_i^{KP})$. In this case, $\rho^{\sim KP}$ may be limited to injection. Note that $\rho^{KP}(i)$ is $\rho^{KP}(i)$ in the access structure $S^{KP} := (M^{KP}, \rho^{KP}(i))$ described above.

Similarly, $\rho^{CP}(i)$ for each integer $i = 1, \ldots, L^{CP}$ may be limited to a positive tuple (t, $\vec{v}_i^{CP}$) or negative tuple $\neg$ (t, $\vec{v}_i^{KP}$) for different identification information t.

In other words, let a function $\rho^{\sim CP}$ be map of $\{1, \ldots, L\} \to \{1, \ldots, d^{KP}\}$ with which $\rho^{\sim CP}(i) = t$ is established when $\rho^{CP}(i) = (t, \vec{v}_i^{KP})$ or $\rho^{KP}(i) = \neg (t, \vec{v}_i^{KP})$. In this case, $\rho^{\sim CP}$ may be limited to injection. Note that $\rho^{CP}(i)$ is $\rho^{CP}(i)$ in the access structure $S^{CP} := (M^{CP}, \rho^{CP}(i))$ described above.

The Setup algorithm may be executed only once at the setup of the cryptographic processing system 10, and need not be executed every time a decryption key is to be generated. In the above description, the Setup algorithm and the KeyGen algorithm are executed by the key generation device 100. Alternatively, the Setup algorithm and the KeyGen algorithm may be executed by different devices respectively.

In the above description, the span program M^ accepts the input sequence δ if and only if linear combination of the rows of the matrix $M_δ$ obtained from the matrix ^ by the input sequence δ gives $\vec{1}$. Alternatively, the span program M^ may accept the input sequence δ only if another vector $\vec{h}$ is obtained instead of $\vec{1}$.

In this case, in the KeyGen algorithm, $s_0 := \vec{h}^{\to KP} \cdot (\vec{f}^{\to KP})^T$ may be set instead of $s_0 := \vec{1}^\to \cdot (\vec{f}^{\to KP})^T$. Likewise, in the Enc algorithm, $s_0 := \vec{h}^{\to CP} \cdot (\vec{f}^{\to CP})^T$ may be set instead of $s_0^{CP} := \vec{1}^\to \cdot (\vec{f}^{\to CP})^T$.

Embodiment 2

In the above embodiment, the method of implementing the cryptographic process in the dual vector spaces has been described. In Embodiment 2, a method of implementing a cryptographic process in dual additive groups will be described.

More specifically, in the above embodiment, the cryptographic process is implemented in the cyclic group of the prime order q. When a ring R is expressed using a composite number M as indicated in Formula 164, the cryptographic process described in the above embodiment can also be applied to an additive group having the ring R as a coefficient.

$$\mathbb{R} := \mathbb{Z}/M\mathbb{Z} \qquad \text{[Formula 164]}$$

where $\mathbb{Z}$ : an integer; and

M: a composite number

For example, when the unified-policy functional encryption described in Embodiment 1 is implemented in an additive group having a ring R as a coefficient, then Formulas 165 to 169 are resulted.

$$\mathcal{G}_{ob}^{up}(1^\lambda, \vec{n} := ((d^{KP}; n_t^{KP}, u_t^{KP}, w_t^{KP}, z_t^{KP}(t = 1, \ldots, d^{KP})), \qquad \text{[Formula 165]}$$
$$(d^{CP}; n_t^{CP}, u_t^{CP}, w_t^{CP}, z_t^{CP}(t = 1, \ldots, d^{CP}))):$$

$param_G := (q, G, G_T, g, e) \xleftarrow{R} \mathcal{G}_{bpg}(1^\lambda), \psi \xleftarrow{U} R^X,$ $N_0 := 2 + u_0 + 1 + w_0 + z_0,$ $N_t^{KP} := n_t^{KP} + u_t^{KP} + w_t^{KP} + z_t^{KP}$ for $t = 1, \ldots, d^{KP},$ $N_t^{CP} := n_t^{CP} + u_t^{CP} + w_t^{CP} + z_t^{CP}$ for $t = 1, \ldots, d^{CP},$ $param_{V_0} := (q, V_0 G_T, A_0, e) := \mathcal{G}_{dpvs}(1^\lambda, N_0, param_G),$ $X_0 := (\chi_{0,i,j})_{i,j} \xleftarrow{U} GL(N_0 R), (v_{0,i,j})_{i,j} := \psi \cdot (X_0^T)^{-1},$ $b_{0,i} := (\chi_{0,i,1}, \ldots, \chi_{0,i,N_0})A_0, B_0 := (b_{0,1}, \ldots, b_0, N_0),$ $b_{0,i}^* := (v_{0,i,1}, \ldots, v_{0,i,N_0})A_0, B_0^* := (b_{0,1}^*, \ldots, b_0^*, N_0),$ for $t = 1, \ldots, d^{KP},$ $param_{V_t^{KP}} :=$ $\qquad (q, V_t^{KP}, G_T, A_t^{KP}, e) := \mathcal{G}_{dpvs}(1^\lambda, N_t^{KP}, param_G),$ $X_t^{KP} := (\chi_{t,i,j}^{KP})_{i,j} \xleftarrow{} GL(N_t^{KP}, F_q),$ $(V_{t,i,j}^{KP})_{i,j} := \psi \cdot ((X_t^{KP})^T)^{-1},$ $b_{t,i}^{KP} := (\chi_{t,i,1}^{KP}, \ldots, \chi_{t,i,N_t^{KP}}^{KP})A_t^{KP},$ $B_t^{KP} := (b_{t,1}^{KP}, \ldots, b_{t,N_t^{KP}}^{KP}),$ $b_{t,i}^{*KP} := (v_{t,i,1}^{KP}, \ldots, v_{t,i,N_t^{KP}}^{KP})A_t^{KP},$ $B_t^{*KP} := (b_{t,1}^{*KP}, \ldots, b_{t,N_t^{KP}}^{*KP}),$ for $t = 1, \ldots, d^{CP},$ $param_{V_t^{CP}} :=$ $\qquad (q, V_t^{CP}, G_T, A_t^{CP}, e) := \mathcal{G}_{dpvs}(1^\lambda, N_t^{CP}, param_G),$ $X_t^{CP} := (\chi_{t,i,j}^{CP})_{i,j} \xleftarrow{U} GL(N_t^{CP}, F_q),$ $(v_{t,i,j}^{CP})_{i,j} := \psi \cdot ((X_t^{CP})^T)^{-1},$ $b_{t,i}^{CP} := (\chi_{t,i,1}^{CP}, \ldots, \chi_{t,i,N_t^{CP}}^{CP})A_i^{CP},$ $B_t^{CP} := (b_{t,1}^{CP}, \ldots, b_{t,N_t^{CP}}^{CP}),$ $b_{t,i}^{*CP} := (v_{t,i,1}^{CP}, \ldots, v_{t,i,N_t^{CP}}^{CP})A_i^{CP},$ $B_t^{*CP} := (b_{t,1}^{*CP}, \ldots, b_{t,N_t^{CP}}^{*CP}),$ -continued $g_T := e(g, g)\psi,$ $param_{\vec{n}} := (param_{V_0}, \{param_{V_t^{KP}}\}_{t=1,\ldots,d^{KP}},$ $\{param_{V_t^{CP}}\}_{t=1,\ldots,d^{CP}}, g_T)$ $\text{return}(param_{\vec{n}}, \{B_0, B_0^*\}, B_t^{KP}, B_t^{*KP}\}_{t=1,\ldots,d^{KP}},$ $\{B_t^{CP}, B_t^{*CP}\}_{t=1,\ldots,d^{CP}}).$ $\text{Setup}(1^\lambda, \vec{n} := ((d^{KP}; n_t^{KP}, u_t^{KP}, w_t^{KP}, z_t^{KP}(t = 1, \ldots, d^{KP})), \qquad \text{[Formula 166]}$
$((d^{CP}; n_t^{CP}, u_t^{CP}, w_t^{CP}, z_t^{CP}(t = 1, \ldots, d^{CP}))):$ $(param_{\vec{n}}, B_0, B_0^* \{B_t^{KP}, B_t^{*KP}\}_{t=1,\ldots,d^{KP}},$ $\{B_t^{CP}, B_t^{*CP}\}_{t=1,\ldots,d^{CP}}) \xleftarrow{} \mathcal{G}_{ob}(1^\lambda, \vec{n}),$ $\hat{B}_0 := (b_{0,1}^*, b_{0,2}^*, b_{0,2+u_0+1}^*,$ $b_{0,2+u_0+1+w_0+1}^*, \ldots, b_{0,2+u_0+1+w_0+z_0}^*),$ $\hat{B}_0^* := (b_{0,1}^*, b_{0,2}^*, b_{0,2+u_0+1}^*,$ $b_{0,2+u_0+1+1}^*, \ldots, b_{0,2+u_0+1+w_0}^*),$ for $t = 1, \ldots, d^{KP},$ $\hat{B}_t^{KP} := (b_{t,1}^{KP}, \ldots, b_{t,n_t^{KP}}^{KP},$ $b_{t,n_t^{KP}+u_t^{KP}+w_t^{KP}+1}^{KP}, \ldots, b_{t,n_t^{KP}+u_t^{KP}+w_t^{KP}+z_t^{KP}}^{KP}),$ $\hat{B}_t^{*KP} := (b_{t,1}^{*KP}, \ldots, b_{t,n_t^{KP}}^{*KP},$ $b_{t,n_t^{KP}+u_t^{KP}+w_t^{KP}+1}^{*KP}, \ldots, b_{t,n_t^{KP}+u_t^{KP}+w_t^{KP}}^{*KP}),$ for $t = 1, \ldots, d^{CP},$ $\hat{B}_t^{CP} := (b_{t,1}^{CP}, \ldots, b_{t,n_t^{CP}}^{CP},$ $b_{t,n_t^{CP}+u_t^{CP}+w_t^{CP}+1}^{CP}, \ldots, b_{t,n_t^{CP}+u_t^{CP}+w_t^{CP}+z_t^{CP}}^{CP}),$ $\hat{B}_t^{*CP} := (b_{t,1}^{*CP}, \ldots, b_{t,n_t^{CP}}^{*CP},$ $b_{t,n_t^{CP}+u_t^{CP}+w_t^{CP}+1}^{*CP}, \ldots, b_{t,n_t^{CP}+u_t^{CP}+w_t^{CP}}^{*CP}),$ $pk := (1^\lambda, param_{\vec{n}}, \hat{B}_0,$ $\{\hat{B}_t^{KP}\}_{t=1,\ldots,d^{KP}}, \{\hat{B}_t^{CP}\}_{t=1,\ldots,d^{CP}}),$ $sk := (\hat{B}_0, \{\hat{B}_t^{KP}\}_{t=1,\ldots,d^{KP}}, \{\hat{B}_t^{CP}\}_{t=1,\ldots,d^{CP}})$ return $pk, sk.$ $\text{KeyGen}(pk, sk, S^{KP} := (M^{KP}, \rho^{KP}), \qquad \text{[Formula 167]}$ $\Gamma^{CP} := \{(t, \vec{x}_t^{CP} := (x_{t,1}^{CP}, \ldots, x_{t,n_t^{CP}}^{CP}) \in R^{n_t^{CP}} \setminus \{\vec{0}\})$ $|1 \le t \le d^{CP}, x_{t,1}^{CP} := \})$ $\vec{f}^{KP} \xleftarrow{U} R^{KP},$ $(s^{KP})^T := (s_1^{KP}, \ldots, s_{L^{KP}}^{KP})^T := M^{KP} \cdot (\vec{f}^{KP})^T,$ $s_0^{KP} := 1 \cdot (\vec{f}^{KP})^T,$ $\delta^{CP} \xleftarrow{U} R, \vec{\eta}_t^{CP} \xleftarrow{U} R^{w_t^{CP}}$ such that $(t, x_t^{CP}) \in \Gamma^{CP},$ -continued $\vec{\eta}_0 \xleftarrow{U} R^{w_0},$ $k_0^* := \left(-s_0^{KP}, \delta^{CP}, \overbrace{0^{u_0}}^{u_0}, 1, \overbrace{\eta_{0,1}, \ldots, \eta_{0,w_0}}^{w_0}, \overbrace{0^{z_0}}^{z_0}\right) B_0^*,$ for $i = 1, \ldots, L^{KP}$, if $\rho^{KP}(i) = \left(t, \vec{v}_i^{KP} := \left(v_{i,1}^{KP}, \ldots, v_{i,n_t^{KP}}^{KP}\right) \in R^{n_t^{KP}} \setminus \{\vec{0}\}\right),$ $\theta_i^{KP} \xleftarrow{U} R, \vec{\eta}_i^{KP} \xleftarrow{U} R^{w_t^{KP}},$ $k_i^{*KP} := \left(\overbrace{s_i^{KP} e_{t,1}^{KP} + \theta_i^{KP} v_i^{KP}}^{n_t^{KP}}, \overbrace{0^{u_t^{KP}}}^{u_t^{KP}}, \overbrace{\vec{\eta}_i^{KP}}^{w_t^{KP}}, \overbrace{0^{z_t^{KP}}}^{z_t^{KP}}\right) B_t^{*KP},$ if $\rho^{KP}(i) = \neg \left(t, \vec{v}_i^{KP}\right), \eta_i^{KP} \xleftarrow{U} R^{w_t^{KP}},$ $k_i^{*KP} := \left(\overbrace{s_i^{KP} \vec{v}_{t,1}^{KP}}^{n_t^{KP}}, \overbrace{0^{u_t^{KP}}}^{u_t^{KP}}, \overbrace{\vec{\eta}_i^{KP}}^{w_t^{KP}}, \overbrace{0^{z_t^{KP}}}^{z_t^{KP}}\right) B_t^{*KP},$ for $(t, x_t^{CP}) \in \Gamma^{CP},$ $k_t^{*CP} := \left(\overbrace{\delta^{CP} \vec{x}_t^{CP}}^{n_t^{CP}}, \overbrace{0^{u_t^{CP}}}^{u_t^{CP}}, \overbrace{\vec{\eta}_t^{CP}}^{w_t^{CP}}, \overbrace{0^{z_t^{CP}}}^{z_t^{CP}}\right) B_t^{*CP},$ return $sk_{(S^{KP}, \Gamma^{CP})} :=$ $\left(k_0^*; S^{KP}, k_1^{*KP}, \ldots, k_L^{*KP}; \Gamma^{CP}, \{k_t^{*CP}\}_{(t, \vec{x}_t^{CP}) \in \Gamma^{CP}}\right).$ $Enc(pk, m,$ [Formula 168]

$\Gamma^{KP} := \left\{\left(t, \vec{x}_t^{KP} := \left(x_{t,1}^{KP}, \ldots, x_{t,n_t^{KP}}^{KP}\right) \in R^{n_t^{KP}} \setminus \{\vec{0}\}\right) \mid \right.$ $\left. 1 \leq t \leq d^{KP}, x_{t,1}^{KP} := 1\right\},$ $S^{CP} := (M^{CP}, \rho^{CP}):$ $\omega^{KP}, \zeta \xleftarrow{U} R, \varphi_0 \xleftarrow{U} R^{z_0},$ $\vec{\varphi}_t^{KP} \xleftarrow{U} R^{z_t^{KP}}$ for $(t, x_t^{KP}) \in \Gamma,$ $\vec{f}^{CP} \xleftarrow{R} R^{r^{CP}},$ $(\vec{s}^{CP})^T := (s_1^{CP}, \ldots, s_L^{CP})^T := M^{CP} \cdot (\vec{f}^{CP})^T,$ $s_0^{CP} := \vec{1} \cdot (\vec{f}^{CP})^T,$ $c_0 := \left(\omega^{KP}, -s_0^{CP}, \overbrace{0^{u_0}}^{u_0}, \zeta, \overbrace{0^{w_0}}^{w_0}, \overbrace{\varphi_{0,1}, \ldots, \varphi_{0,z_0}}^{z_0}\right) B_0,$ for $(t, \vec{x}_t^{KP}) \in \Gamma^{KP},$ $c_t^{KP} := \left(\overbrace{\omega^{KP} \vec{x}_t^{KP}}^{n_t^{KP}}, \overbrace{0^{u_t^{KP}}}^{u_t^{KP}}, \overbrace{0^{w_t^{KP}}}^{w_t^{KP}}, \overbrace{\vec{\varphi}_t^{KP}}^{z_t^{KP}}\right) B_t^{KP}$ for $i = 1, \ldots, L^{CP},$ if $\rho^{CP}(i) = \left(t, \vec{v}_i^{CP} := \left(v_{i,1}^{CP}, \ldots, v_{i,n_t^{CP}}^{CP}\right) \in R^{n_t^{CP}} \setminus \{\vec{0}\}\right),$ $\theta_i^{CP} \xleftarrow{U} R, \vec{\varphi}_i^{CP} \xleftarrow{U} R^{z_t^{CP}},$ $c_i^{CP} := \left(\overbrace{s_i^{CP} \vec{e}_{t,1}^{CP} + \theta_i^{CP} v_i^{CP}}^{n_t^{CP}}, \overbrace{0^{u_t^{CP}}}^{u_t^{CP}}, \overbrace{0^{w_t^{CP}}}^{w_t^{CP}}, \overbrace{\vec{\varphi}_i^{CP}}^{z_t^{CP}}\right) B_t^{CP},$ if $\rho^{CP}(i) = \neg (t, v_i^{CP}), \varphi_i^{CP} \xleftarrow{U} R^{z_t^{CP}},$ $c_i^{CP} := \left(\overbrace{s_i^{CP} \vec{v}_i^{CP}}^{n_t^{CP}}, \overbrace{0^{u_t^{CP}}}^{u_t^{CP}}, \overbrace{0^{w_t^{CP}}}^{w_t^{CP}}, \overbrace{\vec{\varphi}_i^{CP}}^{z_t^{CP}}\right) B_t^{CP},$ $c_{d+1} := g_T^{\zeta} m,$ return $ct_{(\Gamma^{KP}, S^{CP})} :=$ $\left(c_0; \Gamma^{KP}, \{c_t^{KP}\}_{(t, \vec{x}_t^{KP}) \in \Gamma^{KP}}; S^{CP}, c_1^{CP}, \ldots, c_L^{CP}; c_{d+1}\right).$ $Dec(pk, sk_{(S^{KP}, \Gamma^{CP})} :=$ [Formula 169]

$(k_0^*; S^{KP}, k_1^{*KP}, \ldots, k_{L^{KP}}^{*KP}; \Gamma^{CP}, \{k_t^{*CP}\}_{(t, \vec{x}_t^{CP}) \in \Gamma^{CP}}),$ $ct_{(\Gamma^{KP}, S^{CP})} := \left(c_0; \Gamma^{KP}, \{c_t^{KP}\}_{(t, \vec{x}_t^{KP}) \in \Gamma^{KP}};\right.$ $\left. S^{CP}, c_1^{CP}, \ldots, c_{L^{CP}}^{CP}; c_{d+1}\right)):$ If $S^{KP} := (M^{KP}, \rho^{KP})$ accepts $\Gamma^{KP} := \{(t, \vec{x}_t^{KP})\}$ and $S^{CP} := (M^{CP}, \rho^{CP})$ accepts $\Gamma^{CP} : \{(t, \vec{x}_t^{CP})\},$ then compute $(I^{KP}, \{\alpha_i^{KP}\}_{i \in I^{KP}})$ and $(I^{CP}, \{\alpha_i^{CP}\}_{i \in I^{CP}})$ such that $\vec{1} = \sum_{i \in I} \alpha_i^{KP} M_i^{KP},$ where $M_i^{KP}$ is the $i$-th row of $M^{KP}$, and $I^{KP} \subseteq \{i \in \{1, \ldots, L^{KP}\}$ $|[\rho^{KP}(i) = (t, \vec{v}_i^{KP}) \wedge (t, \vec{x}_t^{KP}) \in \Gamma^{KP} \wedge \vec{v}_i^{KP} \cdot \vec{x}_t^{KP} =$ $0] \vee [\rho^{KP}(i) = \neg (t, \vec{v}_i^{KP}) \wedge (t, \vec{x}_t^{KP}) \in$ $\Gamma^{KP} \wedge \vec{v}_i^{KP} \cdot \vec{x}_t^{KP} \neq 0]\},$ and $\vec{1} = \sum_{i \in I} \alpha_i^{CP} M_i^{CP}$, where $M_i^{CP}$ is the $i$-th row of $M^{CP}$, and $I^{CP} \subseteq$ $\{i \in \{1, \ldots, L^{CP}\} | [\rho^{CP}(i) = (t, \vec{v}_i^{CP}) \wedge (t, \vec{x}_t^{CP}) \in$ $\Gamma^{CP} \wedge \vec{v}_i^{CP} \cdot \vec{x}_t^{CP} = 0] \vee [\rho^{CP}$ $(i) = \neg (t, \vec{v}_i^{CP}) \wedge (t, \vec{x}_t^{CP}) \in$ $\Gamma^{CP} \wedge \vec{v}_i^{CP} \cdot \vec{x}_t^{CP} \neq 0]\},$ $K := e(c_0, k_0^*) \cdot \prod_{i \in I^{KP} \wedge \rho^{KP}(i) = (t, \vec{v}_i^{KP})} e(c_t^{KP}, k_i^{*KP})$ $\alpha_i^{KP} \cdot \prod_{i \in I^{KP} \wedge \rho^{KP}(i) = \neg(t, \vec{v}_i^{KP})} e(c_t^{KP},$ $k_i^{*KP})\alpha_i^{KP} / (\vec{v}_i^{KP} \cdot \vec{x}_t^{KP}) \cdot$ $\prod_{i \in I^{CP} \wedge \rho^{CP}(i) = (t, \vec{v}_i^{CP})} e(c_t^{CP},$ $k_i^{*CP})\alpha_i^{CP} \cdot$ $\prod_{i \in I^{CP} \wedge \rho^{CP}(i) = \neg(t, \vec{v}_i^{CP})} e(c_t^{CP},$ $k_i^{*CP})\alpha_i^{CP} / (\vec{v}_i^{CP} \cdot \vec{x}_t^{CP}),$ return $m' := c_{d+1} / K.$ The cryptographic process in the above description can be adopted for authority delegation. Authority delegation means that a person having a decryption key generates a lower-level decryption key having weaker authority than the decryption key of his or her own. Weaker authority means that encrypted data that the decryption key can decrypt is limited.

For example, in the first hierarchical layer (highest order), bases $B_t$ and $B^*_t$ for t=1 are used, in the second hierarchical layer, bases $B_t$ and $B^*_t$ for t=1, 2 are used, . . . , in the k-th hierarchical layer, bases $B_t$ and $B^*_t$ for t=1, . . . , k are used. As the bases $B_t$ and $B^*_t$ to be used increase, a larger number of pieces of attribute information are set. Accordingly, authority of the decryption key is limited more.

The hardware configuration of the cryptographic processing system 10 (the key generation device 100, the encryption device 200, and the decryption device 300) in the above embodiments will be described.

Figure 13:
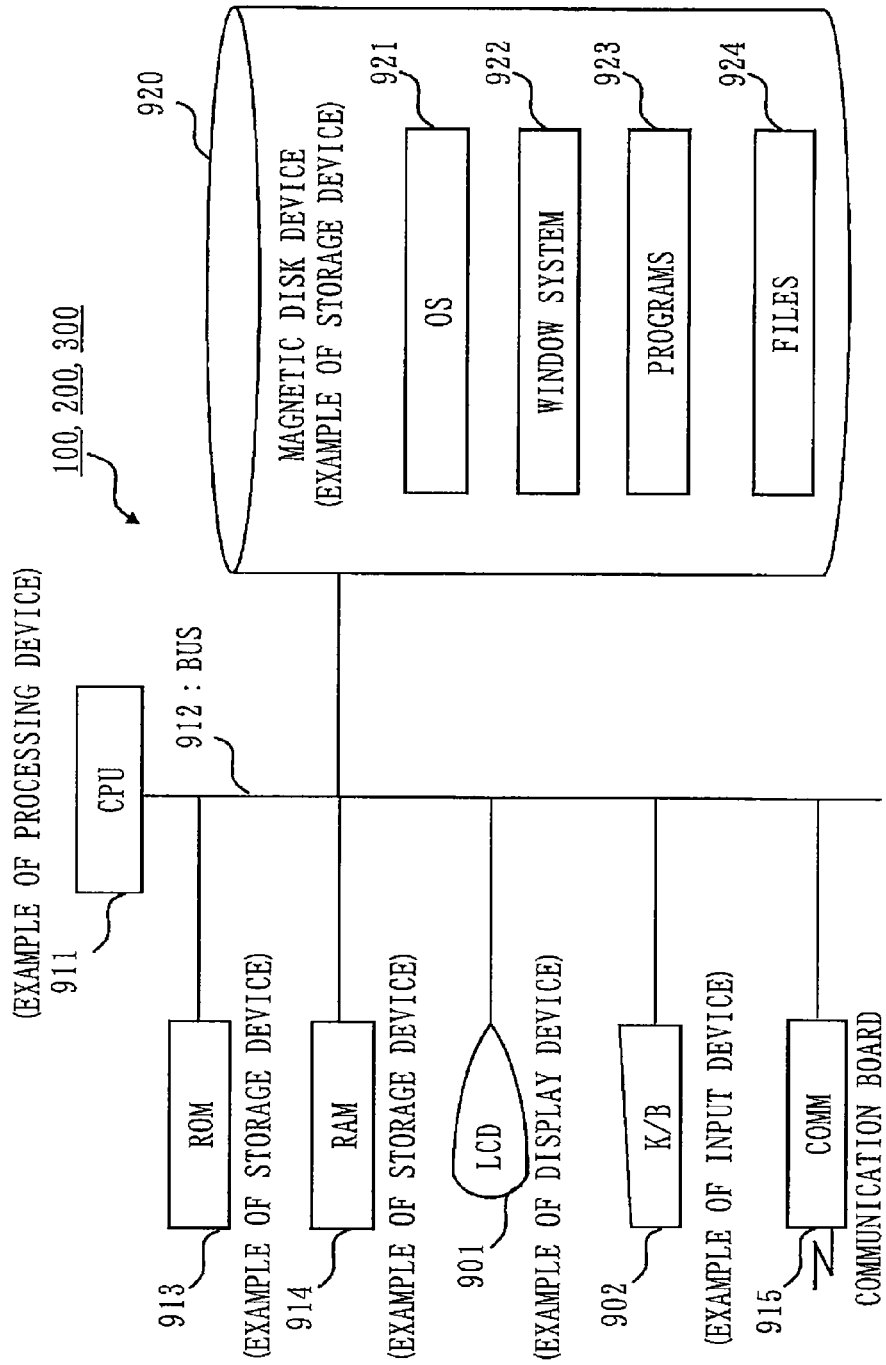
FIG. 13 is a diagram showing an example of the hardware configuration of each of the key generation device 100, encryption device 200, and decryption device 300.

FIG. 13 is a diagram showing an example of the hardware configuration of each of the key generation device 100, encryption device 200, and decryption device 300.

As shown in FIG. 13, each of the key generation device 100, encryption device 200, and decryption device 300 includes a CPU 911 (also referred to as a Central Processing Unit, central processing device, processing device, computation device, microprocessor, microcomputer, or processor) which executes programs. The CPU 911 is connected to the ROM 913, the RAM 914, the LCD 901 (Liquid Crystal Display), the keyboard 902 (K/B), the communication board 915, and the magnetic disk device 920 via a bus 912, and controls these hardware devices. In place of the magnetic disk device 920 (fixed disk device), a storage device such as an optical disk device or memory card read/write device may be connected. The magnetic disk device 920 is connected via a predetermined fixed disk interface.

The ROM 913 and the magnetic disk device 920 are examples of a nonvolatile memory. The RAM 914 is an example of a volatile memory. The ROM 913, the RAM 914, and the magnetic disk device 920 are examples of the storage device (memory). The keyboard 902 and the communication board 915 are examples of an input device. The communication board 915 is an example of a communication device. Furthermore, the LCD 901 is an example of a display device.

The magnetic disk device 920, ROM 913, or the like stores an operating system 921 (OS), a window system 922, programs 923, and files 924. The CPU 911, the operating system 921, and the window system 922 execute each program of the programs 923.

The programs 923 store software and programs that execute the functions described as the "master key generation part 110", "information input part 130", "decryption key generation part 140", "key distribution part 150", "public parameter acquisition part 210", "information input part 220", "encrypted data generation part 230", "data transmission part 240", "decryption key acquisition part 310", "data reception part 320", "span program calculation part 330", "complementary coefficient calculation part 340", "pairing operation part 350", "message calculation part 360", and the like in the above description. The programs 923 store other programs as well. The programs are read and executed by the CPU 911.

The files 924 store information, data, signal values, variable values, and parameters such as the "public parameters pk", "master key sk", "encrypted data $ct_{(\Gamma_{KP}, S_{CP})}$", "decryption key $sk_{(S_{KP}, \Gamma_{CP})}$", "access structures $S^{KP}$, $S^{CP}$", "attribute sets $\Gamma^{KP}$, $\Gamma^{CP}$", "message m", and the like of the above explanation, as the items of a "file" and "database". The "file" and "database" are stored in a recording medium such as a disk or memory. The information, data, signal values, variable values, and parameters stored in the recording medium such as the disk or memory are read out to the main memory or cache memory by the CPU 911 through a read/write circuit, and are used for the operations of the CPU 911 such as extraction, search, look-up, comparison, computation, calculation, process, output, print, and display. The information, data, signal values, variable values, and parameters are temporarily stored in the main memory, cache memory, or buffer memory during the operations of the CPU 1911 including extraction, search, look-up, comparison, computation, calculation, process, output, print, and display.

The arrows of the flowcharts in the above explanation mainly indicate input/output of data and signals. The data and signal values are stored in the memory of the RAM 914, the recording medium such as an optical disk, or in an IC chip. The data and signals are transmitted online via a transmission medium such as the bus 912, signal lines, or cables, or electric waves.

The "part" in the above explanation may be a "circuit", "device", "equipment", "means" or "function"; or a "step", "procedure", or "process". The "device" may be a "circuit", "equipment", "means", or "function"; or a "step", "procedure", or "process". The "process" may be a "step". Namely, the "part" may be implemented as firmware stored in the ROM 913. Alternatively, the "part" may be implemented by only software; by only hardware such as an element, a device, a substrate, or a wiring line; by a combination of software and hardware; or furthermore by a combination of software, hardware, and firmware. The firmware and software are stored, as programs, in the recording medium such as the ROM 913. The program is read by the CPU 911 and executed by the CPU 911. Namely, the program causes the computer to function as a "part" described above. Alternatively, the program causes the computer or the like to execute the procedure and method of the "part" described above.

Reference Signs List

10: cryptographic processing system; 100: key generation device; 110: master key generation part; 120: master key storage part; 130: information input part; 131: KP information input part; 132: CP information input part; 140: decryption key generation part; 141: f vector generation part; 142: s vector generation part; 143: random number generation part; 144: main decryption key generation part; 145: KP decryption key generation part; 146: CP decryption key generation part; 150: key distribution part; 200: encryption device; 210: public parameter acquisition part; 220: information input part; 221: KP information input part; 222: CP information input part; 223: message input part; 230: encrypted data generation part; 231: f vector generation part; 232: s vector generation part; 233: random number generation part; 234: main encrypted data generation part; 235: KP encrypted data generation part; 236: CP encrypted data generation part; 237: message encrypted data generation part; 240: data transmission part; 300: decryption device; 310: decryption key acquisition part; 320: data reception part; 330: span program calculation part; 331: KP span program calculation part; 332: CP span program calculation part; 340: complementary coefficient calculation part; 341: KP complementary coefficient calculation part; 342: CP complementary coefficient calculation part; 350: pairing operation part; 360: message calculation part

The invention claimed is:

1. A cryptographic processing system comprising:
a key generation device, an encryption device, and a decryption device, and serving to execute a cryptographic process using a basis $B_0$ and a basis $B_0^*$, a basis $B_t^{KP}$ and a basis $B^*_t{}^{KP}$ for each integer t=1, . . . , $d^{KP}$ ($d^{KP}$ is an integer of 1 or more), and a basis $B_t^{CP}$ and a basis $B^*_t{}^{CP}$ for each integer t=1, . . . , $d^{CP}$ ($d^{CP}$ is an integer of 1 or more),
wherein the key generation device includes circuitry configured to provide:

a first KP information input part which takes as input, a variable $\rho^{KP}(i)$ for each integer $i=1,\ldots,L^{KP}$ ($L^{KP}$ is an integer of 1 or more), which variable $\rho^{KP}(i)$ is either one of a positive tuple $(t, \vec{v}_i^{KP})$ and a negative tuple $\neg(t, \vec{v}_i^{KP})$ of identification information t (t is any one integer of $t=1,\ldots,d^{KP}$) and an attribute vector $\vec{v}_i^{KP}:=(v_{i,i'}^{KP})$ ($i'=1,\ldots,n_t^{KP}$ where $n_t^{KP}$ is an integer of 1 or more), and a predetermined matrix $M^{KP}$ having $L^{KP}$ rows and $r^{KP}$ columns ($r^{KP}$ is an integer of 1 or more), a first CP information input part which takes as input, an attribute set $\Gamma^{CP}$ having the identification information t and an attribute vector $\vec{x}_t^{CP}:=(x_{t,i'}^{CP})$ ($i'=1,\ldots,n_t^{CP}$ where $n_t^{CP}$ is an integer of 1 or more) for at least one integer $t=1,\ldots,d^{CP}$, a main decryption key generation part which generates an element $k^*_0$ by setting a value $-s_0^{KP}$ ($s_0^{KP}:=\vec{h}^{KP} \cdot (\vec{f}^{KP})^T$ where $\vec{h}^{KP}$ and $\vec{f}^{KP}$ are vectors each having $r^{KP}$ pieces of elements) as a coefficient for a basis vector $b^*_{0,p}$ (p is a predetermined value) of the basis $B^*_0$, by setting a random number $\delta^{CP}$ as a coefficient for a basis vector $b^*_{0,p'}$ (p' is a predetermined value different from prescribed p), and by setting a predetermined value $\kappa$ as a coefficient for a basis vector $b^*_{0,q}$ (q is a predetermined value different from the prescribed p and prescribed p'), a KP decryption key generation part which generates an element $k^*_i{}^{KP}$ for each integer $i=1\ldots,L^{KP}$, based on a column vector $(\vec{s}^{KP})^T:=(s_1^{KP},\ldots,s_L^{KP})^T:=M^{KP} \cdot (\vec{f}^{KP})^T$ ($i=L^{KP}$) generated based on prescribed $\vec{f}^{KP}$ and the matrix $M^{KP}$ which is inputted by the first KP information input part; and a random number $\theta_i^{KP}$ ($i=1,\ldots,L^{KP}$), the KP decryption key generation part being configured to generate the element $k^*_i{}^{KP}$, when the variable $\rho^{KP}(i)$ for each integer $i=1,\ldots,L^{KP}$ is a positive tuple $(t, \vec{v}_i^{KP})$, by setting $s_i^{KP}+\theta_i^{KP}v_{i,1}^{KP}$ as a coefficient for a basis vector $b^*_{t,1}{}^{KP}$ of the basis $B^*_t{}^{KP}$ indicated by identification information t of the positive tuple, and by setting $\theta_i^{KP}v_{i,i'}^{KP}$ as a coefficient for a basis vector $b^*_{t,i'}{}^{KP}$ indicated by the identification information t and by each integer $i'=2,\ldots,n_t^{KP}$, and when the variable $\rho^{KP}(i)$ is a negative tuple $\neg(t, \vec{v}_i^{KP})$, by setting $s_i^{KP}v_{i,i'}^{KP}$ as a coefficient for the basis vector $b^*_{t,i'}{}^{KP}$ indicated by the identification information t of the negative tuple and by each integer $i'=1,\ldots,n_t^{KP}$, and a CP decryption key generation part which generates an element $k^*_t{}^{CP}$ concerning each identification information t included in the attribute set $\Gamma^{CP}$ inputted by the first CP information input part, the CP decryption key generation part being configured to generate the element $k^*_t{}^{CP}$ by setting $x_{t,i'}^{CP}$ multiplied by the random number $\delta^{CP}$ as a coefficient for a basis vector $b^*_{t,i'}{}^{CP}$ ($i'=1,\ldots,n_t^{CP}$) of the basis $B^*_t{}^{CP}$, wherein the encryption device includes circuitry configured to provide:

a second KP information input part which takes as input, an attribute set $\Gamma^{KP}$ having the identification information t and an attribute vector $\vec{x}_t^{KP}:=(x_{t,i'}^{KP})$ ($i'=1,\ldots,n_t^{KP}$) for at least one integer $t=1,\ldots,d^{KP}$, a second CP information input part which takes as input, a variable $\rho^{CP}(i)$ for each integer $i=1,\ldots,L^{CP}$ ($L^{CP}$ is an integer of 1 or more), which variable $\rho^{CP}(i)$ is either one of a positive tuple $(t, \vec{v}_i^{CP})$ and a negative tuple $\neg(t, \vec{v}_i^{CP})$ of identification information t (t is any one integer of $t=1,\ldots,d^{CP}$) and an attribute vector t, $\vec{v}_i^{CP}:=(v_{i,i'}^{CP})$ ($i'=1,\ldots,n_t^{CP}$), and a predetermined matrix $M^{CP}$ having $L^{CP}$ rows and $r^{CP}$ columns ($r^{CP}$ is an integer of 1 or more), a main encrypted data generation part which generates an element $c_0$ by setting a random number $\omega^{KP}$ as a coefficient for a basis vector $b_{0,p}$ of the basis $B_0$, by setting a value $-s_0^{CP}$ ($s_0^{CP}:=\vec{h}^{CP} \cdot (\vec{f}^{CP})^T$ where $\vec{h}^{CP}$ and $\vec{f}^{CP}$ are vectors each having $r^{CP}$ pieces of elements) as a coefficient for a basis vector $b_{0,p'}$ of the basis $B_0$, and by setting a random number $\zeta$ as a coefficient for a basis vector $b_{0,q}$, a KP encrypted data generation part which generates an element $c_t^{KP}$ concerning each identification information t included in the attribute set $\Gamma^{KP}$ inputted by the second KP information input part, the KP encrypted data generation part being configured to generate the element $c_t^{KP}$ by setting $x_{t,i'}^{KP}$ multiplied by the random number $\omega^{KP}$ as a coefficient for a basis vector $b_{t,i'}^{KP}$ ($i'=1,\ldots,n_t$) of the basis $B_t^{KP}$, and a CP encrypted data generation part which generates an element $c_i^{CP}$ for each integer $i=1\ldots,L^{CP}$, based on a column vector $(\vec{s}^{CP})^T:=(s_1^{CP},\ldots,s_i^{CP})^T:=M^{CP} \cdot (\vec{f}^{CP})^T$ ($i=L^{CP}$) generated based on the prescribed $\vec{f}^{CP}$ and the matrix $M^{CP}$ which is inputted by the second CP information input part; and a random number $\theta_i^{CP}$ ($i=1,\ldots,L^{CP}$), the CP encrypted data generation part being configured to generate the element $c_i^{CP}$, when the variable $\rho^{CP}(i)$ for each integer $i=1,\ldots,L^{CP}$ is a positive tuple $(t, \vec{v}_i^{CP})$, by setting $s_i^{CP}+\theta_i^{CP}v_{i,1}^{CP}$ as a coefficient for a basis vector $b_{t,1}{}^{CP}$ of the basis $B_t^{CP}$ indicated by identification information t of the positive tuple, and by setting $\theta_i^{CP}v_{i,i'}^{CP}$ as a coefficient for a basis vector $b_{t,i'}{}^{CP}$ indicated by the identification information t and by each integer $i'=2,\ldots,n_t^{CP}$, and when the variable $\rho^{CP}(i)$ is a negative tuple $\neg(t, \vec{v}_i^{CP})$, by setting $s_i^{CP}v_{i,i'}^{CP}$ as a coefficient for the basis vector $b_{t,i'}{}^{CP}$ indicated by the identification information t of the negative tuple and by each integer $i'=1,\ldots,n_t^{CP}$, and wherein the decryption device includes circuitry configured to provide:

a data acquisition part which acquires encrypted data $ct_{(\Gamma KP, SCP)}$ including the element $c_0$ generated by the main encrypted data generation part, the element $c_t^{KP}$ generated by the KP encrypted data generation part, the element $c_i^{CP}$ generated by the CP encrypted data generation part, the attribute set $\Gamma^{KP}$, and the variable $\rho^{CP}(i)$, a decryption key acquisition part which acquires a decryption key $sk_{(SKP, \Gamma CP)}$ including the element $k^*_0$ generated by the main decryption key generation part, the element $k^*_i{}^{KP}$ generated by the KP decryption key generation part, the element $k^*_t{}^{CP}$ generated by the CP decryption key generation part, the variable $\rho^{KP}(i)$, and the attribute set $\Gamma^{CP}$, a KP complementary coefficient calculation part which, based on the attribute set $\Gamma^{KP}$ included in the encrypted data $ct_{(\Gamma KP, SCP)}$ acquired by the data acquisition part, and the variable $\rho^{KP}(i)$ included in the decryption key $sk_{(SKP, \Gamma CP)}$ acquired by the decryption key acquisition part, specifies, among integers $i=1,\ldots,L^{KP}$, a set $I^{KP}$ of i for which the variable $\rho^{KP}(i)$ is a positive tuple $(t, \vec{v}_i^{KP})$ and with which an inner-product of $\vec{v}_i^{KP}$ of the positive tuple and $\vec{x}_t^{KP}$ included in $\Gamma^{KP}$ indicated by identification information t of the positive tuple becomes 0, and i for which the variable $\rho^{KP}(i)$ is a negative tuple $\neg(t, \vec{v}_i^{KP})$ and with which an inner-product of $\vec{v}_i^{KP}$ of the negative tuple and $\vec{x}_t^{KP}$ included in $\Gamma^{KP}$ indicated by identification information t of the negative tuple does not become 0; and calculates a complementary coefficient $\alpha_i^{KP}$ with which a total of $\alpha_i^{KP} M_i^{KP}$ for i included in the set $I^{KP}$ specified becomes prescribed $\vec{h}^{KP}$, a CP complementary coefficient calculation part which, based on the variable $\rho^{CP}(i)$ concerning each integer $i=1, \ldots, L^{CP}$ included in the encrypted data $ct_{(\Gamma KP, SCP)}$, and the attribute set $\Gamma^{CP}$ included in the decryption key $sk_{(SKP, \Gamma CP)}$, specifies, among integers $i=1, \ldots, L^{CP}$, a set $I^{CP}$ of i for which the variable $\rho^{CP}(i)$ is a positive tuple $(t, \vec{v}_i^{CP})$ and with which an inner-product of $\vec{v}_i^{CP}$ of the positive tuple and $\vec{x}_t^{CP}$ included in $\Gamma^{CP}$ indicated by identification information t of the positive tuple becomes 0, and i for which the variable $\rho^{CP}(i)$ is a negative tuple $\neg (t, \vec{v}_i^{CP})$ and with which an inner-product of $\vec{v}_i^{CP}$ of the negative tuple and $\vec{x}_t^{CP}$ included in $\Gamma^{CP}$ indicated by identification information t of the negative tuple does not become 0; and calculates a complementary coefficient $\alpha_i^{CP}$ with which a total of $\alpha_i^{CP} M_i^{CP}$ for i included in the set $I^{CP}$ specified becomes the prescribed $\vec{h}^{CP}$, and a pairing operation part which calculates a value K by conducting a pairing operation indicated in Formula 1 for the elements $c_0$, $c_t^{KP}$, and $c_t^{CP}$ included in the encrypted data $ct_{(\Gamma KP, SCP)}$, and the elements $k^*_0$, $k^{*KP}_i$, and $k^{*CP}_t$ included in the decryption key $sk_{(SKP, \Gamma CP)}$, based on the set $I^{KP}$ specified by the KP complementary coefficient calculation part, on the complementary coefficient $\alpha_i^{KP}$ calculated by the KP complementary coefficient calculation part, on the set $I^{CP}$ specified by the CP complementary coefficient calculation part, and on the complementary coefficient $\alpha_i^{CP}$ calculated by the CP complementary coefficient calculation part, wherein

[Formula 1] is as follows:

$$K := e(c_0, k_0^*) \cdot \prod_{i \in I^{KP} \wedge \rho^{KP}(i)=(t,\vec{v}_i^{KP})} e(c_t^{KP}, k_i^{*KP})^{\alpha_i^{KP}} \cdot$$
$$\prod_{i \in I^{KP} \wedge \rho^{KP}(i)=\neg(t,\vec{v}_i^{KP})} e(c_t^{KP}, k_i^{*KP})^{\alpha_i^{KP} / (\vec{v}_i^{KP} \cdot \vec{x}_t^{KP})} \cdot$$
$$\prod_{i \in I^{CP} \wedge \rho^{CP}(i)=(t,\vec{v}_i^{CP})} e(c_t^{CP}, k_i^{*CP})^{\alpha_i^{CP}} \prod_{i \in I^{CP} \wedge \rho^{CP}(i)=\neg(t,\vec{v}_i^{CP})}$$
$$e(c_t^{CP}, k_i^{*CP})^{\alpha_i^{CP} / (\vec{v}_i^{CP} \cdot \vec{x}_t^{CP})}.$$

2. The cryptographic processing system according to claim 1, which executes the cryptographic process using:

the basis $B_0$ having at least a basis vector $b_{0,i}$ ($i=1, 2, \ldots, 2+u_0, 2+u_0+1, \ldots, 2+u_0+1+w_0, \ldots, 2+u_0+1+z_0$), the basis $B^*_0$ having at least a basis vector $b^*_{0,i}$ ($i=1, 2, \ldots, 2+u_0, 2+u_0+1, \ldots, 2+u_0+1+w_0, \ldots, 2+u_0+1+z_0$), the basis $B_t^{KP}$ ($t=1, \ldots, d$) having at least a basis vector $b_{t,i}^{KP}$ ($i=1, \ldots, n_t^{KP}, \ldots, n_t^{KP}+u_t^{KP}, \ldots, n_t^{KP}+u_t^{KP}+w_t^{KP}, \ldots, n_t^{KP}+u_t^{KP}+w_t^{KP}+z_t^{KP}$) ($u_t^{KP}$, $w_t^{KP}$, and $z_t^{KP}$ are each an integer of 1 or more), the basis $B^{*KP}_t$ ($t=1, d^{KP}$) having at least a basis vector $b^{*KP}_{t,i}$ ($i=1, \ldots, n_t^{KP}, \ldots, n_t^{KP}+u_t^{KP}, \ldots, n_t^{KP}+u_t^{KP}+w_t^{KP}, \ldots, n_t^{KP}+u_t^{KP}+w_t^{KP}+z_t^{KP}$), the basis $B_t^{CP}$ ($t=1, \ldots, d$) having at least a basis vector $b_{t,i}^{CP}$ ($i=1, \ldots, n_t^{CP}, \ldots, n_t^{CP}+u_t^{CP}, \ldots, n_t^{CP}+u_t^{CP}+w_t^{CP}, \ldots, n_t^{CP}+u_t^{CP}+w_t^{CP}+z_t^{CP}$) ($u_t^{CP}$, $w_t^{CP}$, and $z_t^{CP}$ are each an integer of 1 or more), and the basis $B^{*CP}_t$ ($t=1, \ldots, d^{CP}$) having at least a basis vector $b^{*CP}_{t,i}$ ($i=1, \ldots, n_t^{CP}, \ldots, n_t^{CP}+u_t^{CP}, \ldots, n_t^{CP}+u_t^{CP}+w_t^{CP}, \ldots, n_t^{CP}+u_t^{CP}+w_t^{CP}+z_t^{CP}$), wherein, in the key generation device, the main decryption key generation part generates the element $k^*_0$ indicated in Formula 2 based on the random number $\delta^{CP}$, a random number $\eta_{0,i}$ ($i=1, \ldots, w_0$), and a predetermined value $\kappa$, the KP decryption key generation part generates the element $k^{*KP}_i$ indicated in Formula 3 based on the random number $\theta_i^{KP}$ and a random number $\eta_{i,i'}^{KP}$ ($i=1, \ldots, L^{KP}$, $i'=1, \ldots, w_t^{KP}$) when the variable $\rho^{KP}(i)$ is a positive tuple $(t, \vec{v}_i^{KP})$, and generates the element $k^{*KP}_i$ indicated in Formula 4 based on the random value $\eta_{i,i'}^{KP}$ ($i=1, \ldots, L^{KP}$, $i'=1, \ldots, w_t^{KP}$) when the variable $\rho^{KP}(i)$ is a negative tuple $\neg (t, \vec{v}_i^{KP})$, and the CP decryption key generation part generates the element $k^{*CP}_0$ indicated in Formula 5 based on the random number $\delta^{CP}$ and a random number $\eta_{t,i}^{CP}$ ($i=1, \ldots, w_t^{CP}$), and wherein, in the encryption device, the main encrypted data generation part generates the element $c_0$ indicated in Formula 6 based on the random number $\omega^{KP}$, a random number $\zeta$, and a random number $\phi_{0,1}$ ($i=1, \ldots, z_0$), the KP encrypted data generation part generates the element $c_0^{KP}$ indicated in Formula 7 based on the random number $\omega^{KP}$ and a random number $\phi_{t,i}^{KP}$ ($i=1, \ldots, z_t^{KP}$), and the CP encrypted data generation part generates the element $c_t^{CP}$ indicated in Formula 8 based on the random number $\theta_i^{CP}$ and a random number $\phi_{i,i'}^{CP}$ ($i=1, \ldots, L^{CP}$, $i'=1, \ldots, z_t^{CP}$) when the variable $\rho^{CP}(i)$ is a positive tuple $(t, \vec{v}_i^{CP})$, and generates the element $c_i^{CP}$ indicated in Formula 9 based on the random number $\phi_{i,i'}^{CP}$ ($i=1, \ldots, L^{CP}$, $i'=1, \ldots, z_t^{CP}$) when the variable $\rho^{CP}(i)$ is a negative tuple $\neg (t, \vec{v}_i^{CP})$, wherein

[Formula 2] is as follows:

$$k_0^* := \left(-s_0^{KP}, \delta^{CP}, \overbrace{0, \ldots, 0}^{u_0}, 1, \overbrace{\eta_{0,1}, \ldots, \eta_{0,w_0}}^{w_0}, \overbrace{0, \ldots, 0}^{z_0}\right) \mathbb{B}_0^*,$$

[Formula 3] is as follows:

$$k_i^{*KP} :=$$
$$\left(\overbrace{s_i^{KP} + \theta_i^{KP} v_{i,1}^{KP} v_{i,2}^{KP}, \theta_i^{KP} v_{i,2}^{KP}, \ldots, \theta_i^{KP} v_{i,n_t^{KP}}^{KP}}^{n_t^{KP}}, \overbrace{0, \ldots, 0}^{u_t^{KP}}, \overbrace{\eta_{i,1}^{KP}, \ldots, \eta_{i,w_t^{KP}}^{KP}}^{w_t^{KP}}, \overbrace{0, \ldots, 0}^{z_t^{KP}}\right) \mathbb{B}_t^{*KP}$$

[Formula 4] is as follows:

$$k_i^{*KP} := \left(\overbrace{s_i^{KP} v_{i,1}^{KP}, \ldots, s_i^{KP} v_{i,n_t^{KP}}^{KP}}^{n_t^{KP}}, \overbrace{0, \ldots, 0}^{u_t^{KP}}, \overbrace{\eta_{i,1}^{KP}, \ldots, \eta_{i,w_t^{KP}}^{KP}}^{w_t^{KP}}, \overbrace{0, \ldots, 0}^{z_t^{KP}}\right) \mathbb{B}_t^{*KP}$$

[Formula 5] is as follows:

$$k_t^{*CP} := \left( \frac{n_t^{CP}}{\delta^{CP} \vec{x}_t^{CP}}, \frac{u_t^{CP}}{0^{u_t^{CP}}}, \frac{w_t^{CP}}{\eta_{t,1}^{CP}, \ldots, \eta_{t,w_t^{CP}}^{CP}}, \frac{z_t^{KP}}{0^{z_t^{KP}}} \right) B_t^{*CP}$$

[Formula 6] is as follows:

$$c_0 := \left( \omega^{KP}, -s_0^{CP}, \frac{u_0}{0_0^u}, \zeta, \frac{w_0}{0^{w_0}}, \frac{z_0}{\varphi_{0,1}, \ldots, \varphi_{0,z_0}} \right) B_0$$

[Formula 7] is as follows:

$$c_t^{KP} := \left( \frac{n_t^{KP}}{\omega^{KP} \vec{x}_t^{KP}}, \frac{u_t^{KP}}{0^{u_t^{KP}}}, \frac{w_t^{KP}}{0^{w_t^{KP}}}, \frac{z_t^{KP}}{\varphi_{t,1}^{KP}, \ldots, \varphi_{t,z_t^{KP}}^{KP}} \right) B_t^{KP}$$

[Formula 8] is as follows:

$$c_i^{CP} := \left( \frac{n_t^{CP}}{s_i^{CP} + \theta_i^{CP} v_{i,1}^{CP}, \theta_i^{CP} v_{i,2}^{CP}, \ldots, \theta_i^{CP} v_{i,n_t^{CP}}^{CP}}, \right.$$
$$\left. \frac{u_t^{CP}}{0^{u_t^{CP}}}, \frac{w_t^{CP}}{0^{w_t^{CP}}}, \frac{z_t^{CP}}{\varphi_{i,1}^{CP}, \ldots, \varphi_{i,z_t^{CP}}^{CP}} \right) B_t^{CP}, \text{ and}$$

[Formula 9] is as follows:

$$c_i^{CP} :=$$ [Formula 9]

$$\left( \frac{n_t^{CP}}{s_i^{CP} v_{i,1}^{CP}, \ldots, s_i^{CP} v_{i,n_t^{CP}}^{CP}}, \frac{u_t^{CP}}{0^{u_t^{CP}}}, \frac{w_t^{CP}}{0^{w_t^{CP}}}, \frac{z_t^{CP}}{\varphi_{i,1}^{CP}, \ldots, \varphi_{i,z_t^{CP}}^{CP}} \right) B_t^{CP}.$$

3. The cryptographic processing system according to claim 1,
wherein the encryption device further comprises circuitry configured to provide:
a message encrypted data generation part which generates an element $c_{d+1} = g_T^\zeta m$ including a message m embedded, by using a value $g_T$ which satisfies $g_T = e(b_{0,i}, b^*_{0,i})$ for the predetermined value i, $g_T = e(b_{t,i}, b^*_{t,i})$ for each integer $t=1, \ldots, d^{KP}$ and a predetermined value i, and $g_T = e(b_{t,i}, b^*_{t,i})$ for each integer $t=1, \ldots, d^{CP}$ and the predetermined value i, and
wherein, in the decryption device,
the data acquisition part acquires encrypted data $ct_{(\Gamma KP, SCP)}$ further including the element $c_{d+1}$,
the decryption device further including circuitry configured to provide:
a message calculation part which calculates the message m by dividing the element $c_{d+1}$ included in the encrypted data $ct_{(\Gamma KP, SCP)}$ by the value K calculated by the pairing operation part.

4. A key generation device which generates a decryption key $sk_{(SKP, \Gamma CP)}$, in a cryptographic processing system which executes a cryptographic process using a basis $B_0$ and a basis $B_0^*$, a basis $B_t^{KP}$ and a basis $B^*_t{}^{KP}$ for each integer $t=1, \ldots, d^{KP}$ ($d^{KP}$ is an integer of 1 or more), and a basis $B_t^{CP}$ and a basis $B^*_t{}^{CP}$ for each integer $t=1, \ldots, d^{CP}$ ($d^{CP}$ is an integer of 1 or more), the key generation device comprising:
circuitry configured to provide:
a first KP information input part which takes as input, a variable $\rho^{KP}(i)$ for each integer $i=1, \ldots, L^{KP}$ ($L^{KP}$ is an integer of 1 or more), which variable $\rho^{KP}(i)$ is either one of a positive tuple $(t, \vec{v}^{KP})$ and a negative tuple $\neg (t, \vec{v}_i^{KP})$ of identification information t (t is any one integer of $t=1, \ldots, d^{KP}$) and an attribute vector $\vec{v}_i^{KP} := (v_{i,i'}^{KP})$ ($i'=1, \ldots, n_t^{KP}$ where $n_t^{KP}$ is an integer of 1 or more), and a predetermined matrix $M^{KP}$ having $L^{KP}$ rows and $r^{KP}$ columns ($r^{KP}$ is an integer of 1 or more),
a first CP information input part which takes as input, an attribute set $\Gamma^{CP}$ having the identification information t and an attribute vector $\vec{x}_t^{CP} := (x_{t,i'}^{CP})$ ($i'=1, \ldots, n_t^{CP}$ where $n_t^{CP}$ is an integer of 1 or more) for at least one integer $t=1, \ldots, d^{CP}$;
a main decryption key generation part which generates an element $k^*_0$ of the decryption key $sk_{(SKP, \Gamma CP)}$ by setting a value $-s_0^{KP} (s_0^{KP} := \vec{h}^{KP} \cdot (\vec{f}^{KP})^T$ where $\vec{h}^{KP}$ and $\vec{f}^{KP}$ are vectors each having $r^{KP}$ of elements) as a coefficient for a basis vector $b^*_{0,p}$ (p is a predetermined value) of the basis $B^*_0$, by setting a random number $\delta^{CP}$ as a coefficient for a basis vector $b^*_{0,p'}$ (p' is a predetermined value different from prescribed p), and by setting a predetermined value κ as a coefficient for a basis vector $b^*_{0,q}$ (q is a predetermined value different from the prescribed p and prescribed p');
a KP decryption key generation part which generates an element $k^*_i{}^{KP}$ for each integer $i=1, \ldots, L^{KP}$, based on a column vector $(\vec{s}^{KP})^T := (s_1^{KP}, \ldots, s_L^{KP})^T := M^{KP} \cdot (\vec{f}^{KP})^T$ ($i=L^{KP}$) generated based on the prescribed $\vec{f}^{KP}$ and the matrix $M^{KP}$ which is inputted by the first KP information input part; and a random number $\theta_i^{KP}$ ($i=1, \ldots, L^{KP}$), the KP decryption key generation part being configured to generate the element $k^*_i{}^{KP}$ of the decryption key $sk_{(SKP, \Gamma CP)}$, when the variable $\rho^{KP}(i)$ for each integer $i=1, \ldots, L^{KP}$ is a positive tuple $(t, \vec{v}_i^{KP})$, by setting $s_i^{KP} + \theta_i^{KP} v_{i,1}^{KP}$ as a coefficient for a basis vector $b^*_{t,1}{}^{KP}$ of the basis $B^*_t{}^{KP}$ indicated by identification information t of the positive tuple, and by setting $\theta_i^{KP} v_{i,i'}^{KP}$ as a coefficient for a basis vector $b^*_{t,i'}{}^{KP}$ indicated by the identification information t and by each integer $i'=2, \ldots, n_t^{KP}$, and when the variable $\rho^{KP}(i)$ is a negative tuple $\neg (t, \vec{v}_i^{KP})$, by setting $s_i^{KP} v_{i,i'}^{KP}$ as a coefficient for the basis vector $b^*_{t,i'}{}^{KP}$ indicated by the identification information t of the negative tuple and by each integer $i'=1, \ldots, n_t^{KP}$; and
a CP decryption key generation part which generates an element $k^*_t{}^{CP}$ concerning each identification information t included in the attribute set $\Gamma^{CP}$ inputted by the first CP information input part, the CP decryption key generation part being configured to generate the element $k^*_t{}^{CP}$ of the decryption key $sk_{(SKP, \Gamma CP)}$ by setting $x_{t,i'}^{CP}$ multiplied by the random number $\delta^{CP}$ as a coefficient for a basis vector $b^*_{t,i'}{}^{CP}$ ($i'=1, \ldots, n_t^{CP}$) of the basis $B^*_t{}^{CP}$.

5. An encryption device which generates encrypted data $ct_{(\Gamma KP, SCP)}$, in a cryptographic processing system which executes a cryptographic process using a basis $B_0$ and a basis $B_0^*$, a basis $B_t^{KP}$ and a basis $B^*_t{}^{KP}$ for each integer $t=1, d^{KP}$ ($d^{KP}$ is an integer of 1 or more), and a basis $B_t^{CP}$ and a basis $B^*_t{}^{CP}$ for each integer $t=1, \ldots, d^{CP}$ ($d^{CP}$ is an integer of 1 or more), the encryption device comprising:
circuitry configured to provide:
a second KP information input part which takes as input, an attribute set $\Gamma^{KP}$ having identification information t and an attribute vector $\vec{x}_t^{KP}:=(x_{t,i'}^{KP})$ ($i'=1,\ldots,n_t^{KP}$) for at least one integer $t=1,\ldots,d^{KP}$;

a second CP information input part which takes as input, a variable $\rho^{CP}(i)$ for each integer $i=1,\ldots,L^{CP}$ ($L^{CP}$ is an integer of 1 or more), which variable $\rho^{CP}(i)$ is either one of a positive tuple $(t, \vec{v}_i^{CP})$ and a negative tuple $\neg(t, \vec{v}_i^{KP})$ of identification information $t$ ($t$ is any one integer of $t=1,\ldots,d^{CP}$) and an attribute vector $\vec{v}_i^{CP}:=(v_{i,i'}^{CP})$ ($i'=1,\ldots n_t^{CP}$), and a predetermined matrix $M^{CP}$ having $L^{CP}$ rows and $r^{CP}$ columns ($r^{CP}$ is an integer of 1 or more);

a main encrypted data generation part which generates an element $c_0$ of encrypted data $ct_{(\Gamma KP, SCP)}$ by setting a random number $\omega^{KP}$ as a coefficient for a basis vector $b_{0,p}$ of the basis $B_0$, by setting a value $-s_0^{CP}$ ($s_0^{CP}:=\vec{h}^{CP}\cdot(\vec{f}^{CP})^T$ where $\vec{h}^{CP}$ and $\vec{f}^{CP}$ are vectors each having $r^{CP}$ pieces of elements) as a coefficient for a basis vector $b_{0,p'}$, and by setting a random number $\zeta$ as a coefficient for a basis vector $b_{0,q}$;

a KP encrypted data generation part which generates an element $c_t^{KP}$ concerning each identification information $t$ included in the attribute set $\Gamma^{KP}$ inputted by the second KP information input part, the KP encrypted data generation part being configured to generate the element $c_0^{KP}$ of the encrypted data $ct_{(\Gamma KP, SCP)}$ by setting $x_{t,i'}^{KP}$ multiplied by the random number $\omega^{KP}$ as a coefficient for a basis vector $b_{t,i'}^{KP}$ ($i'=1,\ldots,n_t$) of the basis $B_t^{KP}$; and a CP encrypted data generation part which generates an element $c_i^{CP}$ for each integer $i=1\ldots,L^{CP}$, based on a column vector $(\vec{s}^{CP})^T:=(s_1^{CP},\ldots,s_L^{CP})^T:=M^{CP}\cdot(\vec{f}^{CP})^T$ ($i=L^{CP}$) generated based on prescribed $\vec{f}^{CP}$ and the matrix $M^{CP}$ which is inputted by the second CP information input part; and a random number $\theta_i^{CP}$ ($i=1,\ldots,L^{CP}$), the CP encrypted data generation part being configured to generate the element $c_i^{CP}$ of the encrypted data $ct_{(\Gamma KP, SCP)}$, when the variable $\rho^{CP}(i)$ for each integer $i=1,\ldots,L^{CP}$ is a positive tuple $(t, \vec{v}_i^{CP})$, by setting $s_i^{CP}+\theta_i^{CP}v_{i,1}^{CP}$ as a coefficient for a basis vector $b_{t,1}^{CP}$ of the basis $B_t^{CP}$ indicated by identification information $t$ of the positive tuple, and by setting $\theta_i^{CP}v_{i,i'}^{CP}$ as a coefficient for a basis vector $b_{t,i'}^{CP}$ indicated by the identification information $t$ and by each integer $i'=2,\ldots,n_t^{CP}$, and when the variable $\rho^{CP}(i)$ is a negative tuple $\neg(t, \vec{v}_i^{CP})$, by setting $s_i^{CP}v_{i,i'}^{CP}$ as a coefficient for the basis vector $b_{t,i'}^{CP}$ indicated by the identification information $t$ of the negative tuple and by each integer $i'=1,\ldots,n_t^{CP}$.

6. A decryption device which decrypts encrypted data $ct_{(\Gamma KP, SCP)}$ with a decryption key $sk_{(SKP,\Gamma CP)}$, in a cryptographic processing system which executes a cryptographic process using a basis $B_0$ and a basis $B_0^*$, a basis $B_t^{KP}$ and a basis $B_t^{*KP}$ for each integer $t=1,\ldots,d^{KP}$ ($d^{KP}$ is an integer of 1 or more), and a basis $BP_t^{CP}$ and a basis $B_t^{*CP}$ for each integer $t=1,\ldots,d^{CP}$ ($d^{CP}$ is an integer of 1 or more), the decryption device comprising:

circuitry configured to provide:

a data acquisition part which acquires the encrypted data $ct_{(\Gamma KP, SCP)}$ including an attribute set $\Gamma^{KP}$ having identification information $t$ and an attribute vector $\vec{x}_t^{KP}:=(x_{t,i'}^{KP})$ ($i'=1,\ldots,n_t^{KP}$ where $n_t^{KP}$ is an integer of 1 or more) for at least one integer $t=1,\ldots,d^{KP}$, a variable $\rho^{CP}(i)$ for each integer $i=1,\ldots,L^{CP}$ ($L^{CP}$ is an integer of 1 or more), which variable $\rho^{CP}(i)$ is either one of a positive tuple $(t, \vec{v}_i^{CP})$ and a negative tuple $\neg(t, \vec{v}_i^{CP})$ of identification information $t$ ($t$ is any one integer of $t=1,\ldots,d^{CP}$) and an attribute vector $\vec{v}_i^{CP}:=(v_{i,i'}^{CP})$ ($i'=1,\ldots,n_t^{CP}$ where $n_t^{CP}$ is an integer of 1 or more), a predetermined matrix $M^{CP}$ having $L^{CP}$ rows and $r^{CP}$ columns ($r^{CP}$ is an integer of 1 or more), an element $c_0$ where a random number $\omega^{KP}$ is set as a coefficient for a basis vector $b_{0,p}$ of the basis $B_0$, a value $-s_0^{CP}$ ($s_0^{CP}:=\vec{h}^{CP}\cdot(\vec{f}^{CP})^T$ where $\vec{h}^{CP}$ and $\vec{f}^{CP}$ are vectors each having $r^{CP}$ pieces of elements) is set as a coefficient for a basis vector $b_{0,p'}$, and a random number $\zeta$ is set as a coefficient for a basis vector $b_{0,q}$, an element $c_t^{KP}$ concerning each identification information $t$ included in the attribute set $\Gamma^{KP}$ where $x_{t,i'}^{KP}$ multiplied by the random number $\omega^{KP}$ is set as a coefficient for a basis vector $b_{t,i'}^{KP}$ ($i'=1,\ldots,n_t$) of the basis $B_t^{KP}$, and an element $c_i^{CP}$ generated for each integer $i=1\ldots,L^{CP}$, based on a column vector $(\vec{s}^{CP})^T:=(s_1^{CP},\ldots,s_L^{CP})^T:=M^{CP}\cdot(\vec{f}^{CP})^T$ ($i=L^{CP}$) generated based on prescribed $\vec{f}^{CP}$ and the matrix $M^{CP}$; and a random number $\theta_i^{CP}$ ($i=1,\ldots,L^{CP}$), wherein, in the element $c_i^{CP}$, when the variable $\rho^{CP}(i)$ for each integer $i=1,\ldots,L^{CP}$ is a positive tuple $(t, \vec{v}_i^{CP})$, $s_i^{CP}+\theta_i^{CP}v_{i,1}^{CP}$ is set as a coefficient for a basis vector $b_{t,1}^{CP}$ of the basis $B_t^{CP}$ indicated by identification information $t$ of the positive tuple, and $\theta_i^{CP}v_{i,i'}^{CP}$ is set as a coefficient for a basis vector $b_{t,i'}^{CP}$ indicated by the identification information $t$ and by each integer $i'=2,\ldots,n_t^{CP}$, and when the variable $\rho^{CP}(i)$ is a negative tuple $\neg(t, \vec{v}_i^{CP})$, $s_i^{CP}v_{i,i'}^{CP}$ is set as a coefficient for the basis vector $b_{t,i'}^{CP}$ indicated by the identification information $t$ of the negative tuple and by each integer $i'=1,\ldots,n_t^{CP}$;

a decryption key acquisition part which acquires a decryption key $sk_{(SKP,\Gamma CP)}$ including a variable $\rho^{KP}(i)$ for each integer $i=1,\ldots,L^{KP}$ ($L^{KP}$ is an integer of 1 or more), which variable $\rho^{KP}(i)$ is either one of a positive tuple $(t, \vec{v}_i^{KP})$ and a negative tuple $\neg(t, \vec{v}_i^{KP})$ of identification information $t$ ($t$ is any one integer of $t=1,\ldots,d^{KP}$) and an attribute vector $\vec{v}_i^{KP}:=(v_{i,i'}^{KP})$ ($i'=1,\ldots,n_t^{KP}$), a predetermined matrix $M^{KP}$ having $L^{KP}$ rows and $r^{KP}$ columns ($r^{KP}$ is an integer of 1 or more), an attribute set $\Gamma^{CP}$ having the identification information $t$ and an attribute vector $\vec{X}_t^{CP}:=(x_{t,i'}^{CP})$ ($i'=1,\ldots,n_t^{CP}$) for at least one integer $t=1,\ldots,d^{CP}$, an element $k_0^*$ in which a value $-s_0^{KP}$ ($s_0^{KP}:=\vec{h}^{KP}\cdot(\vec{f}^{KP})^T$ where $\vec{h}^{KP}$ and $\vec{f}^{KP}$ are vectors each having $r^{KP}$ pieces of elements) is set as a coefficient for a basis vector $b_{0,p}^*$ ($p$ is a predetermined value) of the basis $B_0^*$, a random number $\delta^{CP}$ is set as a coefficient for a basis vector $b_{0,p'}^*$ ($p'$ is a predetermined value different from prescribed $p$), and a predetermined value $\kappa$ is set as a coefficient for a basis vector $b_{0,q}^*$ ($q$ is a predetermined value different from prescribed $p$ and the prescribed $p'$), an element $k_i^{*KP}$ generated for each integer $i=1\ldots,L^{KP}$, based on a column vector $(\vec{s}^{KP})^T:=(s_1^{KP},\ldots,s_L^{KP})^T:=M^{KP}\cdot(\vec{f}^{KP})^T$ ($i=_L{KP}$) generated based on prescribed $\vec{f}^{KP}$ and the matrix $M^{KP}$ which is inputted by the first KP information input part; and a random number $\theta_i^{KP}$ ($i=1,\ldots,L^{KP}$), wherein, in the element $k_i^{*KP}$, when the variable $\rho^{KP}(i)$ for each integer $i=1,\ldots,L^{KP}$ is a positive tuple $(t, \vec{v}_i^{KP})$, $s_i^{KP}\theta_i^{KP}v_{i,1}^{KP}$ is set as a coefficient for a basis vector $b_{t,1}^{*KP}$ of the basis $B_t^{*KP}$ indicated by identification information $t$ of the positive tuple, and $\theta_i^{KP}v_{i,i'}^{KP}$ is set as a coefficient for a basis vector $b_{t,i'}^{*KP}$ indicated by the identification information $t$ and by each integer $i'=2,\ldots,n_t^{KP}$, and when the variable $\rho^{KP}(i)$ is a negative tuple $\neg(t, \vec{v}_i^{KP})$, $s_i^{KP}v_{i,i'}^{KP}$ is set as a coefficient for the basis vector $b^{*KP}_{t,i'}$ indicated by the identification information t of the negative tuple and by each integer i'=1, ..., $n_t^{KP}$, and an element $k^{*CP}_t$ concerning each identification information t included in the attribute set $\Gamma^{CP}$, and where $x_{t,i'}^{CP}$ multiplied by the random number $\delta^{CP}$ is set as a coefficient for a basis vector $b^{*CP}_{t,i'}$ (i'=1, ..., $n_t^{CP}$) of the basis $B^{*CP}_t$;

a KP complementary coefficient calculation part which, based on the attribute set $\Gamma^{KP}$ included in the encrypted data $ct_{(\Gamma KP, SCP)}$ acquired by the data acquisition part, and the variable $\rho^{KP}(i)$ included in the decryption key $sk_{(SKP, \Gamma CP)}$ acquired by the decryption key acquisition part, specifies, among integers i=1, ..., $L^{KP}$, a set $I^{KP}$ of an integer i for which the variable $\rho^{KP}(i)$ is a positive tuple (t, $\vec{v}_i^{KP}$) and with which an inner-product of $\vec{v}_i^{KP}$ of the positive tuple and $\vec{x}_t^{KP}$ included in $\Gamma^{KP}$ indicated by identification information t of the positive tuple becomes 0, and an integer i for which the variable $\rho^{KP}(i)$ is a negative tuple ¬ (t, $\vec{v}_i^{KP}$) and with which an inner-product of $\vec{v}_i^{KP}$ of the negative tuple and $\vec{x}_t^{KP}$ included in $\Gamma^{KP}$ indicated by identification information t of the negative tuple does not become 0; and calculates a complementary coefficient $\alpha_i^{KP}$ with which a total of $\alpha_i^{KP} M_i^{KP}$ for i included in the set $I^{KP}$ specified becomes prescribed $\vec{h}^{KP}$;

a CP complementary coefficient calculation part which, based on the variable $\rho^{CP}(i)$ concerning each integer i=1, ..., $L^{CP}$ included in the encrypted data $ct_{(\Gamma KP, SCP)}$, and the attribute set $\Gamma^{CP}$ included in the decryption key $sk_{(SKP, \Gamma CP)}$, specifies, among integers i=1, ..., $L^{CP}$, a set $I^{CP}$ of i for which the variable $\rho^{CP}(i)$ is a positive tuple (t, $\vec{v}_i^{CP}$) and with which an inner-product of $\vec{v}_i^{CP}$ of the positive tuple and $\vec{X}_t^{CP}$ included in $\Gamma^{CP}$ indicated by identification information t of the positive tuple becomes 0, and i for which the variable $\rho^{CP}(i)$ is a negative tuple ¬ (t, $\vec{v}_i^{CP}$) and with which an inner-product of $\vec{v}_i^{CP}$ of the negative tuple and $\vec{x}_t^{CP}$ included in $\Gamma^{CP}$ indicated by identification information t of the negative tuple does not become 0; and calculates a complementary coefficient $\alpha_i^{CP}$ with which a total of $\alpha_i^{CP} M_i^{CP}$ for i included in the set $I^{CP}$ specified becomes prescribed $\vec{h}^{CP}$; and a pairing operation part which calculates a value K by conducting a pairing operation indicated in Formula 10 for the elements $c_0$, $c_t^{KP}$, and $c_t^{CP}$ included in the encrypted data $ct_{(\Gamma KP, SCP)}$, and the elements $k^*_0$, $k^{*KP}_i$, and $k^{*CP}_t$ included in the decryption key $sk_{(SKP, \Gamma CP)}$, based on the set $I^{KP}$ specified by the KP complementary coefficient calculation part, on the complementary coefficient $\alpha_i^{KP}$ calculated by the KP complementary coefficient calculation part, on the set $I^{CP}$ specified by the CP complementary coefficient calculation part, and on the complementary coefficient $\alpha_i^{CP}$ calculated by the CP complementary coefficient calculation part, wherein

[Formula 10] is as follows:

$$K := e(c_0, k_0^*) \cdot \prod_{i \in I^{KP} \wedge \rho^{KP}(i) = (t, \vec{v}_i^{KP})} e(c_t^{KP}, k_i^{*KP}) \alpha_i^{KP} \cdot$$

$$\prod_{i \in I^{KP} \wedge \rho^{KP}(i) = \neg(t, \vec{v}_i^{KP})} e(c_t^{KP}, k_i^{*KP}) \alpha_i^{KP} \Big/ (\vec{v}_i^{KP} \cdot \vec{x}_t^{KP}) \cdot$$

-continued $$\prod_{i \in I^{CP} \wedge \rho^{CP}(i) = (t, \vec{v}_i^{CP})} e(c_t^{CP}, k_i^{*CP}) \alpha_i^{CP} \prod_{i \in I^{CP} \wedge \rho^{CP}(i) = \neg(t, \vec{v}_i^{CP})} \cdot$$

$$e(c_t^{CP}, k_i^{*CP}) \alpha_i^{CP} \Big/ (\vec{v}_i^{CP} \cdot \vec{x}_t^{CP}).$$

7. A cryptographic processing method which uses a basis $B_0$ and a basis $B_0^*$, a basis $B_t^{KP}$ and a basis $B_t^{*KP}$ for each integer t=1, ..., $d^{KP}$ ($d^{KP}$ is an integer of 1 or more), and a basis $B_t^{CP}$ and a basis $B_t^{*CP}$ for each integer t=1, ..., $d^{CP}$ ($d^{CP}$ is an integer of 1 or more), the cryptographic processing method comprising:

a first KP information input step of, with a key generation device, taking as input, a variable $\rho^{KP}(i)$ for each integer i=1, ..., $L^{KP}$ ($L^{KP}$ is an integer of 1 or more), which variable $\rho^{KP}(i)$ is either one of a positive tuple (t, $\vec{v}_i^{KP}$) and a negative tuple ¬ (t, $\vec{v}_i^{KP}$) of identification information t (t is any one integer of t=1, ..., $d^{KP}$) and an attribute vector $\vec{v}_i^{KP} := (v_{t,i'}^{KP})$ (i'=1, ..., $n_t^{KP}$ where $n_t^{KP}$ is an integer of 1 or more), and a predetermined matrix $M^{KP}$ having $L^{KP}$ rows and $r^{KP}$ columns ($r^{KP}$ is an integer of 1 or more);

a first CP information input step of, with the key generation device, taking as input, an attribute set $\Gamma^{CP}$ having the identification information t and an attribute vector $\vec{x}_t^{CP} := (x_{t,i'}^{CP})$ (i'=1, ..., $n_t^{CP}$ where $n_t^{CP}$ is an integer of 1 or more) for at least one integer t=1, ..., $d^{CP}$;

a main decryption key generation step of, with the key generation device, generating an element $k^*_0$ by setting a value $-s_0^{KP} (s_0^{KP} := \vec{h}^{KP} \cdot (\vec{f}^{KP})^T$ where $\vec{h}^{KP}$ and $\vec{f}^{KP}$ are vectors each having $r^{KP}$ pieces of elements) as a coefficient for a basis vector $b^*_{0,p}$ (p is a predetermined value) of the basis $B_0^*$, by setting a random number $\delta^{CP}$ as a coefficient for a basis vector $b^*_{0,p'}$ (p' is a predetermined value different from prescribed p), and by setting a predetermined value $\kappa$ as a coefficient for a basis vector $b^*_{0,q}$ (q is a predetermined value different from the prescribed p and prescribed p');

a KP decryption key generation step of, with the key generation device, generating an element $k^{*KP}_i$ for each integer i=1, ..., $L^{KP}$, based on a column vector $(\vec{s}^{KP})^T := (s_1^{KP}, ..., s_i^{KP})^T := M^{KP} \cdot (\vec{f}^{KP})^T$ (i=$L^{KP}$) generated based on prescribed $\vec{f}^{KP}$ and the matrix $M^{KP}$ which is inputted in the first KP information input step; and a random number $\theta_i^{KP}$ (i=1, ..., $L^{KP}$), the KP decryption key generation step being configured to generate the element $k^{*KP}_i$, when the variable $\rho^{KP}(i)$ for each integer i=1, ..., $L^{KP}$ is a positive tuple (t, $\vec{v}_i^{KP}$), by setting $s_i^{KP} + \theta_i^{KP} v_{i,1}^{KP}$ as a coefficient for a basis vector $b^{*KP}_{t,1}$ of the basis $B_t^{*KP}$ indicated by identification information t of the positive tuple, and by setting $\theta_i^{KP} v_{i,i'}^{KP}$ as a coefficient for a basis vector $b^{*KP}_{t,i'}$ indicated by the identification information t and by each integer i'=2, ..., $n_t^{KP}$, and when the variable $\rho^{KP}(i)$ is a negative tuple ¬ (t, $\vec{v}_i^{KP}$), by setting $s_i^{KP} v_{i,i'}^{KP}$ as a coefficient for the basis vector $b^{*KP}_{t,i'}$ indicated by the identification information t of the negative tuple and by each integer i'=1, ..., $n_t^{KP}$;

a CP decryption key generation step of, with the key generation device, generating an element $k^{*CP}_t$ concerning each identification information t included in the attribute set $\Gamma^{CP}$ inputted in the first CP information input step, the CP decryption key generation step being configured to generate the element $k^{*CP}_t$ by setting $x_{t,i'}^{CP}$ multiplied by the random number $\delta^{CP}$ as a coefficient for a basis vector $b*_{t,i'}{}^{CP}$ (i'=1, ..., $n_t{}^{CP}$) of the basis $B*_t{}^{CP}$;

a second KP information input step of, with an encryption device, taking as input, an attribute set $\Gamma^{KP}$ having the identification information t and an attribute vector $\vec{x}_t{}^{KP}:=(x_{t,i'}{}^{KP})$ (i'=1, ..., $n_t{}^{KP}$) for at least one integer t=1, ..., $d^{KP}$;

a second CP information input step of, with the encryption device, taking as input, a variable $\rho^{CP}(i)$ for each integer i=1, ..., $L^{CP}$ ($L^{CP}$ is an integer of 1 or more), which variable $\rho^{CP}(i)$ is either one of a positive tuple (t, $\vec{v}_i{}^{CP}$) and a negative tuple ¬ (t, $\vec{v}_i{}^{CP}$) of identification information t (t is any one integer of t=1, ..., $d^{CP}$) and an attribute vector $\vec{v}_i{}^{CP}:=(v_{i,i'}{}^{CP})$ (i'=1, ..., $n_t{}^{CP}$), and a predetermined matrix $M^{CP}$ having $L^{CP}$ rows and $r^{CP}$ columns ($r^{CP}$ is an integer of 1 or more);

a main encrypted data generation step of, with the encryption device, generating an element $c_0$ by setting a random number $\omega^{KP}$ as a coefficient for a basis vector $b_{0,p}$ of the basis $B_0$, by setting a value $-s_0{}^{CP}$ ($s_0{}^{CP}:=\vec{h}^{CP} \cdot (\vec{f}^{CP})^T$ where $\vec{h}^{CP}$ and $\vec{f}^{CP}$ are vectors each having $r^{CP}$ pieces of elements) as a coefficient for a basis vector $b_{0,p'}$, and by setting a random number $\zeta$ as a coefficient for a basis vector $b_{0,q}$;

a KP encrypted data generation step of, with the encryption device, generating an element $c_t{}^{KP}$ concerning each identification information t included in the attribute set $\Gamma^{KP}$ inputted in the second KP information input step, the KP encrypted data generation step being configured to generate the element $c_t{}^{KP}$ by setting $x_{t,i'}{}^{KP}$ multiplied by the random number $\omega^{KP}$ as a coefficient for a basis vector $b_{t,i'}{}^{KP}$ (i'=1, ..., $n_t$) of the basis $B_t{}^{KP}$;

a CP encrypted data generation step of, with the encryption device, generating an element $c_i{}^{CP}$ for each integer i=1, ..., $L^{CP}$, based on a column vector $(\vec{s}^{CP})^T:=(s_1{}^{CP}, ..., s_L{}^{CP})^T:=M^{CP} \cdot (\vec{f}^{CP})^T$ (i=$L^{CP}$) generated based on the prescribed $\vec{f}^{CP}$ and the matrix $M^{CP}$ which is inputted in the second CP information input step; and a random number $\theta_i{}^{CP}$ (i=1, ..., $L^{CP}$), the CP encrypted data generation step being configured to generate the element $c_i{}^{CP}$, when the variable $\rho^{CP}(i)$ for each integer i=1, ..., $L^{CP}$ is a positive tuple (t, $\vec{v}_i{}^{CP}$), by setting $s_i{}^{CP}+\theta_i{}^{CP}v_{i,1}{}^{CP}$ as a coefficient for a basis vector $b_{t,1}{}^{CP}$ of the basis $B_t{}^{CP}$ indicated by identification information t of the positive tuple, and by setting $\theta_i{}^{CP}v_{i,i'}{}^{CP}$ as a coefficient for a basis vector $b_{t,i'}{}^{CP}$ indicated by the identification information t and by each integer i'=2, ..., $n_t{}^{CP}$, and when the variable $\rho^{CP}(i)$ is a negative tuple ¬ (t, $\vec{v}_i{}^{CP}$), by setting $s_i{}^{CP}v_{i,i'}{}^{CP}$ as a coefficient for the basis vector $b_{t,i'}{}^{CP}$ indicated by the identification information t of the negative tuple and by each integer i'=1, ..., $n_t{}^{CP}$;

a data acquisition step of, with a decryption device, acquiring encrypted data $ct_{(\Gamma CP, SCP)}$ including the element $c_0$ generated in the main encrypted data generation step, the element $c_t{}^{KP}$ generated in the KP encrypted data generation step, the element $c_i{}^{CP}$ generated in the CP encrypted data generation step, the attribute set $\Gamma^{KP}$, and the variable $\rho^{CP}(i)$;

a decryption key acquisition step of, with the decryption device, acquiring a decryption key $sk_{(SKP, \Gamma CP)}$ including the element $k*_0$ generated in the main decryption key generation step, the element $k*_t{}^{KP}$ generated in the KP decryption key generation step, the element $k*_t{}^{CP}$ generated in the CP decryption key generation step, the variable $\rho^{KP}(i)$, and the attribute set $\Gamma^{CP}$;

a KP complementary coefficient calculation step of, with the decryption device, based on the attribute set $\Gamma^{KP}$ included in the encrypted data $ct_{(\Gamma KP, SCP)}$ acquired in the data acquisition step, and the variable $\rho^{KP}(i)$ included in the decryption key $sk_{(SKP, \Gamma CP)}$ acquired in the decryption key acquisition step, specifying, among integers i=1, ..., $L^{KP}$, a set $I^{KP}$ of i for which the variable $\rho^{KP}(i)$ is a positive tuple (t, $\vec{v}_i{}^{KP}$) and with which an inner-product of $\vec{v}_i{}^{KP}$ of the positive tuple and $\vec{x}_t{}^{KP}$ included in $\Gamma^{KP}$ indicated by identification information t of the positive tuple becomes 0, and i for which the variable $\rho^{KP}(i)$ is a negative tuple ¬ (t, $\vec{v}_i{}^{KP}$) and with which an inner-product of $\vec{v}_i{}^{KP}$ of the negative tuple and $\vec{x}_t{}^{KP}$ included in $\Gamma^{KP}$ indicated by identification information t of the negative tuple does not become 0; and calculating a complementary coefficient $\alpha_i{}^{KP}$ with which a total of $\alpha_i{}^{KP}M_i{}^{KP}$ for i included in the set $I^{KP}$ specified becomes prescribed $\vec{h}^{KP}$;

a CP complementary coefficient calculation step of, with the decryption device, based on the variable $\rho^{CP}(i)$ concerning each integer i=1, ..., $L^{CP}$ included in the encrypted data $ct_{(\Gamma KP, SCP)}$, and the attribute set $\Gamma^{CP}$ included in the decryption key $sk_{(SKP, \Gamma CP)}$, specifying, among integers i=1, ..., $L^{CP}$, a set $I^{CP}$ of i for which the variable $\rho^{CP}(i)$ is a positive tuple (t, $\vec{v}_i{}^{CP}$) and with which an inner-product of $\vec{v}_i{}^{CP}$ of the positive tuple and $\vec{x}_t{}^{CP}$ included in $\Gamma^{CP}$ indicated by identification information t of the positive tuple becomes 0, and i for which the variable $\rho^{CP}(i)$ is a negative tuple ¬ (t, $\vec{v}_i{}^{CP}$) and with which an inner-product of $\vec{v}_i{}^{CP}$ of the negative tuple and $\vec{x}_t{}^{CP}$ included in $\Gamma^{CP}$ indicated by identification information t of the negative tuple does not become 0; and calculating a complementary coefficient $\alpha_i{}^{CP}$ with which a total of $\alpha_i{}^{CP}M_i{}^{CP}$ for i included in the set $I^{CP}$ specified becomes the prescribed $\vec{h}^{CP}$; and a pairing operation step of, with the decryption device, calculating a value K by conducting a pairing operation indicated in Formula 11 for the elements $C_0$, $c_t{}^{KP}$, and $c_i{}^{CP}$ included in the encrypted data $ct_{(\Gamma KP, SCP)}$, and the elements $k*_0$, $k*_t{}^{KP}$, and $k*_t{}^{CP}$ included in the decryption key $sk_{(SKP, \Gamma CP)}$, based on the set $I^{KP}$ specified in the KP complementary coefficient calculation step, on the complementary coefficient $\alpha_i{}^{KP}$ calculated in the KP complementary coefficient calculation step, on the set $I^{CP}$ specified in the CP complementary coefficient calculation step, and on the complementary coefficient $\alpha_i{}^{CP}$ calculated in the CP complementary coefficient calculation step, wherein

[Formula 11] is as follows:

$$K := e(c_0, k_0^*) \cdot \prod_{i \in I^{KP} \wedge \rho^{KP}(i)=(t, \vec{v}_i^{KP})} e(c_t^{KP}, k_i^{*KP}) \alpha_i^{KP} \cdot \prod_{i \in I^{KP} \wedge \rho^{KP}(i)=\neg(t, \vec{v}_i^{KP})} e(c_t^{KP}, k_i^{*KP}) \alpha_i^{KP} / (\vec{v}_i^{KP} \cdot \vec{x}_t^{KP}) \cdot \prod_{i \in I^{CP} \wedge \rho^{CP}(i)=\neg(t, \vec{v}_i^{CP})} e(c_t^{CP}, k_i^{*CP}) \alpha_i^{CP} \cdot \prod_{i \in I^{CP} \wedge \rho^{CP}(i)=\neg(t, \vec{v}_i^{CP})} e(c_t^{CP}, k_i^{*CP}) \alpha_i^{CP} / (\vec{v}_i^{CP} \cdot \vec{x}_t^{CP}).$$

8. A non-transitory computer readable medium storing a cryptographic processing program, which when executed by a computer causes the computer to perform a cryptographic processing method, the cryptographic processing program comprising:

a key generation program, an encryption program, and a decryption program, and serving to execute a cryptographic process using a basis $B_0$ and a basis $B_0^*$, a basis $B_t^{KP}$ and a basis $B_t^{*KP}$ for each integer $t=1, \ldots, d^{KP}$ ($d^{KP}$ is an integer of 1 or more), and a basis $B_t^{CP}$ and a basis $B_t^{*CP}$ for each integer $t=1, \ldots, d^{CP}$ ($d^{CP}$ is an integer of 1 or more), wherein the key generation program includes causing the computer to execute a first KP information input process of taking as input, a variable $\rho^{KP}(i)$ for each integer $i=1, \ldots, L^{KP}$ ($L^{KP}$ is an integer of 1 or more), which variable $\rho^{KP}(i)$ is either one of a positive tuple $(t, \vec{v}_i^{KP})$ and a negative tuple $\neg(t, \vec{v}_i^{KP})$ of identification information t (t is any one integer of $t=1, \ldots, d^{KP}$) and an attribute vector $\vec{v}_i^{KP} := (v_{i,i'}^{KP})$ ($i'=1, \ldots, n_t^{KP}$ where $n_t^{KP}$ is an integer of 1 or more), and a predetermined matrix $M^{KP}$ having $L^{KP}$ rows and $r^{KP}$ columns ($r^{KP}$ is an integer of 1 or more), a first CP information input process of taking as input, an attribute set $\Gamma^{CP}$ having the identification information t and an attribute vector $\vec{x}_t^{CP} := (x_{t,i'}^{CP})$ ($i'=1, \ldots, n_t^{CP}$ where $n_t^{CP}$ is an integer of 1 or more) for at least one integer $t=1, \ldots, d^{CP}$, a main decryption key generation process of generating an element $k_0^*$ by setting a value $-s_0^{KP}$ ($s_0^{KP} := \vec{h}^{KP} \cdot (\vec{f}^{KP})^T$ where $\vec{h}^{KP}$ and $\vec{f}^{KP}$ are vectors each having $r^{KP}$ pieces of elements) as a coefficient for a basis vector $b_{0,p}^*$ (p is a predetermined value) of the basis $B_0^*$, by setting a random number $\delta^{CP}$ as a coefficient for a basis vector $b_{0,p'}^*$ (p' is a predetermined value different from prescribed p), and by setting a predetermined value $\kappa$ as a coefficient for a basis vector $b_{0,q}^*$ (q is a predetermined value different from the prescribed p and prescribed p'), a KP decryption key generation process of generating an element $k_i^{*KP}$ for each integer $i=1 \ldots, L^{KP}$, based on a column vector $(\vec{s}^{KP})^T := (s_1^{KP}, \ldots, s_L^{KP})^T := M^{KP} \cdot (\vec{f}^{KP})^T$ ($i=L^{KP}$) generated based on prescribed $\vec{f}^{KP}$ and the matrix $M^{KP}$ which is inputted in the first KP information input process; and a random number $\theta_i^{KP}$ ($i=1, \ldots, L^{KP}$), the KP decryption key generation process being configured to generate the element $k_i^{*KP}$, when the variable $\rho^{KP}(i)$ for each integer $i=1, \ldots, L^{KP}$ is a positive tuple $(t, \vec{v}_i^{KP})$, by setting $s_i^{KP} + \theta_i^{KP} v_{i,1}^{KP}$ as a coefficient for a basis vector $b_{t,1}^{*KP}$ of the basis $B_t^{*KP}$ indicated by identification information t of the positive tuple, and by setting $\theta_i^{KP} v_{i,i'}^{KP}$ as a coefficient for a basis vector $b_{t,i'}^{*KP}$ indicated by the identification information t and by each integer $i'=2, \ldots, n_t^{KP}$, and when the variable $\rho^{KP}(i)$ is a negative tuple $\neg(t, \vec{v}_i^{KP})$, by setting $s_i^{KP} v_{i,i'}^{KP}$ as a coefficient for the basis vector $b_{t,i'}^{*KP}$ indicated by the identification information t of the negative tuple and by each integer $i'=1, \ldots, n_t^{KP}$, and a CP decryption key generation process of generating an element $k_t^{*CP}$ concerning each identification information t included in the attribute set $\Gamma^{CP}$ inputted in the first CP information input process, the CP decryption key generation process being configured to generate the element $k_t^{*CP}$ by setting $x_{t,i'}^{CP}$ multiplied by the random number $\delta^{CP}$ as a coefficient for a basis vector $b_{t,i'}^{*CP}$ ($i'=1, \ldots, n_t^{CP}$) of the basis $B_t^{*CP}$, wherein the encryption program includes causing the computer to execute a second KP information input process of taking as input, an attribute set $\Gamma^{KP}$ having the identification information t and an attribute vector $\vec{x}_t^{KP} := (x_{t,i'}^{KP})$ ($i'=1, \ldots, n_t^{KP}$) for at least one integer $t=1, \ldots, d^{KP}$, a second CP information input process of taking as input, a variable $\rho^{CP}(i)$ for each integer $i=1, \ldots, L^{CP}$ ($L^{CP}$ is an integer of 1 or more), which variable $\rho^{CP}(i)$ is either one of a positive tuple $(t, \vec{v}_i^{CP})$ and a negative tuple $\neg(t, \vec{v}_i^{CP})$ of identification information t (t is any one integer of $t=1, \ldots, d^{CP}$) and an attribute vector $\vec{v}_i^{CP} := (v_{i,i'}^{CP})$ ($i'=1, \ldots, n_t^{CP}$), and a predetermined matrix $M^{CP}$ having $L^{CP}$ rows and $r^{CP}$ columns ($r^{CP}$ is an integer of 1 or more), a main encrypted data generation process of generating an element $c_0$ by setting a random number $\omega^{KP}$ as a coefficient for a basis vector $b_{0,p}$ of the basis $B_0$, by setting a value $-s_0^{CP}$ ($s_0^{CP} := \vec{h}^{CP} \cdot (\vec{f}^{CP})^T$ where $\vec{h}^{CP}$ and $\vec{f}^{CP}$ are vectors each having $r^{CP}$ pieces of elements) as a coefficient for a basis vector $b_{0,p'}$, and by setting a random number $\zeta$ as a coefficient for a basis vector $b_{0,q}$, a KP encrypted data generation process of generating an element $c_t^{KP}$ concerning each identification information t included in the attribute set $\Gamma^{KP}$ inputted in the second KP information input process, the KP encrypted data generation process being configured to generate the element $c_t^{KP}$ by setting $x_{t,i'}^{KP}$ multiplied by the random number $\omega^{KP}$ as a coefficient for a basis vector $b_{t,i'}^{KP}$ ($i'=1, \ldots, n_t$) of the basis $B_t^{KP}$, and a CP encrypted data generation process of generating an element $c_i^{CP}$ for each integer $i=1 \ldots, L^{CP}$, based on a column vector $(\vec{s}^{CP})^T := (s_1^{CP}, \ldots, s_i^{CP})^T := M^{CP} \cdot (\vec{f}^{CP})^T$ ($i=L^{CP}$) generated based on the prescribed $\vec{f}^{CP}$ and the matrix $M^{CP}$ which is inputted in the second CP information input process; and a random number $\theta_i^{CP}$ ($i=1, \ldots, L^{CP}$), the CP encrypted data generation process being configured to generate the element $c_i^{CP}$, when the variable $\rho^{CP}(i)$ for each integer $i=1, \ldots, L^{CP}$ is a positive tuple $(t, \vec{v}_i^{CP})$, by setting $s_i^{CP} + \theta_i^{CP} v_{i,1}^{CP}$ as a coefficient for a basis vector $b_{t,1}^{CP}$ of the basis $B_t^{CP}$ indicated by identification information t of the positive tuple, and by setting $\theta_i^{CP} v_{i,i'}^{CP}$ as a coefficient for a basis vector $b_{t,i'}^{CP}$ indicated by the identification information t and by each integer $i'=2, \ldots, n_t^{CP}$, and when the variable $\rho^{CP}(i)$ is a negative tuple $\neg(t, \vec{v}_i^{CP})$, by setting $s_i^{CP} v_{i,i'}^{CP}$ as a coefficient for the basis vector $b_{t,i'}^{CP}$ indicated by the identification information t of the negative tuple and by each integer $i'=1, \ldots, n_t^{CP}$, and wherein the decryption program includes causing the computer to execute a data acquisition process of acquiring encrypted data $ct_{(\Gamma KP, SCP)}$ including the element $c_0$ generated in the main encrypted data generation process, the element $c_t^{KP}$ generated in the KP encrypted data generation process, the element $c_i^{CP}$ generated in the CP encrypted data generation process, the attribute set $\Gamma^{KP}$, and the variable $\rho^{CP}(i)$, a decryption key acquisition process of acquiring a decryption key $sk_{(SKP, \Gamma CP)}$ including the element $k_0^*$ generated in the main decryption key generation process, the element $k_i^{*KP}$ generated in the KP decryption key generation process, the element $k_t^{*CP}$ generated in the CP decryption key generation process, the variable $\rho^{KP}(i)$, and the attribute set $\Gamma^{CP}$, a KP complementary coefficient calculation process of, based on the attribute set $\Gamma^{KP}$ included in the encrypted data $ct_{(\Gamma KP, SCP)}$ acquired in the data acquisition process, and the variable $\rho^{KP}(i)$ included in the decryption key $sk_{(SKP, \Gamma CP)}$ acquired in the decryption key acquisition part, specifying, among integers $i=1, \ldots, L^{KP}$, a set $I^{KP}$ of i for which the variable $\rho^{KP}(i)$ is a positive tuple (t, $\vec{v}_i^{KP}$) and with which an inner-product of $\vec{v}_i^{KP}$ of the positive tuple and $\vec{x}_t^{KP}$ included in $\Gamma^{KP}$ indicated by identification information t of the positive tuple becomes 0, and i for which the variable $\rho^{KP}(i)$ is a negative tuple $\neg(t, \vec{v}_i^{KP})$ and with which an inner-product of $\vec{v}_i^{KP}$ of the negative tuple and $\vec{x}_t^{KP}$ included in $\Gamma^{KP}$ indicated by identification information t of the negative tuple does not become 0; and calculating a complementary coefficient $\alpha_i^{KP}$ with which a total of $\alpha_i^{KP} M_i^{KP}$ for i included in the set $I^{KP}$ specified becomes prescribed $\vec{h}^{KP}$, a CP complementary coefficient calculation process of, based on the variable $\rho^{CP}(i)$ concerning each integer $i=1, \ldots, L^{CP}$ included in the encrypted data $ct_{(\Gamma KP, SCP)}$, and the attribute set $\Gamma^{CP}$ included in the decryption key $sk_{(SKP, \Gamma CP)}$, specifying, among integers $i=1, \ldots, L^{CP}$, a set $I^{CP}$ of i for which the variable $\rho^{CP}(i)$ is a positive tuple (t, $\vec{v}_i^{CP}$) and with which an inner-product of $\vec{v}_i^{CP}$ of the positive tuple and $\vec{x}_t^{CP}$ included in $\Gamma^{CP}$ indicated by identification information t of the positive tuple becomes 0, and i for which the variable $\rho^{CP}(i)$ is a negative tuple $\neg(t, \vec{v}_i^{CP})$ and with which an inner-product of $\vec{v}_i^{CP}$ of the negative tuple and $\vec{x}_t^{CP}$ included in $\Gamma^{CP}$ indicated by identification information t of the negative tuple does not become 0; and calculating a complementary coefficient $\alpha_i^{CP}$ with which a total of $\alpha_i^{CP} M_i^{CP}$ for i included in the set $I^{CP}$ specified becomes the prescribed $\vec{h}^{CP}$, and a pairing operation process of calculating a value K by conducting a pairing operation indicated in Formula 12 for the elements $c_0$, $c_t^{KP}$, and $c_t^{CP}$ included in the encrypted data $ct_{(\Gamma KP, SCP)}$, and the elements $k^*_0$, $k^*_i{}^{KP}$, and $k^*_t{}^{CP}$ included in the decryption key $sk_{(SKP, \Gamma CP)}$, based on the set $I^{KP}$ specified in the KP complementary coefficient calculation process, on the complementary coefficient $\alpha_i^{KP}$ calculated in the KP complementary coefficient calculation process, on the set $I^{CP}$ specified in the CP complementary coefficient calculation process, and on the complementary coefficient $\alpha_i^{CP}$ calculated in the CP complementary coefficient calculation process, wherein

[Formula 12] is as follows:

$$K := e(c_0, k_0^*) \cdot \prod_{i \in I^{KP} \wedge \rho^{KP}(i)=(t, \vec{v}_i^{KP})} e(c_t^{KP}, k_i^{*KP}) \alpha_i^{KP} \cdot \prod_{i \in I^{KP} \wedge \rho^{KP}(i)=\neg(t, \vec{v}_i^{KP})} e(c_t^{KP}, k_i^{*KP})^{\alpha_i^{KP}/(\vec{v}_i^{KP} \cdot \vec{x}_t^{KP})} \cdot \prod_{i \in I^{CP} \wedge \rho^{CP}(i)=(t, \vec{v}_i^{CP})} e(c_t^{CP}, k_i^{*CP}) \alpha_i^{CP} \cdot \prod_{i \in I^{CP} \wedge \rho^{CP}(i)=\neg(t, \vec{v}_i^{CP})} e(c_t^{CP}, k_i^{*CP})^{\alpha_i^{CP}/(\vec{v}_i^{CP} \cdot \vec{x}_t^{CP})}.$$

* * * * *

UNITED STATES PATENT AND TRADEMARK OFFICE
CERTIFICATE OF CORRECTION

Page 1 of 1

PATENT NO. : 8,938,623 B2
APPLICATION NO. : 13/823507
DATED : January 20, 2015
INVENTOR(S) : Katsuyuki Takashima et al.

It is certified that error appears in the above-identified patent and that said Letters Patent is hereby corrected as shown below:

On the title page, Item (54) and in the specification, Column 1, the Title is incorrect. Item (54) and Column 1 should read:

--CRYPTOGRAPHIC PROCESSING SYSTEM, KEY GENERATION DEVICE, ENCRYPTION DEVICE, DECRYPTION DEVICE, CRYPTOGRAPHIC PROCESSING METHOD AND NON-TRANSITORY COMPUTER READABLE MEDIUM STORING A CRYPTOGRAPHIC PROCESSING PROGRAM FOR SUCH--

Signed and Sealed this
Twenty-eighth Day of April, 2015

Michelle K. Lee
*Director of the United States Patent and Trademark Office*